United States Patent
Kikuzuki et al.

(10) Patent No.: US 10,652,772 B2
(45) Date of Patent: May 12, 2020

(54) RADIO WAVE INTERFERENCE ANALYSIS APPARATUS, METHOD, AND MEDIUM

(71) Applicant: FUJITSU LIMITED, Kawasaki-shi, Kanagawa (JP)

(72) Inventors: Tatsuya Kikuzuki, Sodegaura (JP); Shiho Nakahara, Nerima (JP); Akihiro Wada, Kawasaki (JP); Hiromasa Yamauchi, Kawasaki (JP); Makoto Hamaminato, Kawasaki (JP); Teruhisa Ninomiya, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/019,741

(22) Filed: Jun. 27, 2018

(65) Prior Publication Data

US 2019/0007852 A1    Jan. 3, 2019

(30) Foreign Application Priority Data

Jun. 30, 2017    (JP) .................................. 2017-128287

(51) Int. Cl.

| | |
|---|---|
| H04W 24/08 | (2009.01) |
| H04B 17/318 | (2015.01) |
| H04W 52/24 | (2009.01) |
| H04B 17/391 | (2015.01) |
| H04B 17/336 | (2015.01) |

(Continued)

(52) U.S. Cl.
CPC .......... *H04W 24/08* (2013.01); *H04B 17/318* (2015.01); *H04B 17/336* (2015.01); *H04B 17/3912* (2015.01); *H04L 1/203* (2013.01); *H04L 41/22* (2013.01); *H04W 52/245* (2013.01)

(58) Field of Classification Search
CPC .. H04W 24/08; H04W 52/245; H04B 17/318; H04B 17/3912; H04B 17/336; H04L 41/22; H04L 1/203
See application file for complete search history.

(56) References Cited

U.S. PATENT DOCUMENTS

| 7,246,045 B1 | 7/2007 | Rappaport et al. |
|---|---|---|
| 2005/0043933 A1 | 2/2005 | Rappaport et al. |

(Continued)

FOREIGN PATENT DOCUMENTS

| JP | 2004-032467 | 1/2004 |
|---|---|---|
| JP | 2004-513537 | 4/2004 |

(Continued)

*Primary Examiner* — Omar J Ghowrwal
(74) *Attorney, Agent, or Firm* — Fujitsu Patent Center

(57) ABSTRACT

There is provided a radio wave interference analysis apparatus configured to analyze a state of interference due to a plurality of interference signals of a plurality of interference sources on a target signal of a wireless device as an evaluation target at a reception point, the radio wave interference analysis apparatus including a memory, and a processor coupled to the memory and the processor configured to calculate a first probability of failure of reception of the target signal at the reception point due to collision of the target signal with an interference signal of the plurality of interference signals, calculate a second probability of failure of reception of the target signal at the reception point due to the interference signal of the plurality of interference sources, and output the first probability and the second probability.

18 Claims, 37 Drawing Sheets

(51) Int. Cl.
*H04L 12/24* (2006.01)
*H04L 1/20* (2006.01)

(56) References Cited

U.S. PATENT DOCUMENTS

| | | |
|---|---|---|
| 2007/0253363 A1 | 11/2007 | Bachl et al. |
| 2009/0172741 A1 | 7/2009 | Miyazaki |
| 2012/0224499 A1* | 9/2012 | Yoo ................. H04J 11/005 370/252 |
| 2014/0045440 A1 | 2/2014 | Yoshida |
| 2014/0288820 A1* | 9/2014 | Opshaug ............. G01C 21/30 701/412 |
| 2016/0373992 A1* | 12/2016 | Jung ............. H04W 36/0022 |

FOREIGN PATENT DOCUMENTS

| | | |
|---|---|---|
| JP | 2009-159444 | 7/2009 |
| JP | 2009-535907 | 10/2009 |
| JP | 2010-103815 | 5/2010 |
| JP | 2014-036374 | 2/2014 |
| WO | 02/13009 | 2/2002 |
| WO | 2007/127154 | 11/2007 |

* cited by examiner

RADIO WAVE INTERFERENCE ANALYSIS APPARATUS, METHOD, AND MEDIUM

CROSS-REFERENCE TO RELATED APPLICATION

This application is based upon and claims the benefit of priority of the prior Japanese Patent Application No. 2017-128287, filed on Jun. 30, 2017, the entire contents of which are incorporated herein by reference.

FIELD

The embodiments discussed herein are related to a radio wave interference analysis apparatus and a radio wave interference analysis method for analyzing a radio wave interference from which a target signal of an evaluation target suffers.

BACKGROUND

Predetermined bands (e.g., 2.4 GHz band) of wireless communication frequencies are defined for use in various wireless standards such as wireless LAN, Wi-Fi®, BLUETOOTH®, and Zigbee®. In these bands, the radio communication may become unstable due to, for example, the occurrence of interference, resulting in a degradation of a reception performance.

For example, when a new wireless device is introduced to be installed in an area where various wireless standards coexist, there has been proposed a method for obtaining the interference state at the installation site by estimating a packet error rate (PER). For example, there has been proposed a technique for estimating the PER based on, for example, the SINR (Signal-to-Interference-plus-Noise Ratio), power level, and packet signal information of a received signal (see, e.g., Japanese Laid-Open Patent Publication No. 2004-032467). There has been also proposed a technique for estimating the PER based on a transmission success rate of a desired wave transmitted by a terminal in an overlapping area and a packet error rate by a hidden terminal (see, e.g., Japanese Laid-Open Patent Publication No. 2010-103815).

Related techniques are disclosed in, for example, Japanese Laid-Open Patent Publication Nos. 2004-032467 and 2010-103815.

SUMMARY

According to an aspect of the invention, a radio wave interference analysis apparatus configured to analyze a state of interference due to a plurality of interference signals of a plurality of interference sources on a target signal of a wireless device as an evaluation target at a reception point, the radio wave interference analysis apparatus includes a memory, and a processor coupled to the memory and the processor configured to calculate a first probability of failure of reception of the target signal at the reception point due to collision of the target signal with an interference signal of the plurality of interference signals, calculate a second probability of failure of reception of the target signal at the reception point due to the interference signal of the plurality of interference sources, and output the first probability and the second probability.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

In the related art, the interference countermeasures based on the PER estimation have been insufficient. For example, even with the same SINR, PER varies depending on the occupancy rate of a terminal (interference source) transmitting a signal acting as an interference. In addition, when there are multiple interference sources, the influence of each interference source is not considered. Specifically, information of a terminal (interference source) transmitting a signal acting as an interference is not grasped and the interference source is not controlled. For this reason, it is unknown in the related art which interference source affects the deterioration of the PER with respect to a desired wave even after an interference countermeasure is performed. Therefore, for example, interference at a place where a new wireless device is installed may not be effectively avoided.

Further, according to the related art, it has been impossible to effectively notify the degree of the influence of an interference wave on a desired wave by, for example, display. For example, in the technique of displaying the RSSI (Received Signal Strength Indication), the influence degree of the interference wave on the desired wave and the manner of the influence are unknown, and specific measures against the interference are not presented.

Hereinafter, embodiments of a technique capable of appropriately providing an interference state with respect to a target signal will be described with reference to the drawings. The configurations of the embodiments are merely examples, and the present disclosure is not limited to the configurations of the embodiments.

First Embodiment

Figure 1:
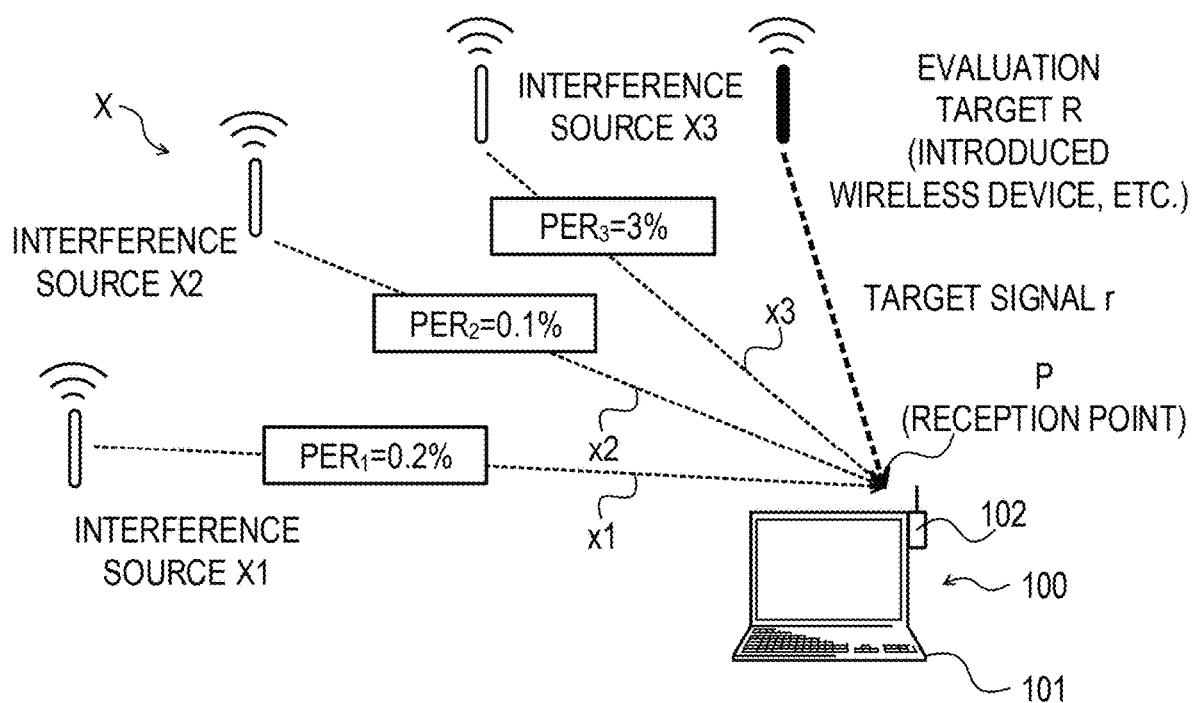
FIG. 1 is a view for explaining measures against interference taken by a radio wave interference analysis apparatus according to a first embodiment.

FIG. 1 is a view for explaining an interference countermeasure by a radio wave interference analysis apparatus according to a first embodiment. The radio wave interference analysis apparatus 100 is installed at a predetermined reception point P in a state where a wireless apparatus as an evaluation target R is actually installed. The reception point P is, for example, a point at which a target signal r of the evaluation target R and an interference signal x of an interference source X other than the target signal r are received. The radio wave interference analysis apparatus 100 determines a state of an interference suffered by the target signal r of the evaluation target R from an interference signal x of another interference source X and concretely presents an effective countermeasure for reducing the interference suffered by the evaluation target R.

Then, the radio wave interference analysis apparatus 100 determines an interference state by interference signals (interference waves) x (x1, x2, . . . ) of plural interference sources X (X1, X2, X3, X3, . . . ) with respect to the target signal (desired wave) r transmitted from the evaluation target R. Then, PER of the target signal r by the interference wave x of each interference source X is obtained, and the state of the interference is provided to a user. For example, an interference source X of an interference signal (interference wave) x having a high interference effect on the target signal r is specified and provided to the user.

The radio wave interference analysis apparatus 100 includes, for example, a terminal device 101 such as a portable notebook PC that may be installed at the reception point P, and a wireless unit (software wireless device) 102 that outputs a communication state at the reception point P to the terminal device 101. The wireless unit (wireless circuit) 102 receives the target signal r and the interference signal x, and outputs information of these signals to the terminal device 101.

The radio wave interference analysis apparatus 100 (terminal device 101) of the first embodiment analyzes the breakdown of the PER of the target signal r by the interference signal x of each interference source X to find a probability that the target signal r fails to be received for each interference source X. The PER is calculated as described in the following items 1 and 2.

1. A probability $PER_i$ that a packet of the target signal r fails to be received due to a collision with a packet of the interference signal x of an interference source Xi is obtained by the following equation (1).

$$PER_i = \text{collision rate } R_i \times \text{collision } ER_i \ (i=1 \text{ to the number of interference sources}) \quad (1)$$

The collision rate Ri is a probability that the packet of the interference signal x of an interference source i and the packet of the target signal r temporally overlap with each other, and is calculated using a packet length and a transmission interval in consideration of an MAC (Message Authentication Code) scheme of the interference source i and the target signal r.

The MAC scheme may include a contention-free method that maps channels of time and frequency bands, such as FDMA (Frequency Division Multiple Access) and TDMA (Time Division Multiple Access), and a competitive method (carrier sense method) that is shared by plural users and resolves a competition occurrence, such as CSMA/CA (Carrier Sense Multiple Access with Collision Avoidance).

The collision ERi is a probability that the target signal r fails to be received when the packet of the interference signal x of the interference source i and the packet of the target signal r temporally overlap with each other, and is calculated from SINR.

2. PER is obtained in consideration of all the effects of multiple n interference sources X (X1, X2, X3, . . . , Xn) is obtained. The probability PER that the packet of the target signal r fails to be received due to the collision with the packet of the interference signal x from any one interference source X is obtained by the following equation (2).

$$PER = 1 - (1 - PER_1)(1 - PER_2)(1 - PER_3) \ldots (1 - PER_n) \quad (2)$$

In this manner, the radio wave interference analysis apparatus 100 obtains, for example, the PER due to the interference of each interference source X illustrated in FIG. 1. At this time, the probabilities $PER_1$, $PER_2$, and $PER_3$ of the failure of the reception of the target signal r due to the interference signals x (transmission packets) transmitted by the respective interference sources X (X1, X2 and X3) are obtained.

Then, when there are plural interference sources X1 to X3, the radio wave interference analysis apparatus 100 presents a concrete method capable of efficiently reducing the interference. As an example of the presentation, in the example of FIG. 1, the PER ($PER_3$) due to the interference of the interference source X3 is the highest as 3%. In this case, since the probability that the target signal r collapses (fails to be received) due to the interference source X3 is the highest, the radio wave interference analysis apparatus 100 provides to a user that the interference by the interference source X3 has the highest influence degree. Then, the user can grasp that eliminating the interference source X3 is most effective as an interference countermeasure.

Figure 2:
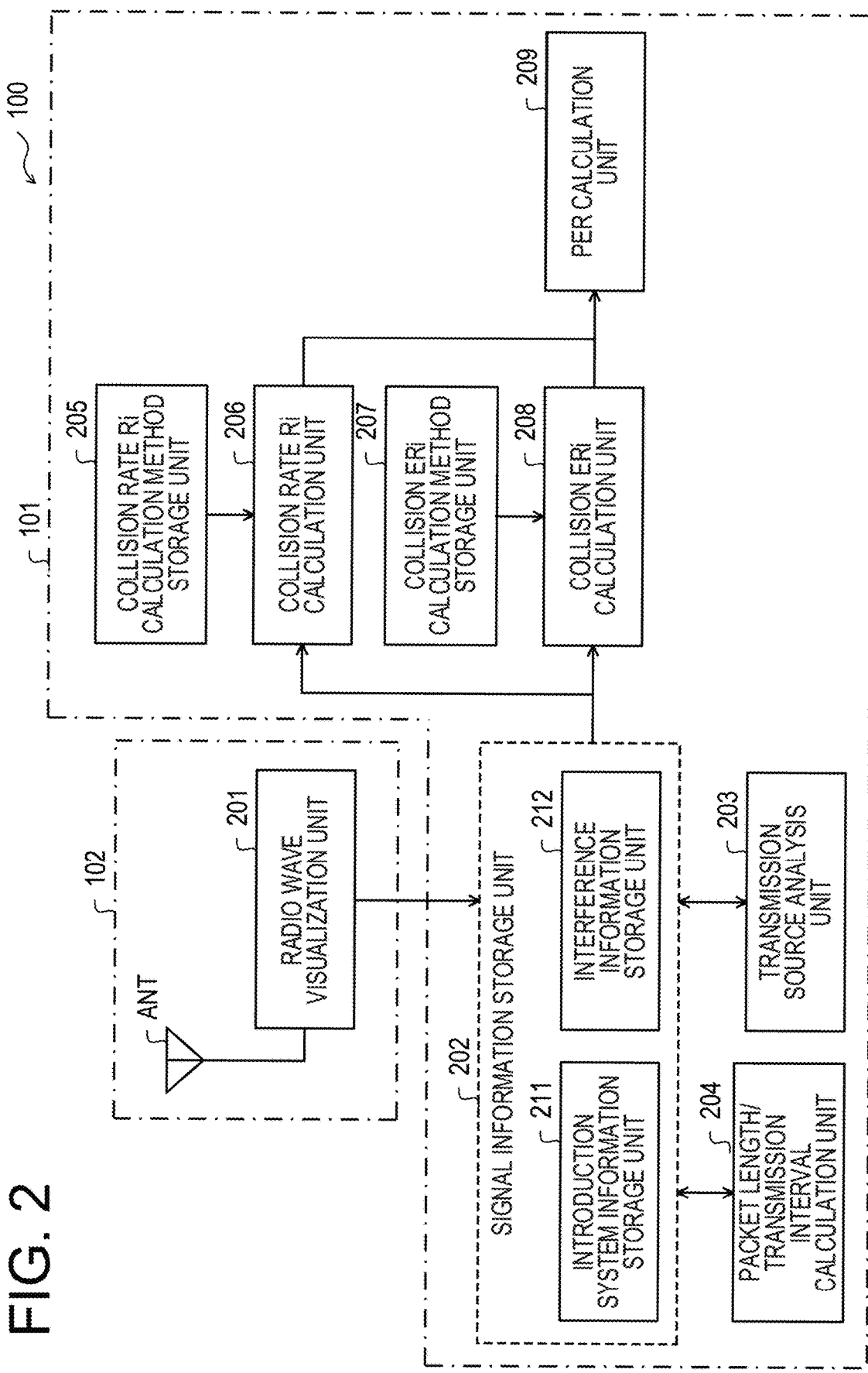
FIG. 2 is a block diagram illustrating a function of the radio wave interference analysis apparatus according to the first embodiment.

FIG. 2 is a block diagram illustrating the function of the radio wave interference analysis apparatus according to the first embodiment. FIG. 2 illustrates a function related to the PER calculation of the radio wave interference analysis apparatus 100. The radio wave interference analysis apparatus 100 includes a radio wave visualization unit 201, a signal information storage unit 202, a transmission source analysis unit 203, and a packet length/transmission interval calculation unit 204. Further, the radio wave interference analysis apparatus 100 includes a collision rate Ri calculation method storage unit 205, a collision rate Ri calculation unit 206, a collision ERi calculation method storage unit 207, a collision ERi calculation unit 208, and a PER calculation unit 209. The signal information storage unit 202 includes an introduction system information storage unit 211 and an interference wave information storage unit 212.

The radio wave visualization unit 201 in FIG. 2 corresponds to the wireless unit (wireless circuit) 102 in FIG. 1, and functions other than the radio wave visualization unit 201 in FIG. 2 correspond to the functions of the terminal device 101 in FIG. 1.

The radio wave visualization unit 201 acquires the communication state of the target signal r and the interference signal x at the reception point P through actual radio wave measurement (electrometry) via an antenna ANT for a predetermined observation time.

The signal information storage unit 202 stores the information acquired by the radio wave visualization unit 201 through the electrometry. In addition, the signal information storage unit 202 stores information (parameters) on the evaluation target R and the interference source X obtained by the transmission source analysis unit 203 and the packet length/transmission interval calculation unit 204.

The introduction system information storage unit 211 of the signal information storage unit 202 stores information on the target signal r of the evaluation target R acquired by the radio wave radio visualization unit 201. The interference wave information storage unit 212 stores information on the interference signal x of the interference source X acquired by the radio wave visualization unit 201.

The transmission source analysis unit 203 analyzes transmission sources of the target signal r and the interference signal x. At this time, the evaluation target R is specified based on the information of the target signal r, and each interference source X is specified based on the information of the interference signal x. For example, the evaluation target R of the target signal r and the interference source X of the interference signal x are identified and specified based on information such as the standard, RSSI, frequency band, reception time, and packet length of a received packet.

Then, the transmission source analysis unit 203 causes the introduction system information storage unit 211 of the signal information storage unit 202 to store various types of information (parameters) of the evaluation target R in association with each other and further causes the interference wave information storage unit 212 to store various types of information (parameters) of the interference source X in association with each other.

Based on the information of the target signal r and the interference signal x stored in the signal information storage unit 202, the packet length/transmission interval calculation unit 204 calculates a packet length and a transmission interval of each of the target signal r and the interference signal x. In this case, assuming that the target signal r and the interference signal x are periodically transmitted with packets of the same length, the average value of packet lengths and the average value of transmission intervals per observation time. The calculated packet length and transmission interval are stored as parameters of the target signal r in the introduction system information storage unit 211 of the signal information storage unit 202 and stored as parameters of the interference signal x in the interference wave information storage unit 212 of the signal information storage unit 202.

The collision rate Ri calculation method storage unit 205 stores an arithmetic algorithm for calculating a collision rate Ri at which the interference signal x collides with the target signal r. The arithmetic algorithm calculates the collision rate Ri by referring to the parameters (e.g., MAC scheme, packet length, and transmission interval) of the target signal r and the interference signal x stored in the introduction system information storage unit 211 and the interference wave information storage unit 212 of the signal information storage unit 202.

The collision rate Ri calculation unit 206 calculates the collision rate Ri at which the interference signal x collides with the target signal r. For example, based on the arithmetic algorithm stored in the collision rate Ri calculation method storage section 205, the collision rate Ri calculation unit 206 calculates the collision rate Ri by referring to the parameters (e.g., MAC scheme, packet length, and transmission interval) of the target signal r and the interference signal x stored in the interference wave information storage unit 212.

The collision ERi calculation method storage unit 207 stores an arithmetic algorithm for calculating a probability (collision ERi) that the target signal r fails to be received when the packet of the target signal r temporally overlaps with the packet of the interference signal x. The arithmetic algorithm calculates the collision ERi by referring to the parameters (e.g., radio wave strength, modulation scheme, detection scheme, and bit length of one packet) of the target signal r and the interference signal x stored in the introduction system information storage unit 211 and the interference wave information storage unit 212 of the signal information storage unit 202.

The collision ERi calculation unit 208 calculates the probability (collision ERi) of the failure of the reception of the target signal r when the packet of the target signal r temporally overlaps with the packet of the interference signal x. For example, based on the arithmetic algorithm stored in the collision ERi calculation method storage unit 207, the collision ERi calculation unit 208 calculates the collision ERi by referring to the parameters (e.g., radio wave strength, modulation scheme, detection scheme, and bit length of one packet) of the target signal r and the interference signal x stored in the interference wave information storage unit 212.

The PER calculation unit 209 calculates the PER of the target signal r based on the collision rate Ri calculated by the collision rate Ri calculation unit 206 and the collision ERi calculated by the collision ERi calculation unit 208. In this PER calculation, PERi due to the interference of each interference source Xi is obtained for the target signal r. Then, the obtained PERi is used to obtain the PER when the target signal r is affected by all interference sources Xi. The obtained PER is subjected to a predetermined GUI (Graphical User Interface) process and is provided to a user.

Figure 3:
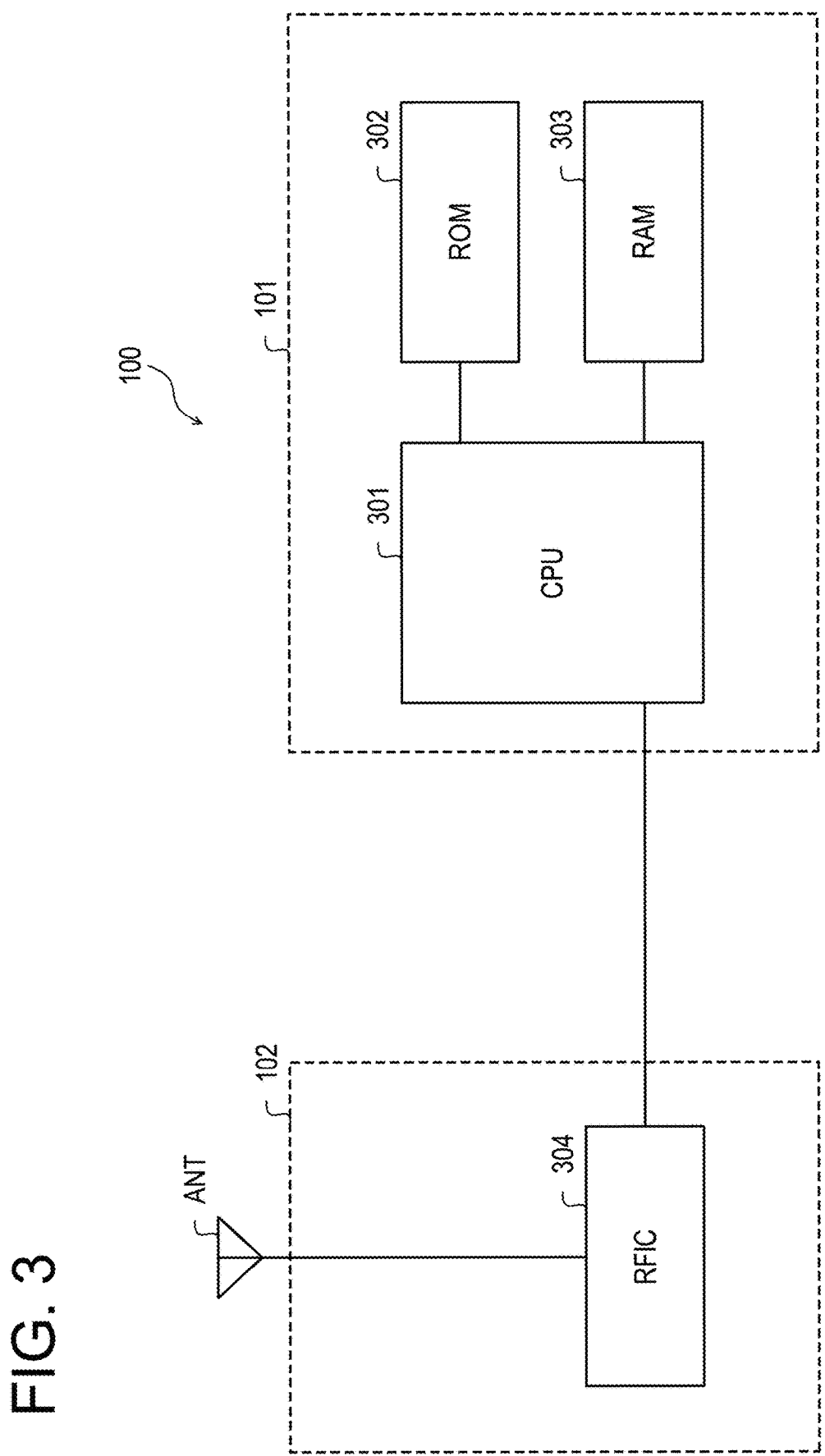
FIG. 3 is a view illustrating an example of a hardware configuration of the radio wave interference analysis apparatus according to the first embodiment.

FIG. 3 is a view illustrating an example of a hardware configuration of the radio wave interference analysis apparatus according to the first embodiment. The radio wave interference analysis apparatus 100 may be configured by, for example, a CPU 301, a ROM 302, a RAM 303, and an RFIC (Radio Frequency Integrated Circuit) 304. The CPU 301 is a controller that implements the overall function of the terminal device 101 illustrated in FIGS. 1 and 2 by executing a program stored in the ROM 302 and using the RAM 303 as a work area. The terminal device 101 is not limited to a laptop PC but may be a board for wireless analysis.

The RFIC 304 implements the function of the wireless unit (wireless circuit) 102 illustrated in FIGS. 1 and 2 by executing the electrometry of the target signal r and the interference signal x.

Figure 4:
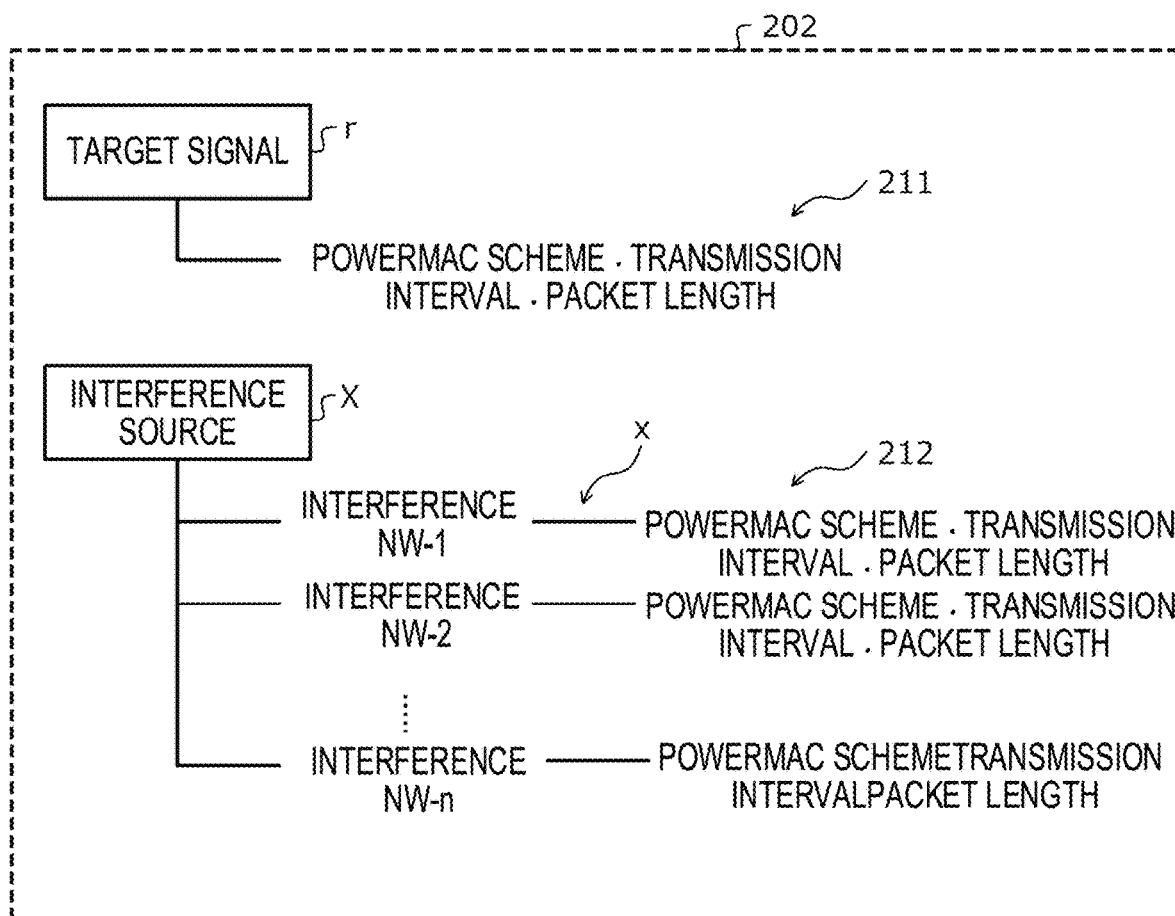
FIG. 4 is a diagram illustrating an example of information held by the radio wave interference analysis apparatus according to the first embodiment.

FIG. 4 is a diagram illustrating an example of information held by the radio wave interference analysis apparatus according to the first embodiment. FIG. 4 illustrates an example of the information (parameters) stored and held in the signal information storage unit 202 in FIG. 2. The introduction system information storage unit 211 of the signal information storage unit 202 holds the power, MAC scheme, transmission interval, and packet length of the target signal r as the information of the target signal r.

The interference wave information storage unit 212 of the signal information storage unit 202 holds the power, MAC scheme, transmission interval, and packet length of each interference signal x serving as the interference source X, as the information of the interference signal (interference wave) r. In the example of FIG. 4, different interference sources X are described as different communication system networks NW-1, NW-2, . . . , NW-n.

[Calculation Example of Collision Rate Ri]

Next, the above-described PER calculation process will be described in detail. First, an example of a calculation of the collision rate Ri will be described. The collision rate Ri is obtained by the collision rate Ri calculation unit 206 according to the following calculation.

The collision rate Ri is obtained in consideration of the presence or absence of CSMA/CA under the assumption that an interference source X periodically transmits an interference signal x. Here, it is assumed that the packet length of the interference signal x is Li, the period of the interference signal x is Ti, and the packet length of the target signal r is Ls. In this case, the probability of the collision of the target signal r with a certain interference signal x is obtained for each of the following states of CSMA/CA. It is also assumed that the radio wave interference analysis apparatus 100 is in a state where it can receive both the target signal r and the interference signal x.

FIG. 5 is a diagram for explaining a calculation of a collision rate by the radio wave interference analysis apparatus according to the first embodiment.

Figure 5A:
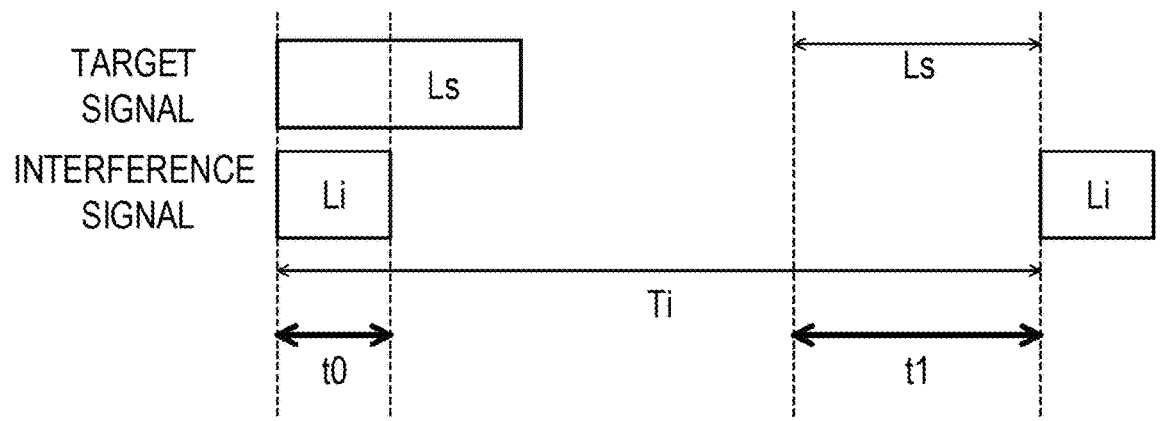
FIGS. 5A to 5C are views for explaining a calculation of a collision rate by the radio wave interference analysis apparatus according to the first embodiment.

1. In case where CSMA/CA is performed for neither the target signal r nor the interference signal x, As illustrated in FIG. 5A, in a case where CSMA/CA is performed for neither the target signal r nor the interference signal x, when the target signal r starts to be transmitted in the period Ti of the interference signal x within intervals t0 and t1, the target signal r collides with the interference signal x. In this case, the collision rate Ri is $(Ls+Li)/Ti$.

Figure 5B:
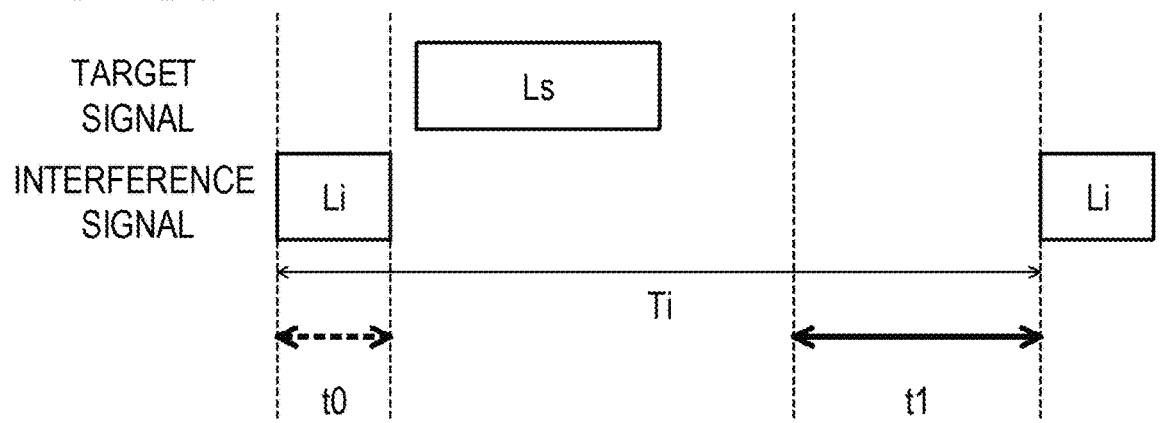

2. In case where CSMA/CA is performed only for the target signal r,

As illustrated in FIG. 5B, in a case where CSMA/CA is performed only for the target signal r, since the target signal r does not collide with the interference signal x since the transmission timing of interference within the interval t0 is shifted temporally behind by the CSMA/CA. However, when the target signal r starts to be transmitted within the interval t1, the target signal r collides with the interference signal x. In this case, the collision rate Ri is $Ls/Ti$.

Figure 5C:
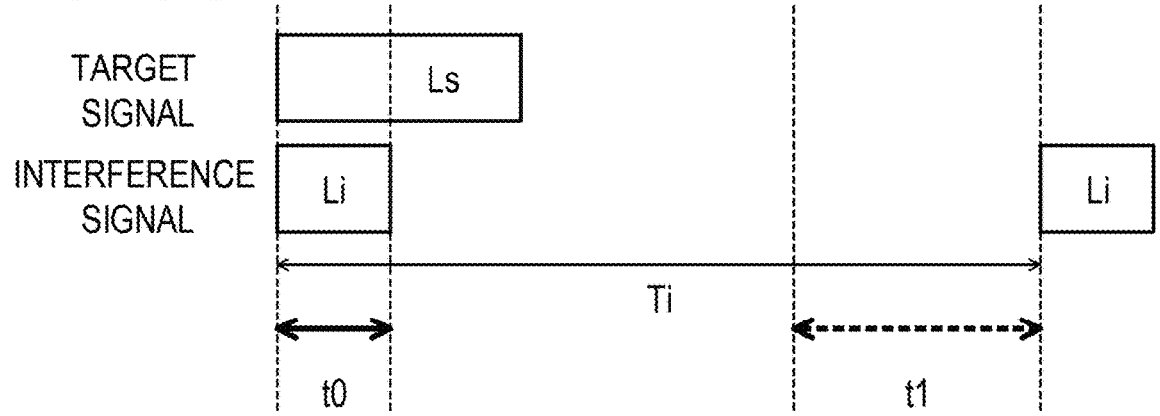

3. In case where CSMA/CA is performed only for the interference signal x,

As illustrated in FIG. 5C, in a case where CSMA/CA is performed only for the interference signal x, since the target signal r does not collide with the interference signal x since the transmission timing of interference within the interval t1 is shifted temporally behind by the CSMA/CA of the interference signal x. However, when the target signal r starts to be transmitted within the interval t0, the target signal r collides with the interference signal x. In this case, the collision rate Ri is Li/Ti.

4. In case where CSMA/CA is performed for both the target signal r and the interference signal x, In this case, since the target signal r and the interference signal x avoid mutual interference, the collision rate Ri is zero.

When the radio wave interference analysis apparatus 100 cannot receive both the target signal r and the interference signal x, for example, when the apparatus becomes a hidden terminal, the collision rate Ri may be set to 1, irrespective of the presence or absence of CSMA/CA.

The average value of the packet lengths L (Li and Ls) and the average value of the transmission intervals (periods Ti) are obtained under the assumption that packets of the same length are periodically transmitted. Here, the radio wave interference analysis apparatus 100 observes plural packets $n_{packets}$ with a predetermined observation time $t_{listen}$. At this time, the average packet length is calculated based on the following equation (3).

$$\text{AVERAGE PACKET LENGTH} = \frac{1}{n_{packets}} \Sigma_k \text{packet\_length}[k] \quad (3)$$

Where, packet_length[k] represents the packet length of each observed packet.

The average transmission interval (average period) is calculated based on the following equation (4).

$$\text{Average transmission interval} = t_{listen} \div n_{packets} \quad (4)$$

[Calculation Example of Collision ERi]

Next, an example of the calculation of the collision ERi will be described. The collision ERi, that is, the probability that the target signal r fails to be received when the target signal r and the interference signal x overlap with each other over time, is obtained by the collision ERi calculation unit 208 according to the following calculation.

The collision ERi is obtained by sequentially performing the following calculations 1 to 3.

1. Calculation of SINR

The SINR is obtained from the ratio of radio wave strength between the target signal r and the interference signal x. The calculation of the SINR using the radio wave strength ratio is a general technique.

2. Calculation of BER (Bit Error Rate) Based on SINR

The BER can be obtained with a theoretical value according to a modulation scheme and a detection scheme of the target signal r. For example, PSK synchronous detection may be used to obtain the BER based on the following equation (5) and FSK delay detection may be used to obtain the BER based on the following equation (6).

$$\text{PSK SYNCHRONOUS DETECTION: } \frac{1}{2} \text{erfc}(\sqrt{SINR}) \quad (5)$$

$$\text{FSK DELAY DETECTION: } \frac{1}{2} \exp\left(\frac{-SINR}{2}\right) \quad (6)$$

3. Calculation of Collision ERi Based on BER,

Assuming that the number of bits of one packet is np, when nc bits in the one packet collide with each other, the collision ERi is obtained based on the following equation (7). The $BER_0$ represents the BER when there is no collision.

$$\text{COLLISION } ERi = 1 - (1 - BER_1)^{nc} \times (1 - BER_0)^{np-nc} \quad (7)$$

Figure 6A:
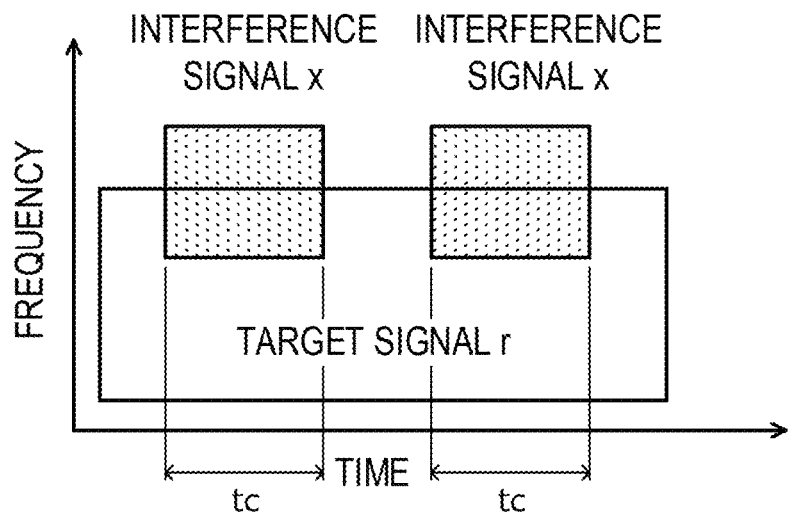
FIGS. 6A-6C are views for explaining a calculation of a PER by the radio wave interference analysis apparatus according to the first embodiment.
Figure 6B:
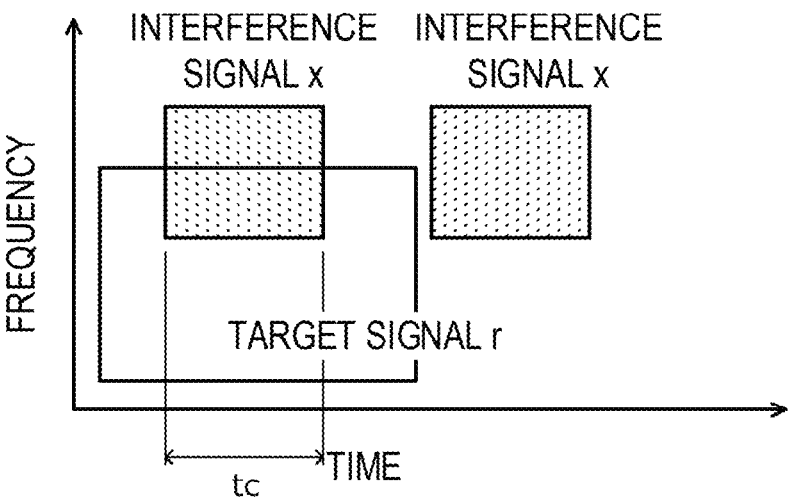
Figure 6C:
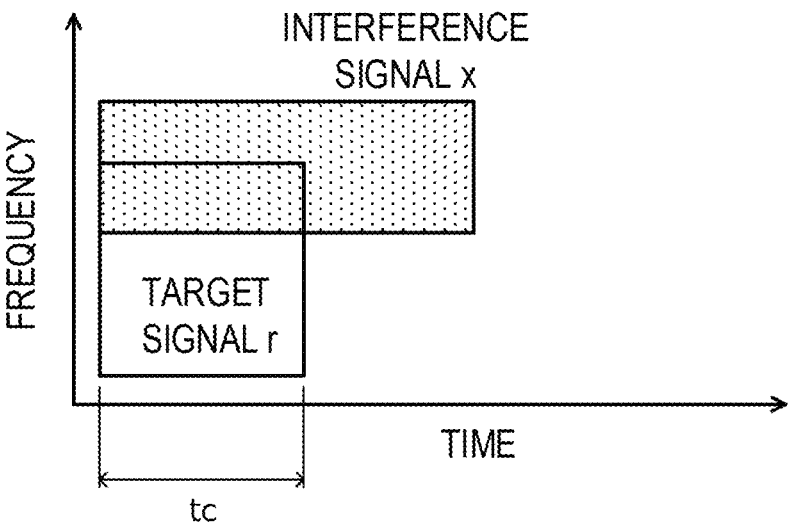

FIG. 6 is a diagram for explaining a calculation of the number of collision bits by the radio wave interference analysis apparatus according to the first embodiment. The horizontal axis represents time and the vertical axis represents a frequency. An example of the calculation of the collision bit number nc will be described. The collision bit number nc is calculated by the collision ERi calculation unit 208 based on the following equation (8).

$$\text{Collision bit number } nc = \text{collision time } tc \text{ per packet} \times \text{bit rate of target signal } r \text{ [bit/sec]} \quad (8)$$

The collision time tc per packet is calculated for each of the following states 1 to 3 based on the transmission states of the interference signal x and the target signal r.

1. When the transmission interval of the interference signal x<the packet length of the target signal r, This state corresponds to the state illustrated in FIG. 6A. In this case, the collision time tc per packet is calculated based on the following equation (9).

$$tc = \text{packet length of target signal } r \times \text{occupancy rate of interference signal } x \quad (9)$$

Where, the occupancy rate of interference signal x=packet length of interference signal x÷transmission interval of interference signal x.

2. When the packet length of the target signal r≤the transmission interval of the interference signal x, and the packet length of the interference signal x<the packet length of the target signal r, This state corresponds to the state illustrated in FIG. 6B. In this case, the collision time tc per packet is calculated based on the following equation (10).

$$tc = \text{packet length of interference signal } x \quad (10)$$

3. When the packet length of the target signal r≤the packet length of the interference signal x, This state corresponds to the state illustrated in FIG. 6C. In this case, the collision time tc per packet is calculated based on the following equation (11).

$$tc = \text{packet length of target signal } r \quad (11)$$

As the bit rate of the target signal r, a fixed value determined by the wireless protocol of the evaluation target R is used.

[Calculation Example of PER]

FIG. 7 is a diagram for explaining the calculation of the PER by the radio wave interference analysis apparatus according to the first embodiment. The PER is obtained by the PER calculation unit 209 through the following calculation based on the collision rate Ri and collision ERi calculated as described above.

Figure 7A:
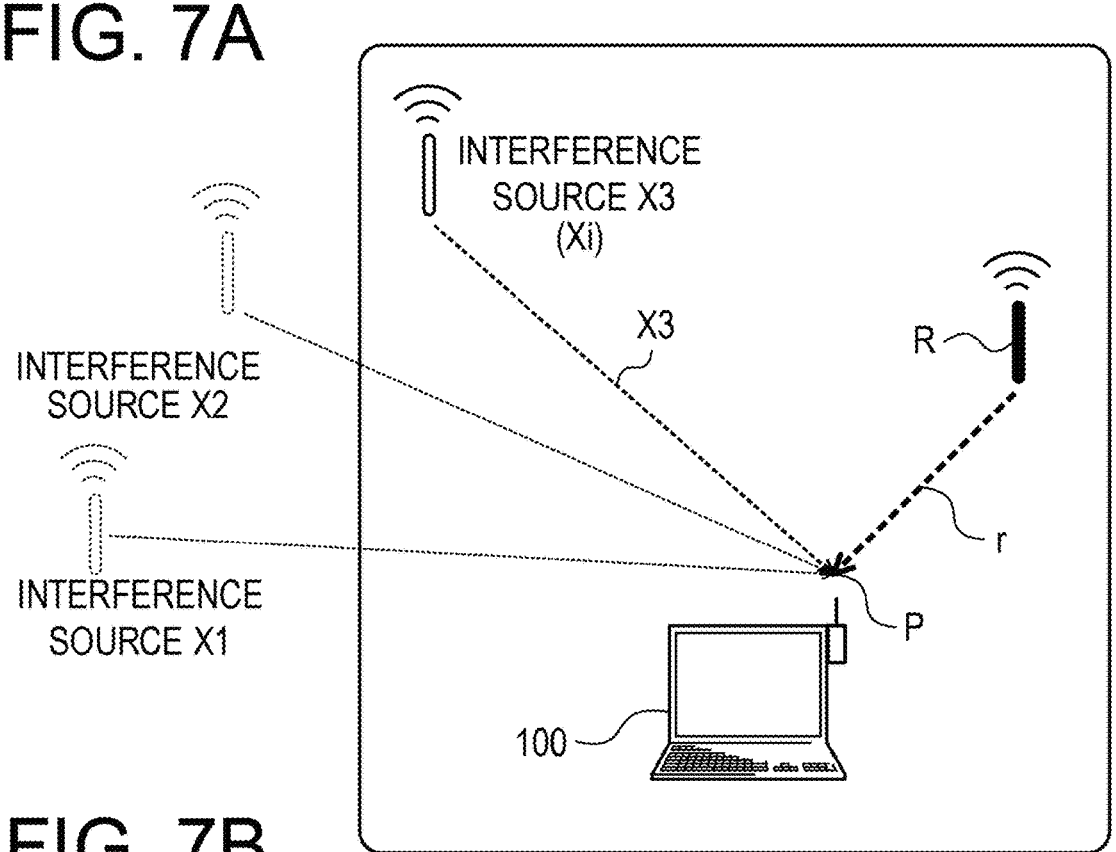
FIGS. 7A and 7B are views for explaining the calculation of the PER by the radio wave interference analysis apparatus according to the first embodiment.

First, as illustrated in FIG. 7A, PERi by the target signal r and one interference source Xi is obtained based on the following equation (12).

$$PERi = \text{collision rate } Ri \times \text{collision } ERi \quad (12)$$

Figure 7B:
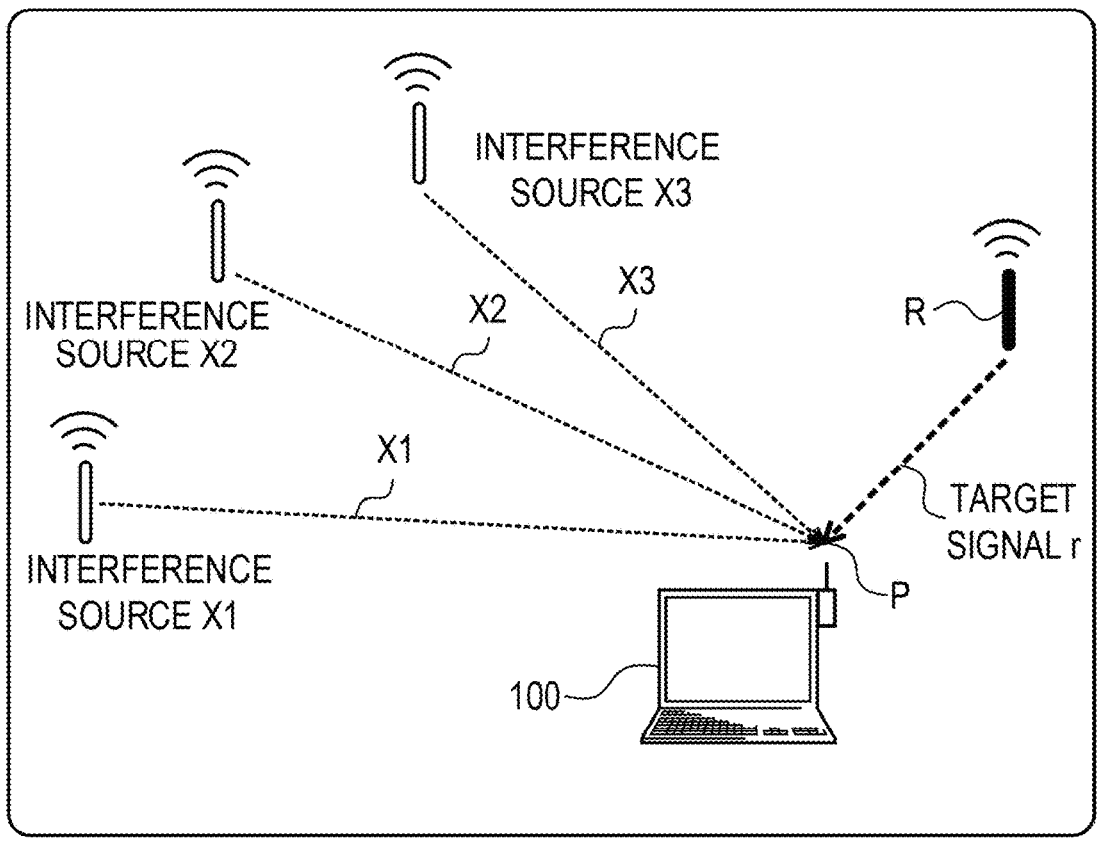

Next, as illustrated in FIG. 7B, the PER in consideration of the influence of all the interference sources Xi (X1, X2 and X3) is obtained based on the following equation (13).

$$PER = 1 - \Pi_i(1 - PER_i) \quad (13)$$

The above equation (13) corresponds to the above equation (2).

Figure 8:
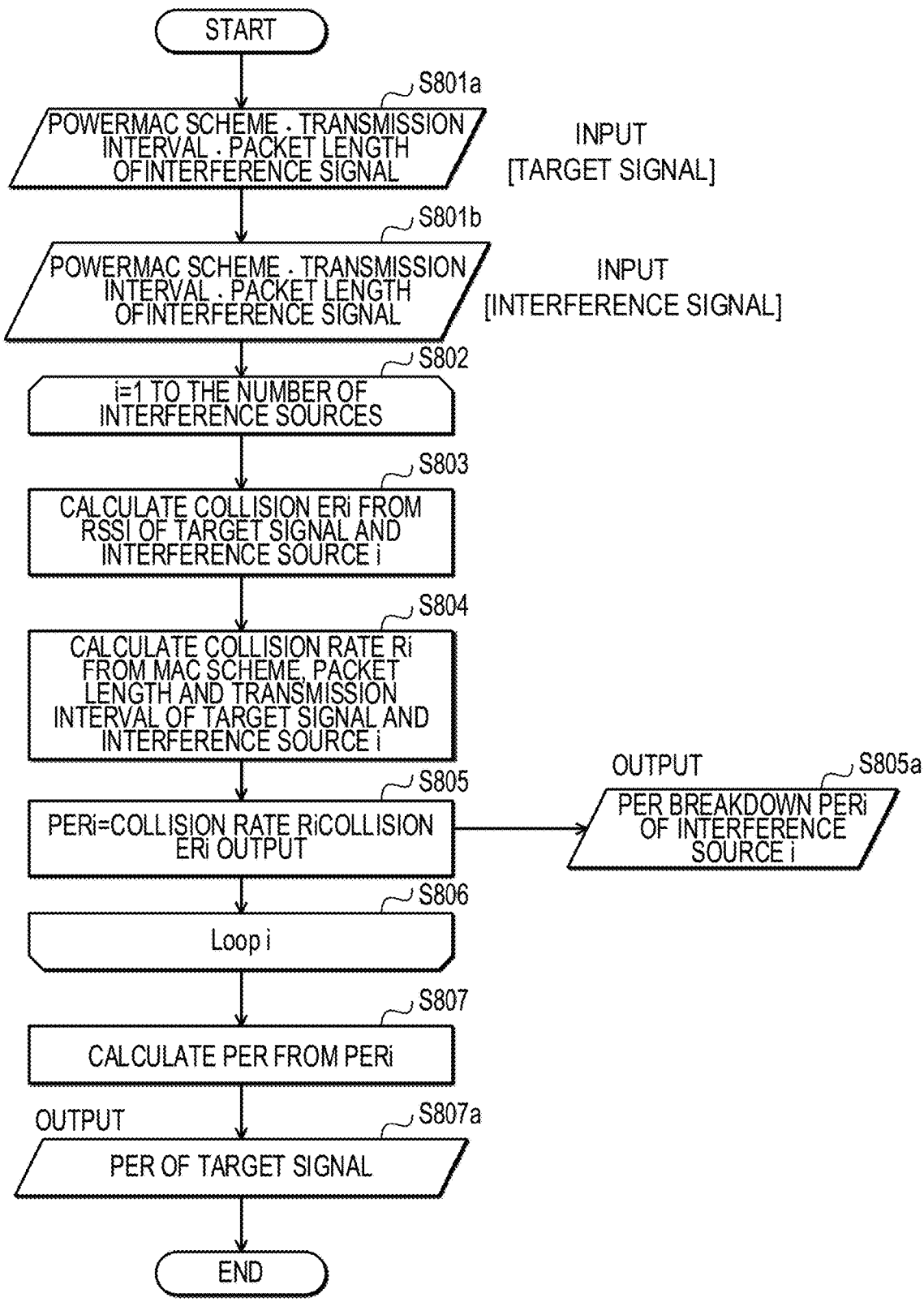
FIG. 8 is a flowchart illustrating an example of a process of an interference countermeasure performed by the radio wave interference analysis apparatus according to the first embodiment.

FIG. 8 is a flowchart illustrating an example of a process of an interference countermeasure performed by the radio wave interference analysis apparatus according to the first embodiment.

First, the wireless unit 102 (the radio wave visualization unit 201) conducts electrometry at a predetermined observation time and acquires the power, MAC scheme, transmission interval, and packet length of the target signal r (operation S801a) and the power, MAC scheme, transmission interval and packet length of the interference signal x (operation S801b).

Next, the terminal device 101 (CPU 301) starting to execute each operation of the PER calculation first sets an interference source X number i to an initial value of 1 and continues the following operations until the number i is reached (operation S802).

Then, the terminal device 101 calculates the collision ERi from the RSSI of the target signal r and the interference signal xi of the interference source i (operation S803). Further, the terminal device 101 calculates the collision rate Ri from the MAC scheme, packet length, and transmission interval of the target signal r and the interference signal x of the interference source i (operation S804). Either of the operations S802 and S803 may be executed first.

Next, the terminal device 101 calculates the probability PERi of the failure of the reception of the target signal r due to the collision with the packets of the interference source i (operation S805). For example, PERi is calculated based on the above equation (12). At this time, the terminal device 101 displays and outputs the fact indicating that the calculated PERi is the probability of failure of reception of the target signal r due to the interference source i (operation S805a).

Then, the terminal device 101 continues the above PERi calculation operation by the interference source number i (operation S806). After multiple PERi for the interference source number i are obtained in operation S806, the terminal device 101 calculates the PER from PERi (operation S807) and ends the above process. The PER is calculated, for example, based on the above equation (13). At this time, for example, the terminal device 101 displays and outputs the fact indicating that the calculated PER is the probability PER of reception failure of packets of the target signal r due to collision with packets of one interference source i among all interference sources I (operation S807a)

According to the first embodiment described above, in response to the influence of interference signals of plural interference sources on a target signal of an evaluation target, PERi for each interference source and all PERs of interference source PERi are obtained. The effect of the interference for each interference source can be grasped by PERi, so that effective interference countermeasures may be provided. For example, it is possible to provided interference countermeasures such as removing interference sources with larger PERi preferentially as described above (see FIG. 1).

The PERi is calculated using the collision rate Ri and collision ERi of the target signal and the interference signal. The collision rate Ri is calculated by determining the presence/absence of CSMA/CA by using, for example, the MAC scheme, packet length, and transmission interval of the interference signal and the target signal. The collision ERi is calculated using, for example, a modulation method, a detection method, the number of packet bits, in addition to SINR. For this reason, PERi of the target signal can be more accurately calculated than the conventional techniques in which PER is simply calculated by SINR.

For example, even with the same SINR, the PER varies depending on the occupancy rate of the interference source and an accurate PER can be obtained based on this occupation rate and the SINR. This makes it possible for the radio wave interference analysis apparatus to appropriately provide to a user the radio wave conditions and interference countermeasure by which a new wireless device introduced in an area in which various communication methods are mixed is affected.

Second Embodiment

Next, a second embodiment will be described. A radio wave interference analysis apparatus 100 according to the second embodiment arbitrarily selects one of plural wireless systems (different networks NW) and obtains an interference influence with a wireless device of the selected wireless system (network) assumed as an evaluation target R.

The second embodiment corresponds to the following analysis examples 1 and 2.

In the analysis example 1, one of the established wireless systems is assumed as an evaluation target R. In this case, one of the wireless systems (wireless devices) installed at an introduction point is selected as the evaluation target R and PER of a target signal r is calculated with wireless systems (wireless devices) other than the evaluation target R assumed as interference sources X.

In the analysis example 2, the interference influence of the evaluation target R is obtained in a state where the evaluation target R is not installed at the introduction point.

In this case, information on the evaluation target R not yet installed is input and electrometry is performed on the already-introduced wireless system (wireless device) to calculate the PER of the target signal r.

Figure 9:
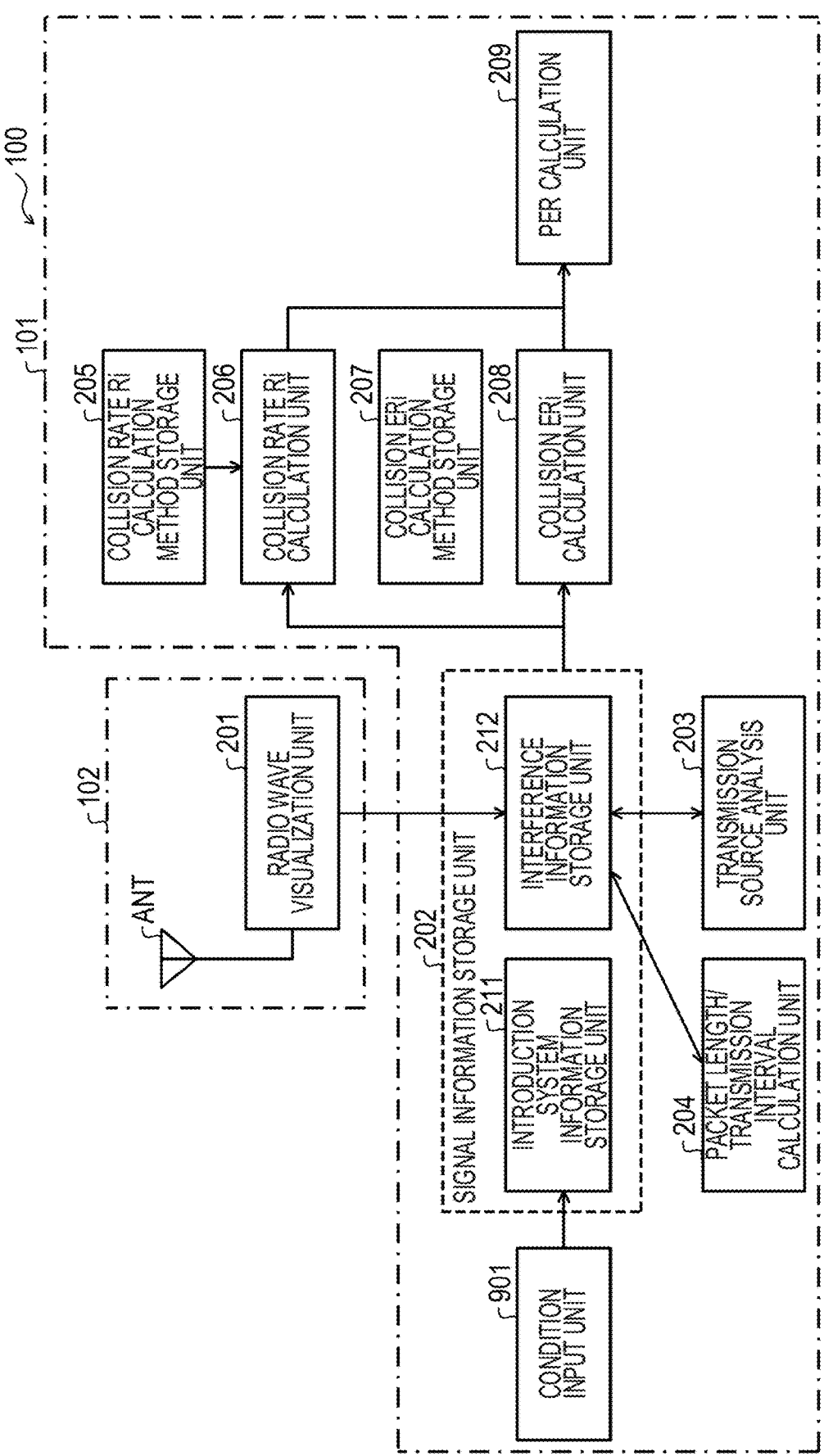
FIG. 9 is a block diagram illustrating a function of a radio wave interference analysis apparatus according to a second embodiment.

FIG. 9 is a block diagram illustrating the function of the radio wave interference analysis apparatus according to the second embodiment. The same components as those in the first embodiment (see FIG. 2) will be denoted by the same reference numerals as used in the first embodiment.

The radio wave visualization unit 201 acquires the communication state of the interference signal x at the reception point P through actual radio wave measurement (electrometry) via the antenna ANT for a predetermined observation time and stores information on the interference signal x in the interference wave information storage unit 212. The transmission source analysis unit 203 and the packet length/transmission interval calculation unit 204 store the information of the transmission source (interference source X) and the packet length and transmission interval of the interference signal x as information (parameters) on the interference signal x in the interference wave information storage Section 212.

Information corresponding to the above analysis examples 1 and 2 is input to a condition input unit 901. For the analysis example 1, information designating a network NW of the evaluation target R of the established wireless systems is input. In this case, when the network designated as the evaluation target R is, for example, NW-1, the other wireless systems are set as interference sources X.

For the analysis example 2, information on a newly introduced evaluation target (wireless device) R is input. That is, information substituting the electrometry is directly input. In this case, the information of the evaluation target R stored in the introduction system information storage unit 211 of the signal information storage unit 202 is input from the condition input unit 901. For example, a user inputs, for example, the information of the evaluation target R, the packet length and transmission interval of the target signal r from the condition input unit 901 and stores the information in the introduction system information storage unit 211.

Figure 10:
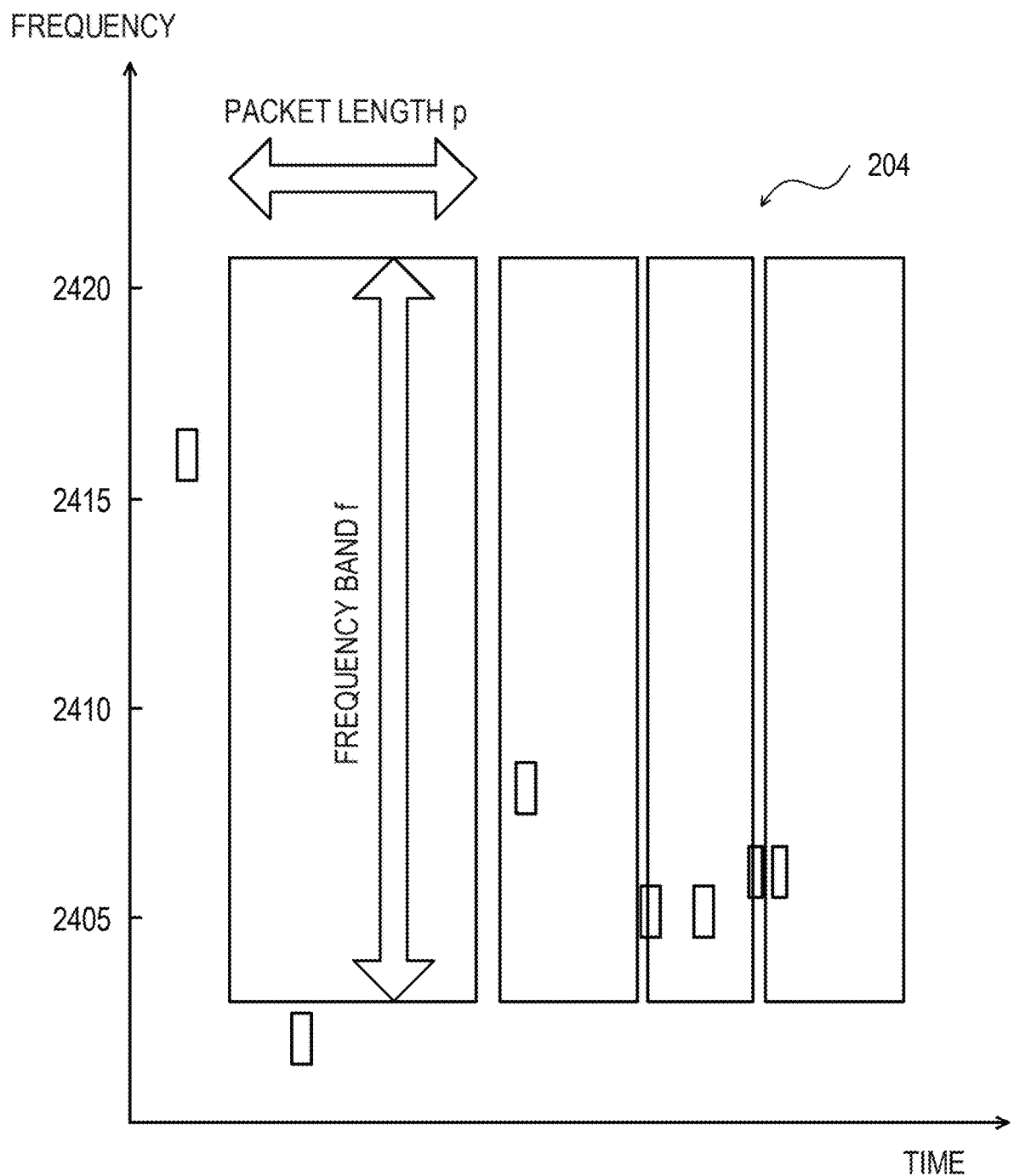
FIG. 10 is a view for explaining a packet detection by a packet detection unit of the radio wave interference analysis apparatus.

FIG. 10 is a diagram for explaining packet detection by a packet detection unit of the radio wave interference analysis apparatus. The packet detection unit corresponds to the packet length/transmission interval calculation unit 204 in the first embodiment and has a general spectrogram function.

In the spectrogram illustrated in FIG. 10, the horizontal axis represents time and the vertical axis represents a frequency. The packet detection unit (packet length/transmission interval calculation unit) 204 specifies the standard of a received packet based on, for example, the frequency band f, packet length p, spectrum shape, preamble information, reception time, and the RSSI of an electrometered packet. In the second embodiment, the standard of a packet of a measured interference signal x is specified. In the first embodiment, the standard of packets of electrometered target signal r and interference signal x are specified.

Figure 11:
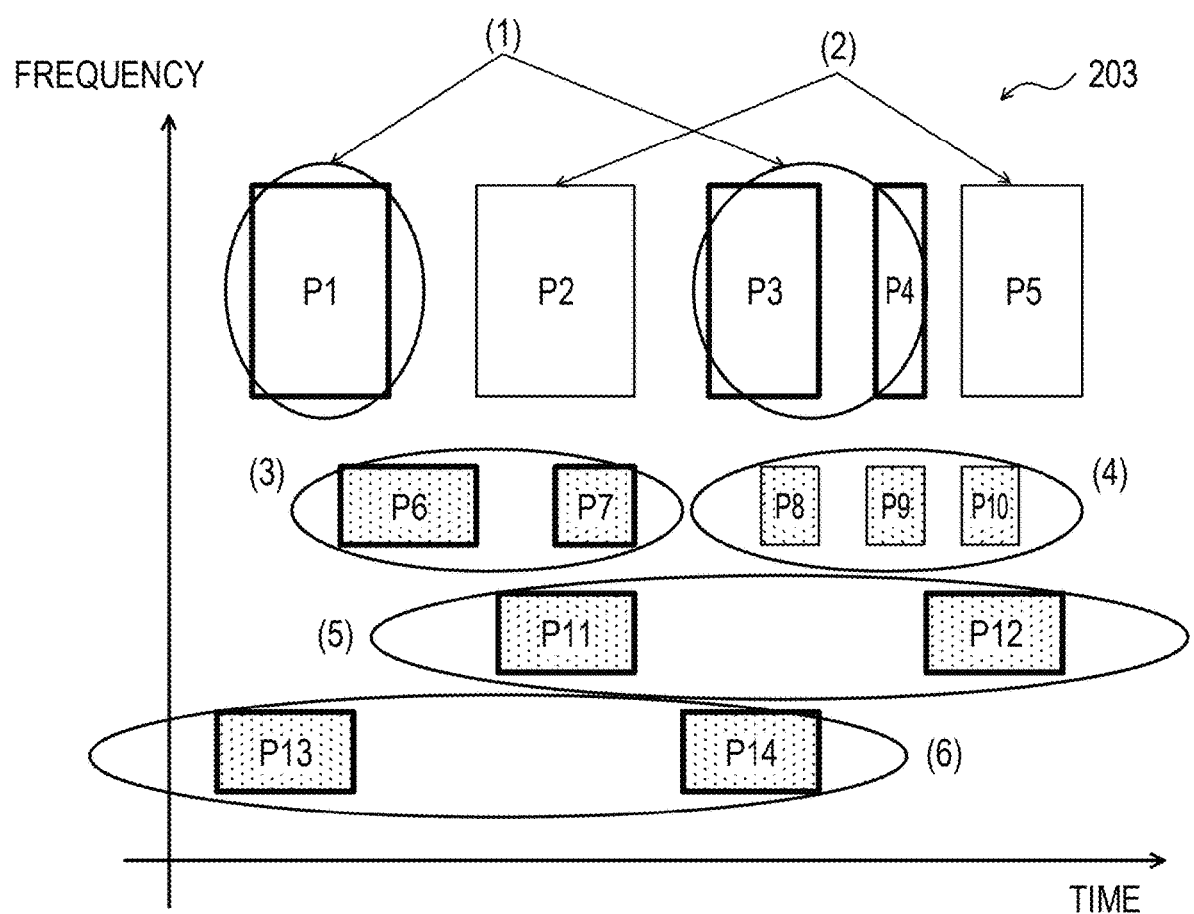
FIG. 11 is a view for explaining specification of a packet transmission source by a transmission source analysis unit of the radio wave interference analysis apparatus.

FIG. 11 is a diagram for explaining the specification of a transmission source of a packet by a transmission source analysis unit of the radio wave interference analysis apparatus. In FIG. 11, the horizontal axis represents time and the vertical axis represents a frequency. The transmission source analysis unit 203 specifies a transmission source for each packet based on the information on the standard of each packet specified by the packet detection unit (packet length/transmission interval calculation unit) 204. The function of the transmission source analysis unit 203 also corresponds to a general spectrogram function.

Specifically, packets having the same standard, RSSI, and frequency band are determined to have the same transmission source, and the transmission source of each packet is specified. In the example of FIG. 11, packets P1, P3, and P4 are specified as the same transmission source (1) based on the standard, RSSI, and frequency band. Packets P2 and P5 are specified as the same transmission source (2). Packets P6 and P7 are specified as the same transmission source (3). Packets P8, P9 and P10 are specified as the same transmission source (4). Packets P11 and P12 are specified as the same transmission source (5). Packets P13 and P14 are specified as the same transmission source (6).

As a result, the transmission source may be specified for each packet of the electrometered target signal r and interference signal x.

Figure 12A:
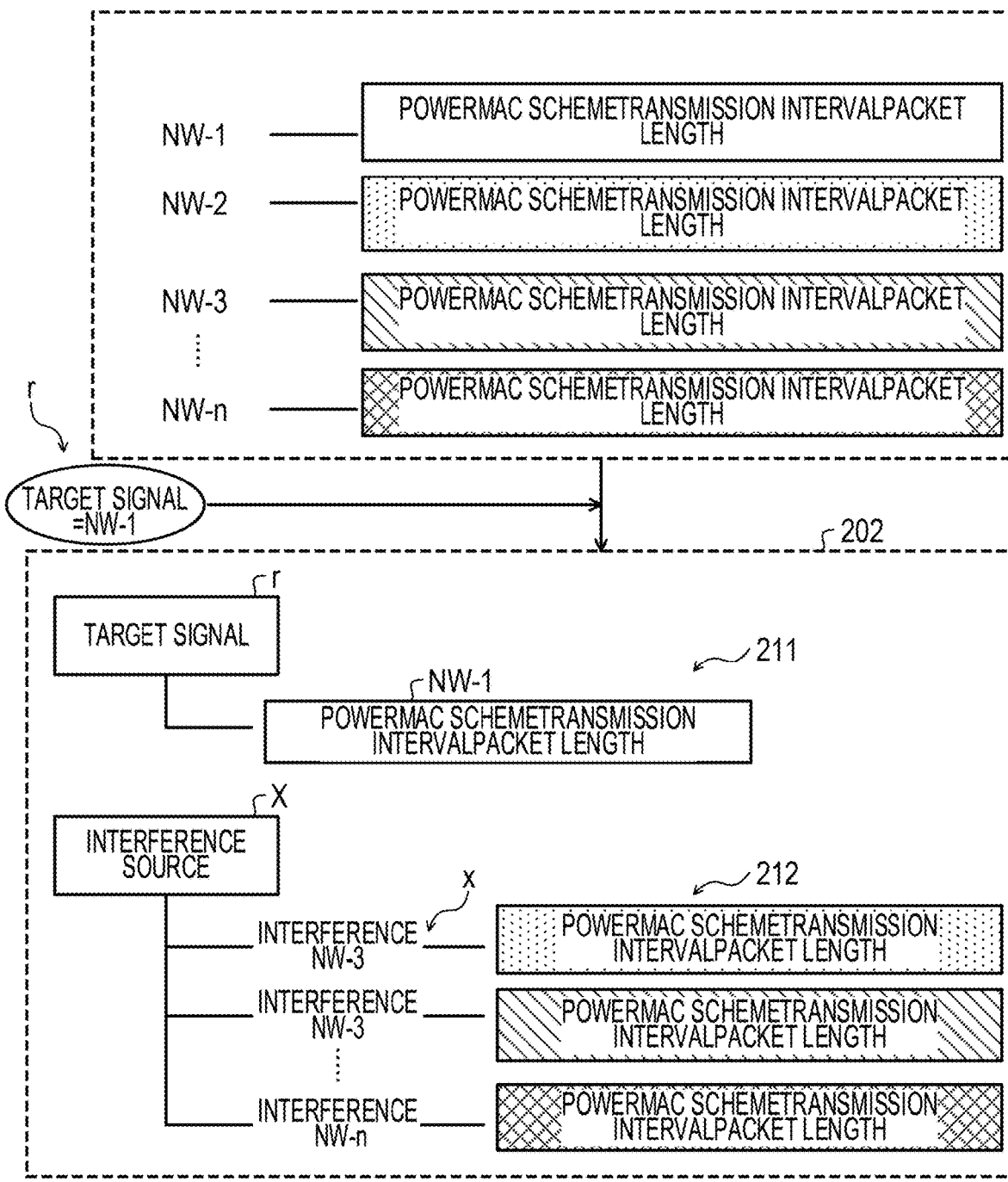
FIG. 12A is a diagram (Part 1) illustrating an example of information held by the radio wave interference analysis apparatus according to the second embodiment.
Figure 12B:
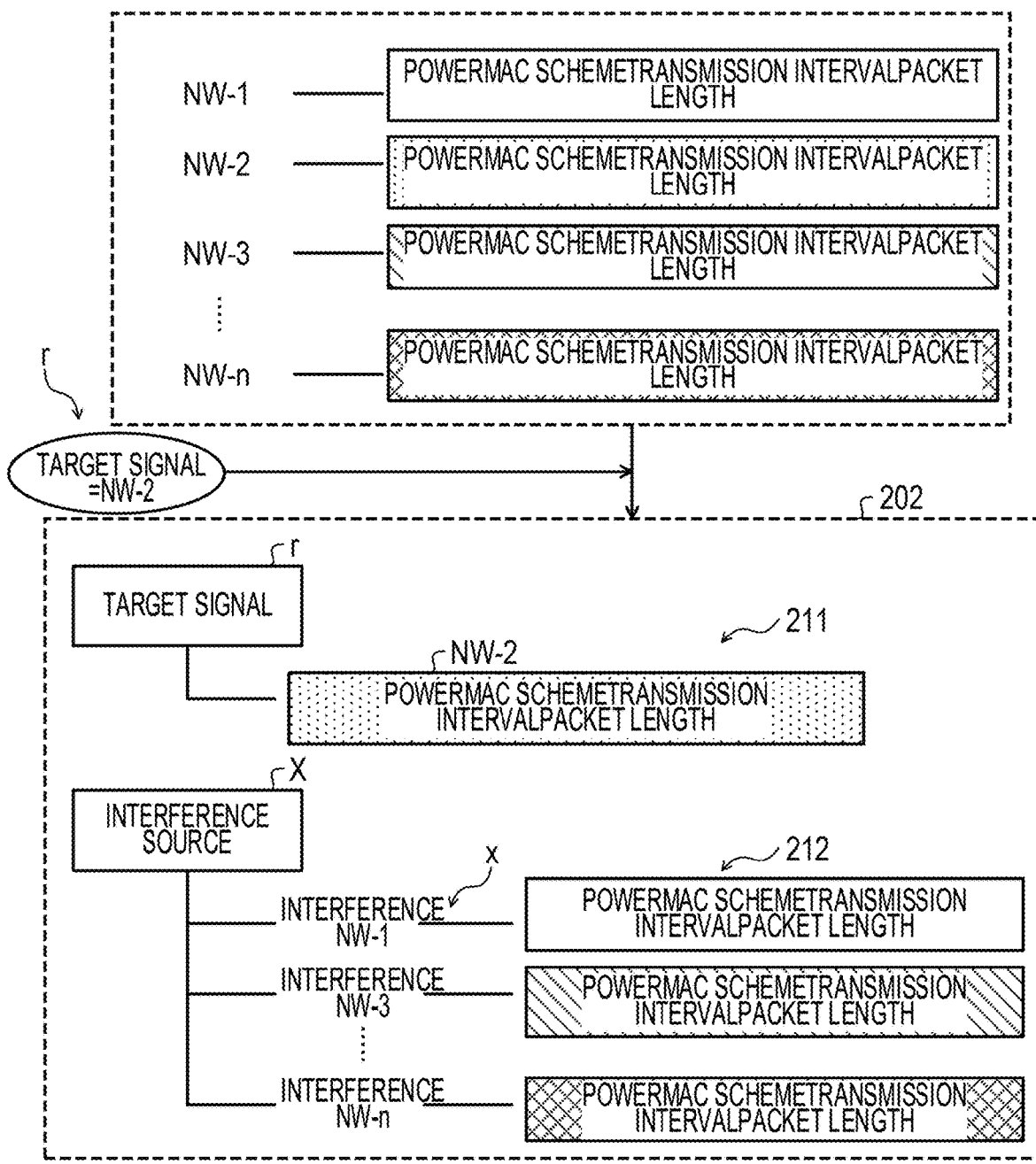
FIG. 12B is a diagram (Part 2) illustrating an example of the information held by the radio wave interference analysis apparatus according to the second embodiment.

FIGS. 12A and 12B are diagrams illustrating an example of information held by the radio wave interference analysis apparatus according to the second embodiment. These figures correspond to the analysis example 2, in which other networks are specified as interference sources X by selecting an already introduced and set evaluation target R.

The radio wave interference analysis apparatus 100 performs electrometry on packets of plural networks NW-1 to NW-n at an installation point to acquire parameters (e.g., power, MAC scheme, transmission interval, and packet length). For example, when an evaluation target R is designated with a network NW-1 by user input, the target signal r is NW-1 as illustrated in FIG. 12A. In this case, the radio wave interference analysis apparatus 100 specifies networks NW-2, NW-3, . . . , NW-n other than the network NW-1 as interference signals x for the target signal r.

When a network to which the evaluation target R belongs is NW-2, the target signal r is designated as NW-2 by user input, as illustrated in FIG. 12B. In this case, the radio wave interference analysis apparatus 100 specifies networks NW-1, NW-3, . . . , NW-n other than the network NW-2 as interference signals x for the target signal r. In this manner, for the analysis example 2, a network of the evaluation target R may be specified by user input to the radio wave interference analysis apparatus 100.

As illustrated in FIGS. 12A and 12B, the power, MAC scheme, transmission interval, and packet length of the target signal r are stored as the information of the target signal r in the introduction system information storage unit 211 of the signal information storage unit 202. Then, in a case where there are two evaluation targets R (NW-1 and NW-2), the influence of the interference signal x suffering from a network other than the target signal r of each evaluation target R can be determined. That is, it is possible to determine the influence of interference on each of plural evaluation targets R.

In addition, the power, MAC scheme, transmission interval, and packet length of each interference signal x of a network (interference source X) other than the target signal r are stored as the information of the interference signal x in the interference wave information storage unit 212 of the signal information storage unit 202.

Figure 13:
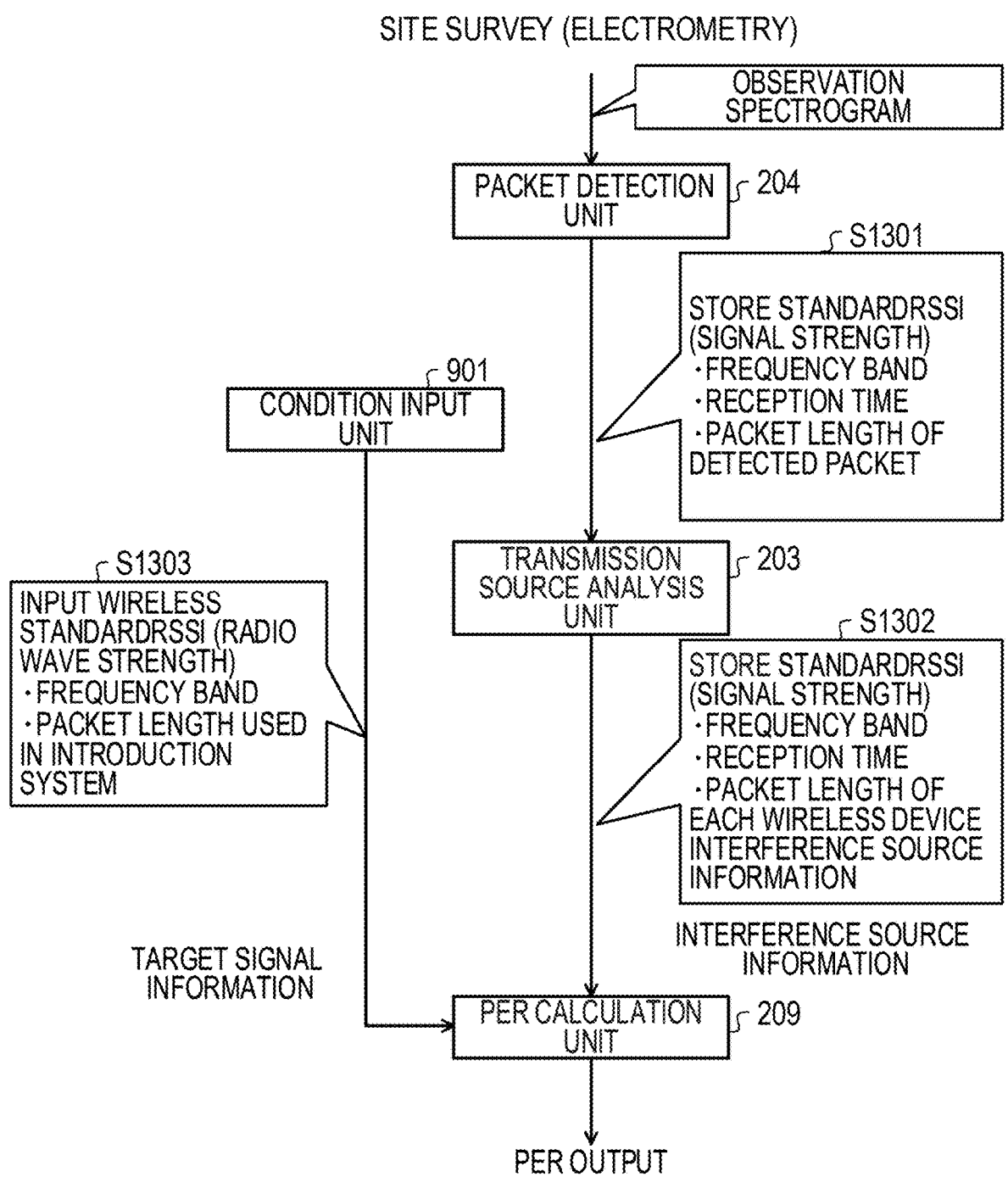
FIG. 13 is a flowchart illustrating an example of a process of an interference countermeasure by the radio wave interference analysis apparatus according to the second embodiment.

FIG. 13 is a flowchart illustrating an example of a process of an interference countermeasure by the radio wave interference analysis apparatus according to the second embodiment. The flowchart of FIG. 13 involves mainly in the analysis example 1, in which a process related to PER estimation performed by the radio wave interference analysis apparatus 100 by site survey and information input of the evaluation target R is extracted and illustrated. In the process of FIG. 13, the information on the evaluation target R is input by a user in a state where the evaluation target R is not installed.

The radio wave interference analysis apparatus 100 acquires information on packets related to the interference signal x by site survey, that is, electrometry, by the radio wave visualization unit 201 and stores and holds parameters (e.g., power, MAC scheme, transmission interval, and packet length) of the interference signal x in the interference wave information storage unit 212.

The packet detection unit (packet length/transmission interval calculation unit) 204 detects, for example, the standard, RSSI, frequency band, reception time, and packet length of a detected packet based on an observation spectrogram. Then, the information on each interference signal x (see FIG. 10) is stored in the interference wave information storage unit 212 (operation S1301). The transmission source analysis unit 203 specifies each interference source X (wireless device of a network) that transmitted the interference signal x (each packet) by, for example, the standard, RSSI, frequency band, transmission interval, and packet length of each interference signal x (see FIG. 11). Then, for example, the standard, RSSI, frequency band, transmission interval, and packet length of each interference signal x are stored in the interference wave information storage unit 212 as information of each interference signal x (operation S1302).

Information (e.g., the standard, RSSI, frequency band, and packet length of a newly introduced wireless device) on the target signal r of the evaluation target R is input to the condition input section 901 by the user (operation 51303).

The target signal r is specified by this user input, and each electrometered packet other than the target signal r becomes the interference signal x. By executing operations S1301 and S1302 after the user input of the information on the target signal r, a process related to the interference signal x can be executed in operations S1301 and S1302. Then, after the target signal r and the interference signal x are specified, PER calculation is executed by the PER calculation unit 209. The PER calculation is similar to that of the first embodiment (see FIG. 8).

In this manner, according to the second embodiment, in response to the analysis example 1, it is possible to obtain the influence of interference on the evaluation target R with other networks as interference sources X by selecting one of the established wireless devices as the evaluation target R. At this time, it is possible to obtain the influence of interference with any established wireless device (network) switched as the evaluation target R.

In addition, in response to the analysis example 2, by inputting the parameters related to the target signal r of the evaluation object R by the user and specifying the interference signal x for the electrometered packet, the target signal r is separated from the interference signal x. Then, the PER when the target signal r is affected by the interference signal x can be obtained. In this case, it is possible to easily obtain the PER assuming the case where the evaluation target R is placed in the introduction point without actually setting a newly introduced evaluation target R at the introduction point.

Third Embodiment

Next, a third embodiment will be described. In the third embodiment, the PER of the target signal r at a reception point P is calculated in a state where neither the evaluation target R nor the interference source X is installed at the introduction point. A radio wave interference analysis apparatus 100 of the third embodiment inputs both the information of the target signal r and the information of the interference signal x by the user and calculates the PER of the target signal r by radio wave propagation simulation.

Figure 14:
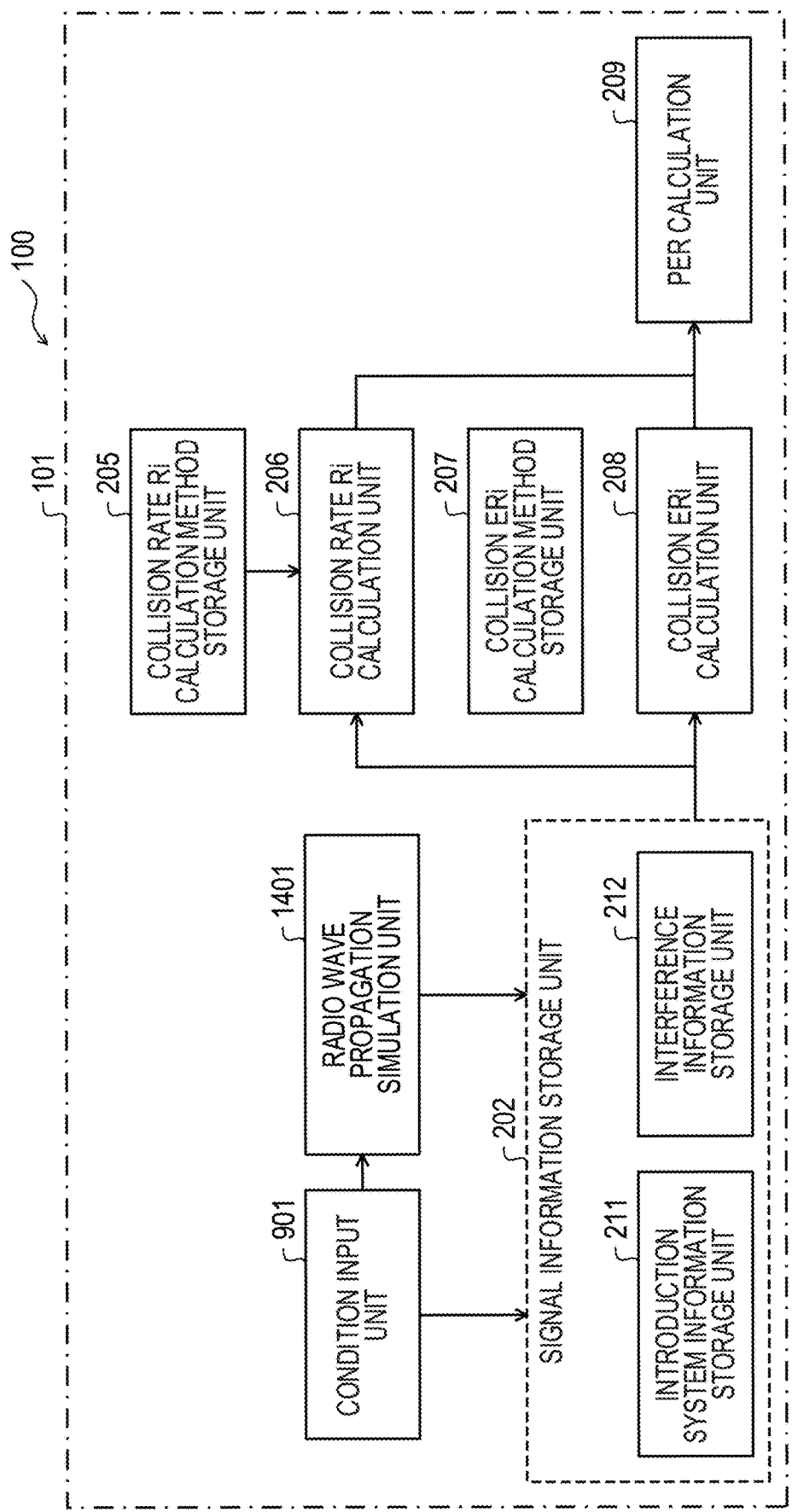
FIG. 14 is a block diagram illustrating a function of a radio wave interference analysis apparatus according to a third embodiment.

FIG. 14 is a block diagram illustrating the function of the radio wave interference analysis apparatus according to the third embodiment. The same components as those of the second embodiment (see FIG. 9) will be denoted by the same reference numerals as used in the second embodiment.

In the third embodiment, since no electrometry is performed, the radio wave interference analysis apparatus 100 can be configured with only the terminal device 101 without using the radio wave visualization unit 201 (wireless unit 102). The terminal device 101 includes a radio wave propagation simulation unit 1401, which can make the transmission source analysis unit 203 and the packet length/transmission interval calculation unit 204 unnecessary. Information on the interference signal x of the interference source X and the target signal r of the evaluation target R is input by the user to the condition input unit 901.

Then, the radio wave propagation simulation unit 1401 simulates radio wave propagation of the interference signal x and the target signal r based on the information on the target signal r and interference signal x input from the condition input unit 901. The radio wave propagation simulation unit 1401 is a general one and simulates the radio wave propagation of the interference signal x and the target signal r based on, for example, the layout of the introduction installation point of the evaluation target R, the information of the established wireless device (network), or the information of a newly introduced evaluation target R.

Figure 15:
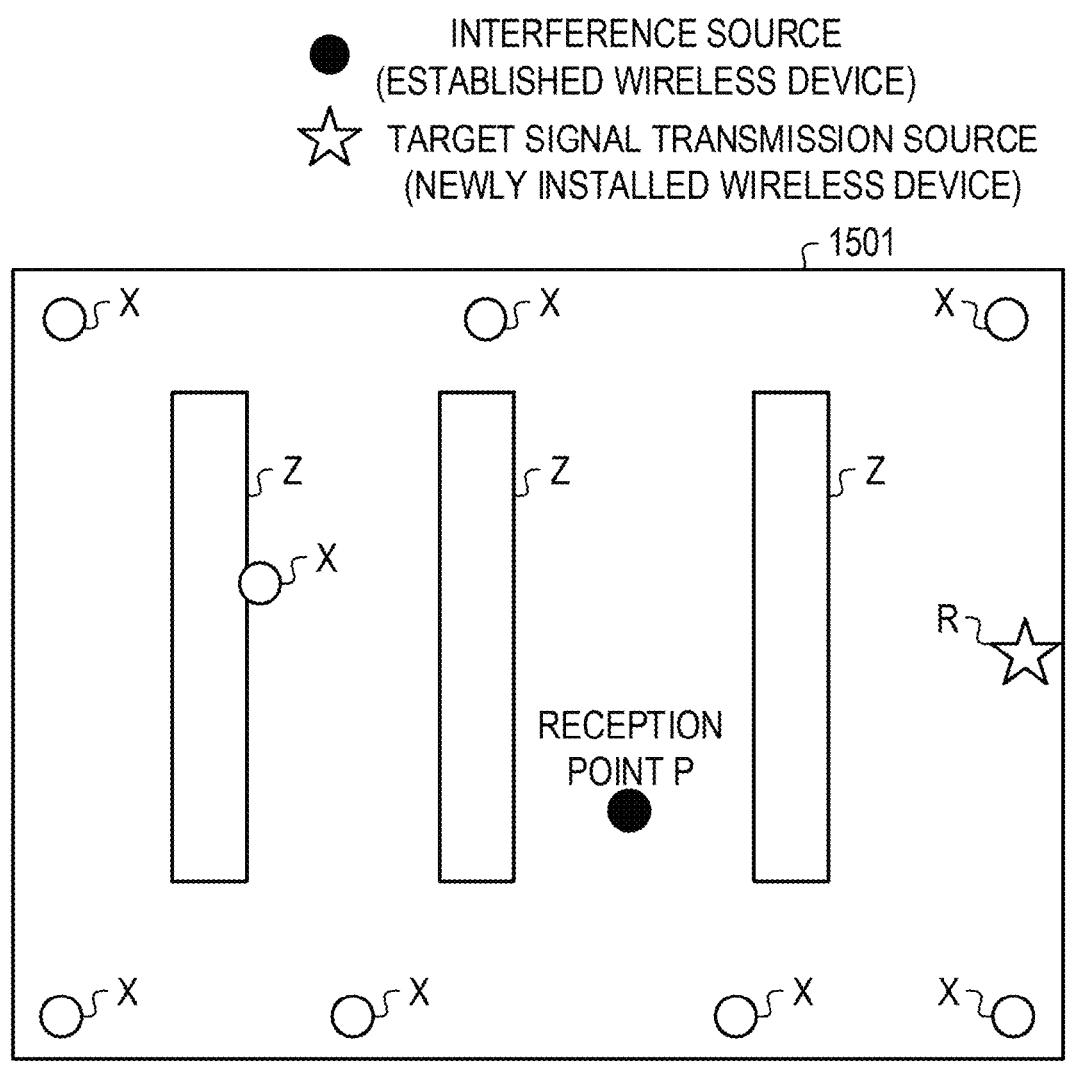
FIG. 15 is a view for explaining a radio wave propagation simulation performed by the radio wave interference analysis apparatus according to the third embodiment.

FIG. 15 is a view for explaining a radio wave propagation simulation performed by the radio wave interference analysis apparatus according to the third embodiment. FIG. 15 is a plan view of a place (room 1501) where a new evaluation target R is introduced. The radio wave propagation simulation unit 1401 uses, as information on the layout of the introduction destination, information on an installation location of the radio wave interference analysis apparatus 100 (reception point P), an installation location of the interference source X (e.g., established wireless device) in the room 1501 and an installation location of the evaluation target R. When there is a shield Z shielding radio waves in the room 1501, the installation information of the shield Z is also used to simulate the radio wave propagation of the interference signal x and the target signal r.

Figure 16:
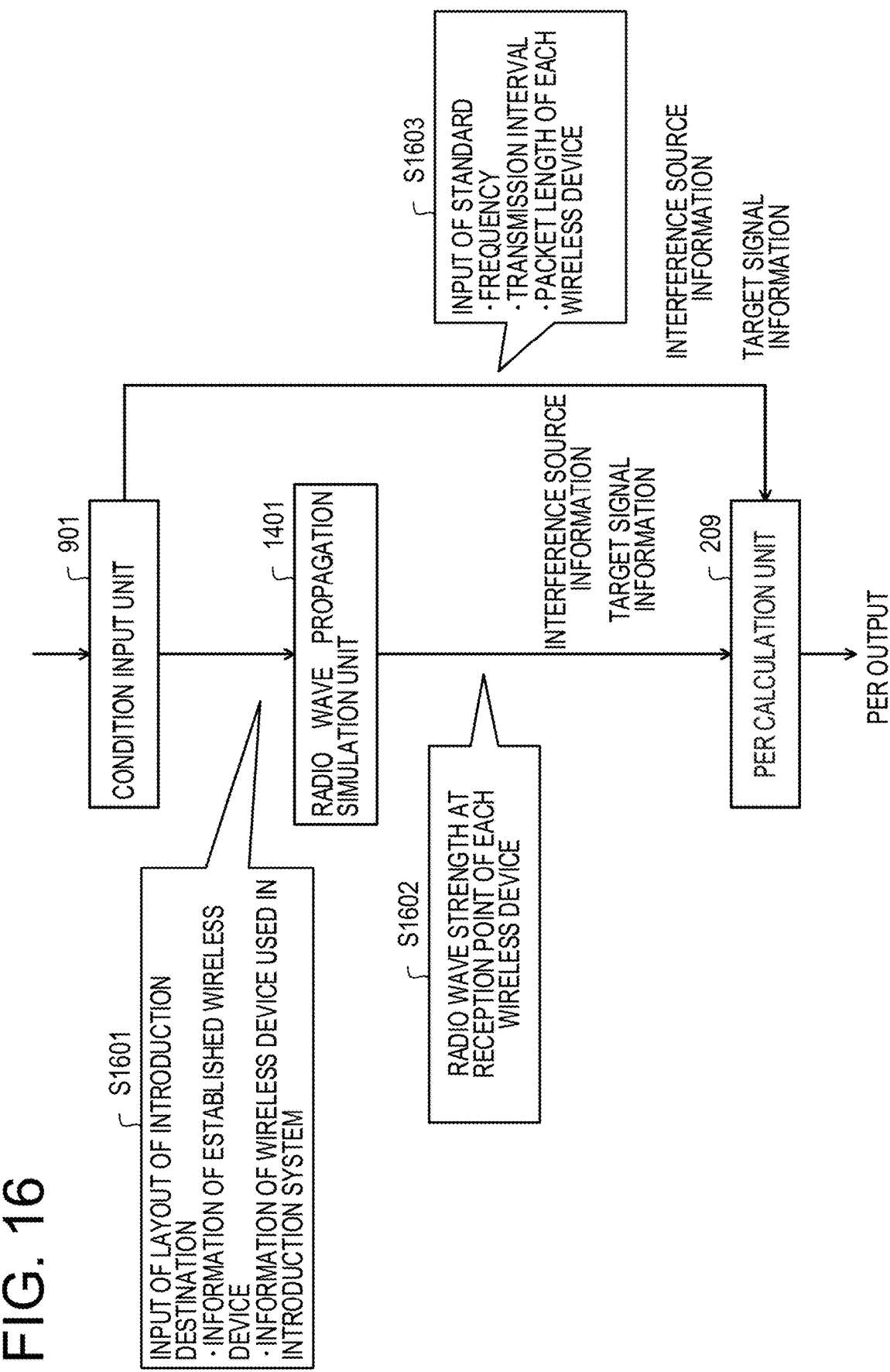
FIG. 16 is a flowchart illustrating an example of a process of an interference countermeasure by the radio wave interference analysis apparatus according to the third embodiment.

FIG. 16 is a flowchart illustrating an example of a process of interference countermeasure by the radio wave interference analysis apparatus according to the third embodiment. FIG. 16 mainly illustrate a process of estimating the PER by conducting the radio wave propagation simulation by the radio wave interference analysis apparatus 100 under condition input.

Information (parameters) such as the layout of the room 1501 of the introduction destination, the standard of the established wireless device (serving as an interference source), and the standard of a newly introduced evaluation target R (wireless device) is input by the user to the condition input unit 901 of the radio wave interference analysis apparatus 100 (operation S1601).

Then, the radio wave propagation simulation unit 1401 simulates the radio wave strength of the interference signal x of each wireless device (interference source X) at the reception point P and the target signal r of the evaluation target R based on the input layout and wireless device information (operation S1602).

Further, the information (e.g., the standard, frequency, transmission interval, and packet length) of the interference signal x of each wireless device (interference source X) and the target signal r of the evaluation target R is input in advance by the user to the condition input unit 901 (operation S1603).

Then, the PER calculation unit 209 executes PER calculation based on the radio wave strength at the reception point P of each wireless device output by the radio wave propagation simulation unit 1401 and the information on each wireless device input by the user via the condition input unit 901. The PER calculation is similar to that of the first embodiment (see FIG. 8).

In this manner, according to the third embodiment, the parameters related to the target signal r of the evaluation target R and the interference signal x of the interference source X and the layout information of the introduction point of the evaluation target R are input by the user, and the radio wave propagation simulation is conducted to obtain the reception strength of each signal at the reception point P. Then, the PER when the target signal r is affected by the interference signal x can be obtained. According to the third embodiment, even when a newly introduced evaluation target R and further an interference source X are not actually installed, it is possible to easily obtain the PER assuming the case where the evaluation target R and the interference source X are arranged at the introduction point.

Fourth Embodiment

Next, a fourth embodiment will be described. According to the first to third embodiments described above, it is possible to obtain the PER of the target signal r of the evaluation target R in a case where there exists an influence by the interference signal x. The fourth embodiment is configured to search for a more appropriate channel (frequency) after the PER calculation unit 209 described in the first to third embodiments (e.g., FIGS. 2, 9, and 14) described above obtains the PER.

Figure 17:
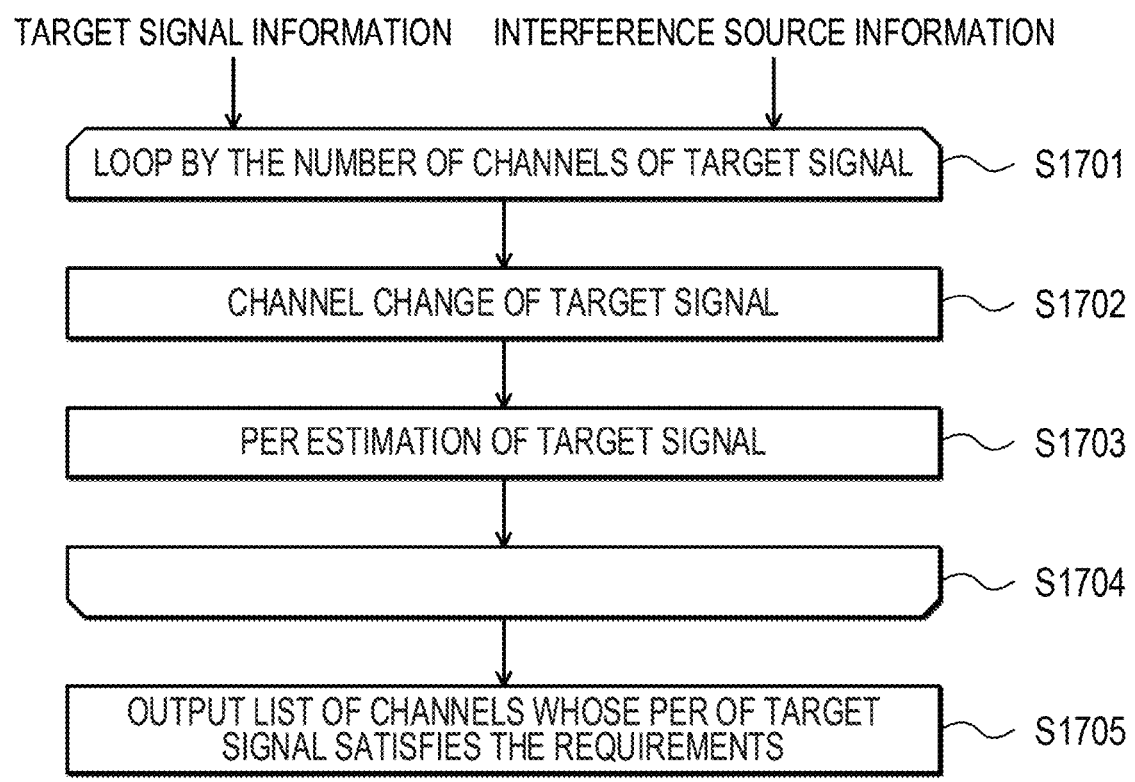
FIG. 17 is a flowchart illustrating an example of a process of an operation channel determination by a radio wave interference analysis apparatus according to a fourth embodiment.

FIG. 17 is a flowchart illustrating an example of a process of determining an operation channel by the radio wave interference analysis apparatus according to the fourth embodiment. FIG. 17 mainly illustrates the processing contents of the PER calculation unit 209 of the radio wave interference analysis apparatus 100 and a process of searching for an appropriate operation channel of the target signal r based on the PER. The processing contents of the PER calculation itself performed by the PER calculation unit 209 is the same as that of the first embodiment (see FIG. 8).

Information of the target signal r and information of the interference signal x are input by the user to the PER calculation unit 209 via the condition input unit 901. For example, information such as the channel (frequency) and transmission power of the target signal r and the interference signal x is input.

Based on the input information of the channel (frequency) of the target signal r and the interference signal x, the PER calculation unit 209 loops the following process by the number of channels of the target signal r (operation S1701). First, the PER calculation unit 209 changes the channel of the target signal r in response to the input (operation S1702).

Then, the PER calculation unit 209 estimates the PER for the channel of the target signal r (operation S1703). The PER calculation unit 209 repeatedly executes this PER estimation process by the number of channels of the target signal r (operation S1704). By searching for all the channels, the PER calculation unit 209 outputs a list of channels whose PER of the target signal r satisfies the requirements (operation S1705).

Figure 18:
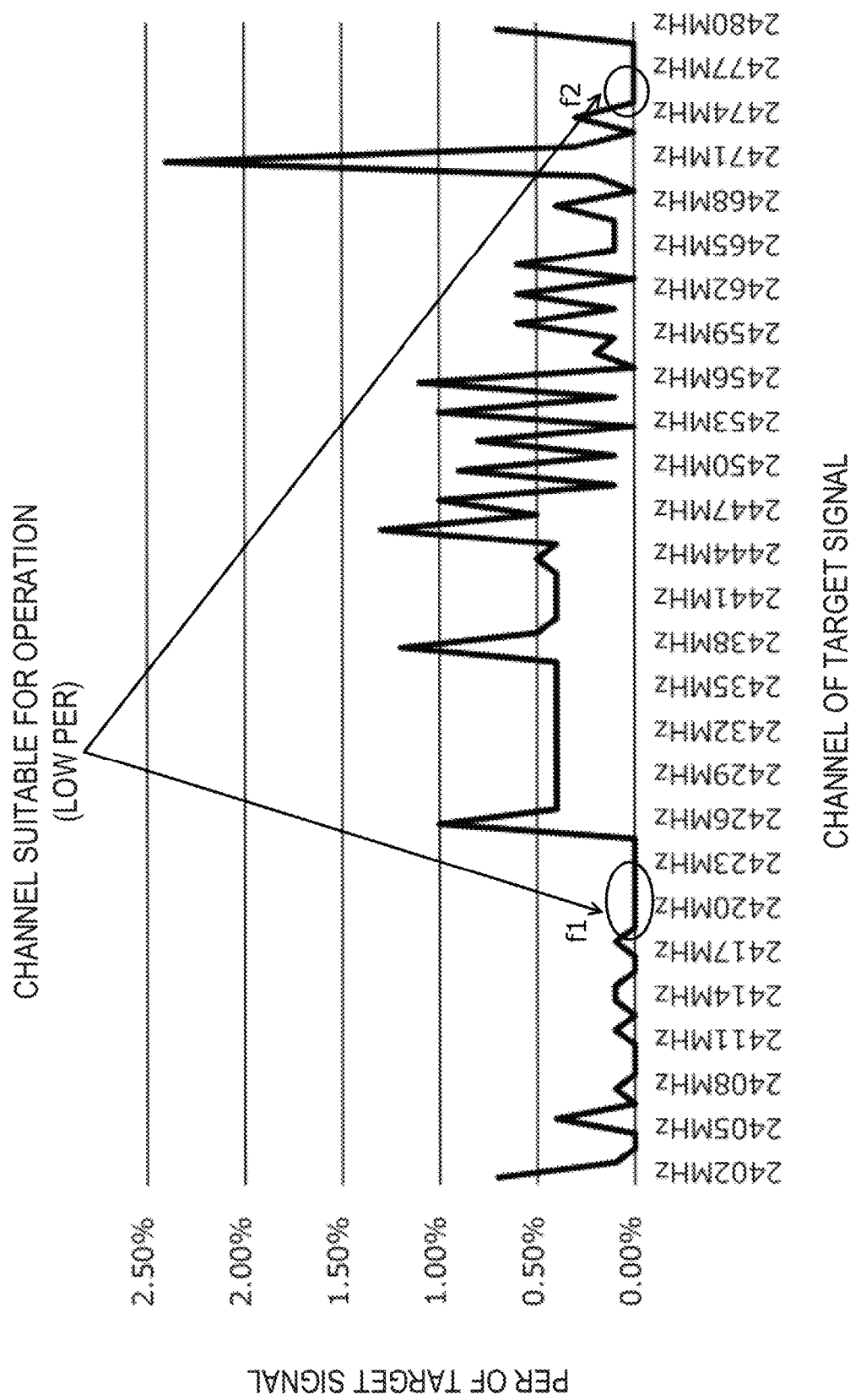
FIG. 18 is a diagram for explaining operation channel search by the radio wave interference analysis apparatus according to the fourth embodiment.

FIG. 18 is a diagram for explaining the search of the operation channel by the radio wave interference analysis apparatus according to the fourth embodiment. The horizontal axis represents a channel (frequency) of the target signal r and the vertical axis represents the PER of the target signal r.

According to the process of FIG. 17, the PER calculation unit 209 performs search (scanning) while varying the channel for the target signal r to obtain the PER for each channel (the state of FIG. 18). Then, the PER calculation unit 209 selects a channel suitable for operation from all the channels of the target signal r. In the example illustrated in FIG. 18, the PER calculation unit 209 determines that a channel with lower PER (e.g., frequencies f1, f2) is suitable for operation, and outputs a list of channels with these frequencies f 1 and f 2.

In this manner, according to the fourth embodiment, by searching while varying the channel (frequency) of the target signal r based on the information of the target signal r of the evaluation target R and the interference signal x of the interference source X, it is possible to provide a list of channels suitable for the operation of the target signal r to the user. In the above process, the channel change of the target signal r has been explained as an example, but the provide disclosure is not limited thereto. For example, even when the transmission power of the target signal r is changed, the PER can be obtained in the similar manner. Thus, in consideration of the influence of the interference signal x, an appropriate operation channel and transmission power of the target signal r can be provided to the user.

Fifth Embodiment

Next, a fifth embodiment will be described. The fifth embodiment involves the optimization of a wireless system and has a configuration that the PER calculation unit 209 obtains the optimal PER according to the conditions (purpose) required by the user for the obtained PER, in addition to the configuration of any of the first to fourth embodiments described above.

For example, a wireless system suitable for the purpose of the user is presented by an optimization problem with the channel and power of a newly introduced evaluation target R (wireless device) and an established wireless device (interference source X) as variables. Here, the fifth embodiment addresses a trade-off between the PER of the newly introduced evaluation target R and the PER of the established wireless device.

(1) For example, for the purpose of maximizing the performance of the newly introduced wireless device (evaluation target R), the objective function is "PER of evaluation target R" and the constraint conditions are "PER of established wireless device≤user's required performance."

(2) In addition to this, for the purpose of minimizing the influence of the newly introduced wireless device (evaluation target R) on the established wireless device, the objective function is "the total value of PER deterioration amount of established wireless device" and the constraint conditions are "PER of newly introduced wireless device≥user's required performance."

Figure 19:
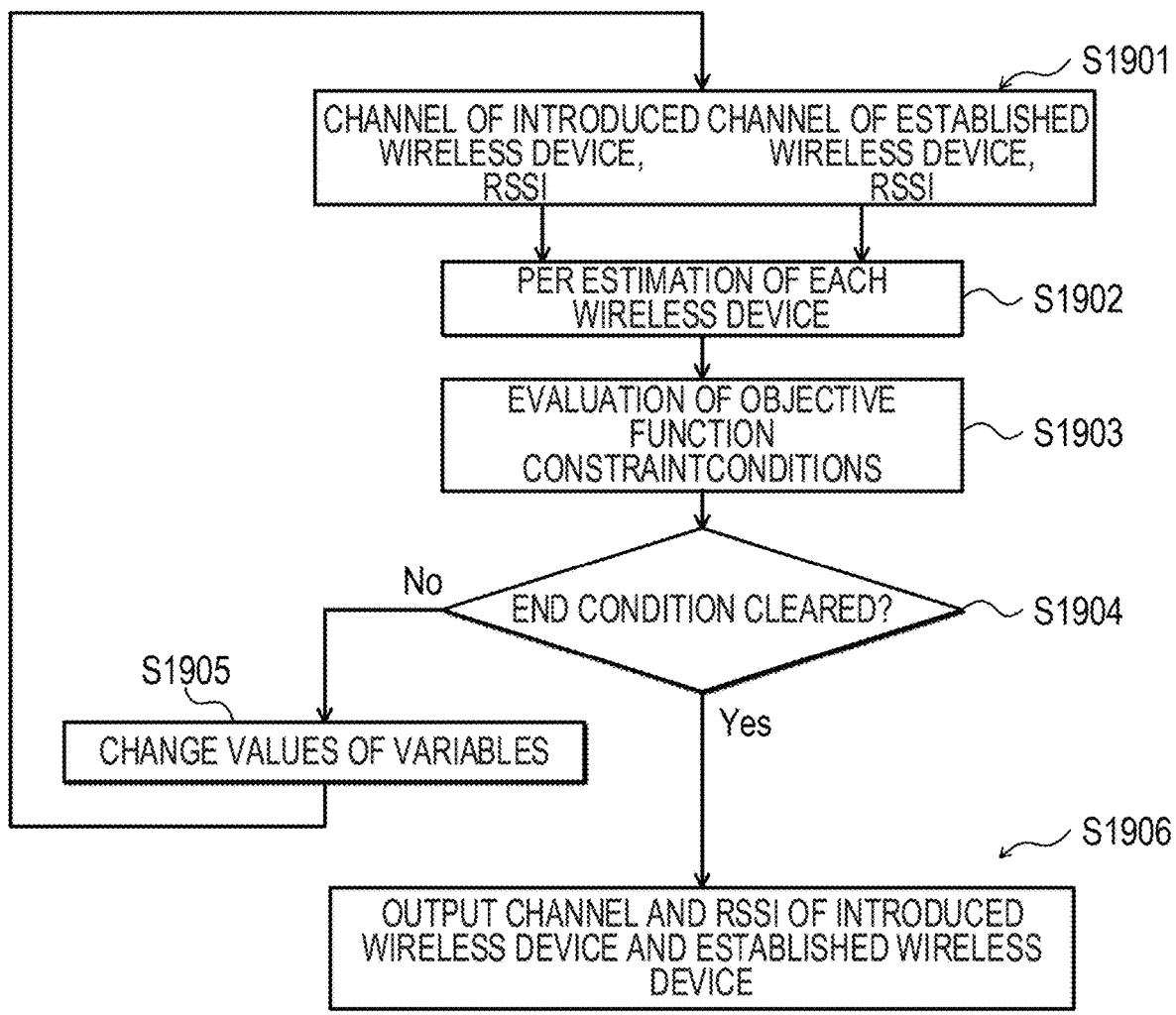
FIG. 19 is a flowchart illustrating an example of an optimization process of a wireless system by a radio wave interference analysis apparatus according to a fifth embodiment.

FIG. 19 is a flowchart illustrating an example of an optimization process of the radio system by the radio wave interference analysis apparatus according to the fifth embodiment. FIG. 19 mainly illustrates the processing contents of the PER calculation unit 209 of the radio wave interference analysis apparatus 100 and a process of optimizing a wireless system according to the purpose based on the evaluation of the objective function and the constraint conditions based on the PER of the newly introduced wireless device (evaluation target R) and the established wireless device (interference source X). The processing contents of the PER calculation itself performed by the PER calculation unit 209 are the same as that of the first embodiment (see FIG. 8).

First, the user inputs, for example, a channel set for each of an introduced wireless device (evaluation target R) and the established wireless device (interference source X), and RSSI (operation S1901). Then, the PER calculation unit 209 estimates the PER based on, for example, the channel of each wireless device of the evaluation target R and the interference source X, and the RSSI (operation S1902).

Next, the objective function and the constraint conditions are evaluated (operation S1903). This evaluation is, for example, the above items (1) and (2) and is made by the user based on the PERs of the evaluation target R and the interference source X output from the PER calculation unit 209. Alternatively, the PER calculation unit 209 may compare the PER values and automatically execute them.

Next, the PER calculation unit 209 determines whether or not the termination conditions have been cleared (operation S1904). The termination conditions are, for example, the constraint conditions (1) and (2) set by the user. For example, an optimization algorithm such as a gradient descent method is used to find an optimal solution. Besides this, a round-robin algorithm is used to output a solution found first, in addition to enumerating all the solutions that satisfy the required performance set by the user.

When it is determined that the termination conditions have not been cleared ("No" in operation S1904), the PER calculation unit 209 changes the values of variables (operation S1905) and returns to operation S1901. The variables are, for example, the channel of the evaluation target R or the interference source X, and the RSSI. Then, only the parameters (PERs) related to the variables whose values have been changed are used to recalculate the objective function, which can result in reduction in calculation costs.

When it is determined that the termination conditions have been cleared ("Yes" in operation S1904), the PER calculation unit 209 outputs the channels and RSSIs of the newly introduced wireless device (evaluation target R) and the established wireless device (interference source X) (operation S1906).

In this manner, according to the fifth embodiment, a wireless system suitable for the user's purpose can be provided by the optimization problem with the channel and power of the newly introduced evaluation target R (wireless device) and the established wireless device (interference source X) as variables. Then, it is possible to solve the trade-off between the PER of the newly introduced evaluation target R and the PER of the established wireless device (interference source X) and accordingly provide the optimal wireless system satisfying the PER required performance of each of the evaluation target R and the interference source X.

Sixth Embodiment

Next, a sixth embodiment will be described. The sixth embodiment illustrates an example of specifying an interference source X that most affects the PER deterioration of a newly introduced wireless device (evaluation target R) and providing the interference source X to the user.

According to the existing technology, it is possible to display the used frequency, the occupancy rate and RSSI as the information of the interference source X. However, this technology cannot specify which interference source X affects the deterioration of the performance (PER) of the newly introduced wireless device (evaluation target R). This is because the frequencies, occupancy rates and RSSIs of the plurality interference sources X are different from each other.

In this respect, according to the present disclosure, PERi of the interference source Xi can be calculated as described in the first embodiment. This PERi indicates "the probability of reception failure of the target signal r of the evaluation target R as transmission packets of any interference source Xi." Therefore, based on the required PERi, the radio wave interference analysis apparatus 100 (PER calculation unit 209) can clearly present the magnitude of the influence of PER deterioration.

For example, as illustrated in FIG. 1, PERi for each of the plural interference sources Xi can be provided to the user. In the example of FIG. 1, the $PER_3$ of the interference source X3 has the largest value of 3%. Thus, the radio wave interference analysis apparatus 100 can provide to the user that the interference source X3 is the most significant cause of PER deterioration of the target signal r of the evaluation target R. Thus, the user can grasp that removal of the interference source X3 is most effective as an interference countermeasure. In addition, the "removal" does not refer only to removal of the arrangement of the interference source X3 but includes various kinds of interference countermeasures in order to avoid interference by the interference signal x of the interference source X3.

According to the first to sixth embodiments described above, it is possible to calculate the PER in consideration of both the occupancy rate of the interference source X and the SINR. In the present disclosure, as described in the first embodiment, in response to the influence of interference signals of plural interference sources on a target signal of an evaluation target, PERi for each interference source and all PERs of interference sources PERis are obtained. The PERi is calculated using the collision rate Ri and collision ERi of the target signal and the interference signal. The collision rate Ri is calculated by determining the presence/absence of CSMA/CA by using, for example, the MAC scheme, packet length, and transmission interval of the interference signal and the target signal. The collision ERi is calculated using, for example, a modulation method, a detection method, and the number of packet bits, in addition to SINR. For this reason, even with the same SINR, the PERs vary depending on the occupancy rate of the interference source, but according to the present disclosure, an accurate PER can be obtained based on the occupancy rate and the SINR.

Figure 20:
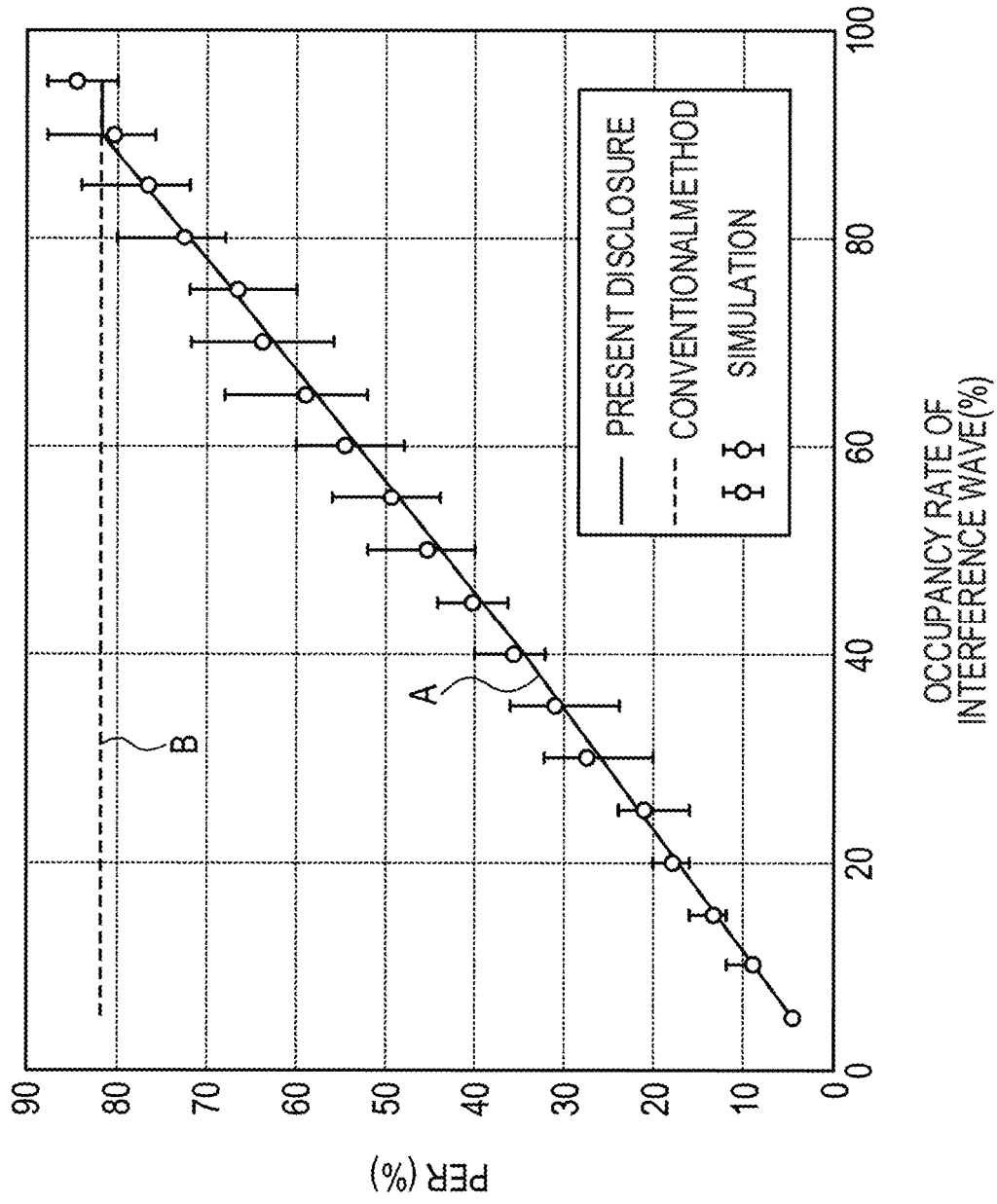
FIG. 20 is a diagram illustrating the PER according to an interference wave occupancy rate calculated by the radio wave interference analysis apparatus according to each of the embodiments.

FIG. 20 is a diagram illustrating the PER according to the occupancy rate of the interference wave calculated by the radio wave interference analysis apparatus according to each embodiment. The horizontal axis represents the occupancy rate of the interference wave (interference signal x) and the vertical axis represents PER. The simulation of FIG. 20 illustrates an average value and a quartile under the following conditions performed 1,000 times. The conditions for the target signal r are, BLE (BLUETOOTH LOW ENERGY): 37 ch, 71 dBm, packet length: 0.2 ms, and transmission interval: 200 ms. The interference source X is two Wi-Fi devices, the conditions of one of which are, 1 ch, 68 dBm, packet length: 1.7 ms, and transmission interval: packet length÷occupancy rate, and the conditions of the other are, ich, −55 dBm, packet length: 0.28 ms (fixed), and transmission interval: 200 ms (fixed).

In a characteristic line B of a conventional method of obtaining the PER from the SINR, the PER is a predetermined constant value, irrespective of the occupancy rate of the interference wave (interference signal x). In the conventional method, since it is assumed that the interference signal x collides 100%, the calculation result becomes more pessimistic as more packets do not collide.

In contrast, according to the present disclosure, it is possible to obtain different PER characteristics A according to the occupancy rate (5% to 95%) of the interference wave. In the example of FIG. 20, the occupancy rate of the interference signal is proportional to the PER. Then, more accurate PER can be obtained considering both the occupancy rate and the SINR.

Seventh Embodiment

Next, the seventh and subsequent embodiments will be described. These embodiments are configured to effectively visualize and present to the user the influence of interference by the interference source X by using the information including the PER calculated according to the above-described first to sixth embodiments.

Measures against wireless interference need a GUI (Graphic User Interface) that effectively visualizes the following information and provides the information to the user. The information may include information (e.g., wireless standard, ch, RSSI, and occupancy rate) on the interference signal x, information (e.g., wireless standard, ch, and RSSI) on the target signal r, and influence degree of the interference signal x on the target signal r.

In these embodiments, there is provided a UI for identifying and displaying the degree of influence as wireless interference for each interference wave (interference signal x) by, for example, color. In addition, the display is performed by RSSI and frequency (ch). Further, an RSSI threshold that needs to take into consideration the degree of influence on interference is drawn. Then, the total value of influenced on interference is displayed.

Figure 21:
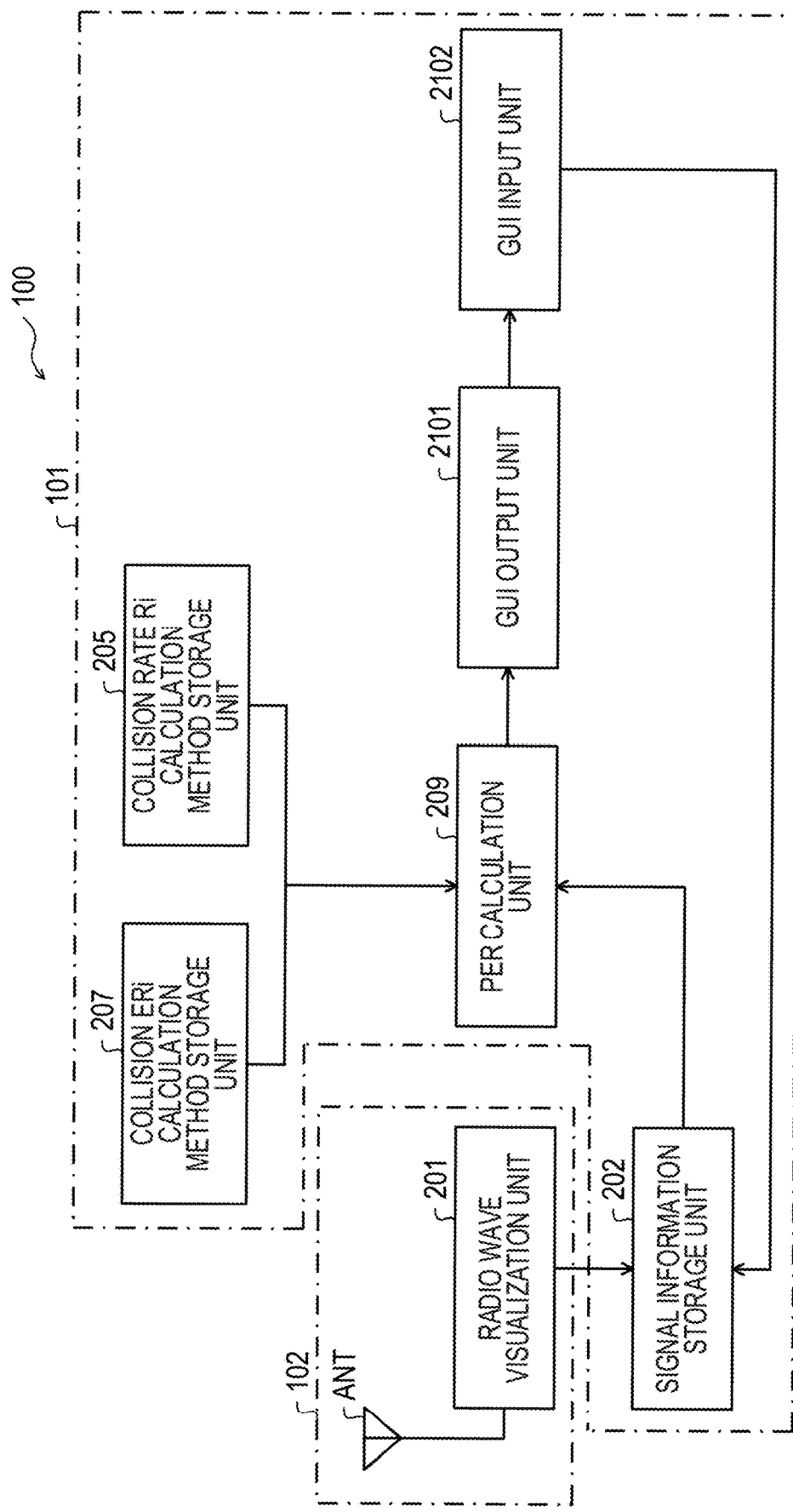
FIG. 21 is a block diagram illustrating a function of a radio wave interference analysis apparatus according to a seventh embodiment.

FIG. 21 is a block diagram illustrating the function of the radio wave interference analysis apparatus according to the seventh embodiment. As illustrated, the seventh embodiment includes a GUI output unit 2101 and a GUI input unit 2102, in addition to the components related to the PER calculation described in each of the embodiments (for example, FIG. 1) described above. In FIG. 21, some of the functions of the terminal device 101 are omitted.

The GUI output unit 2101 provides (displays and outputs) PER information output from the PER calculation unit 209 to the user through a predetermined GUI. The GUI input unit 2102 receives a user operation based on the PER information provided to the user by the GUI output unit 2101. Then, the GUI input unit 2102 changes the information (parameters) stored in the signal information storage unit 202 in response to the user operation.

The functions related to the display output and the user input of the GUI illustrated in FIG. 21 can be implemented by using, for example, the hardware configuration illustrated in FIG. 3. The generation of the GUI display information of the GUI output unit 2101 and the GUI input unit 2102 can be implemented by executing the program of the CPU 301 illustrated in FIG. 3 or using, for example, a GPU (Graphics Processing Unit) dedicated to GUI.

The GUI display information generated by the GUI output unit 2101 can be displayed and output using a display (not illustrated) of the terminal device 101 connected to the CPU 301. The user input of the GUI input unit 2102 can be implemented by using a keyboard or mouse (not illustrated) of the terminal device 101 connected to the CPU 301. Further, a touch pad in which a display and a keyboard are integrated may be used.

Figure 22:
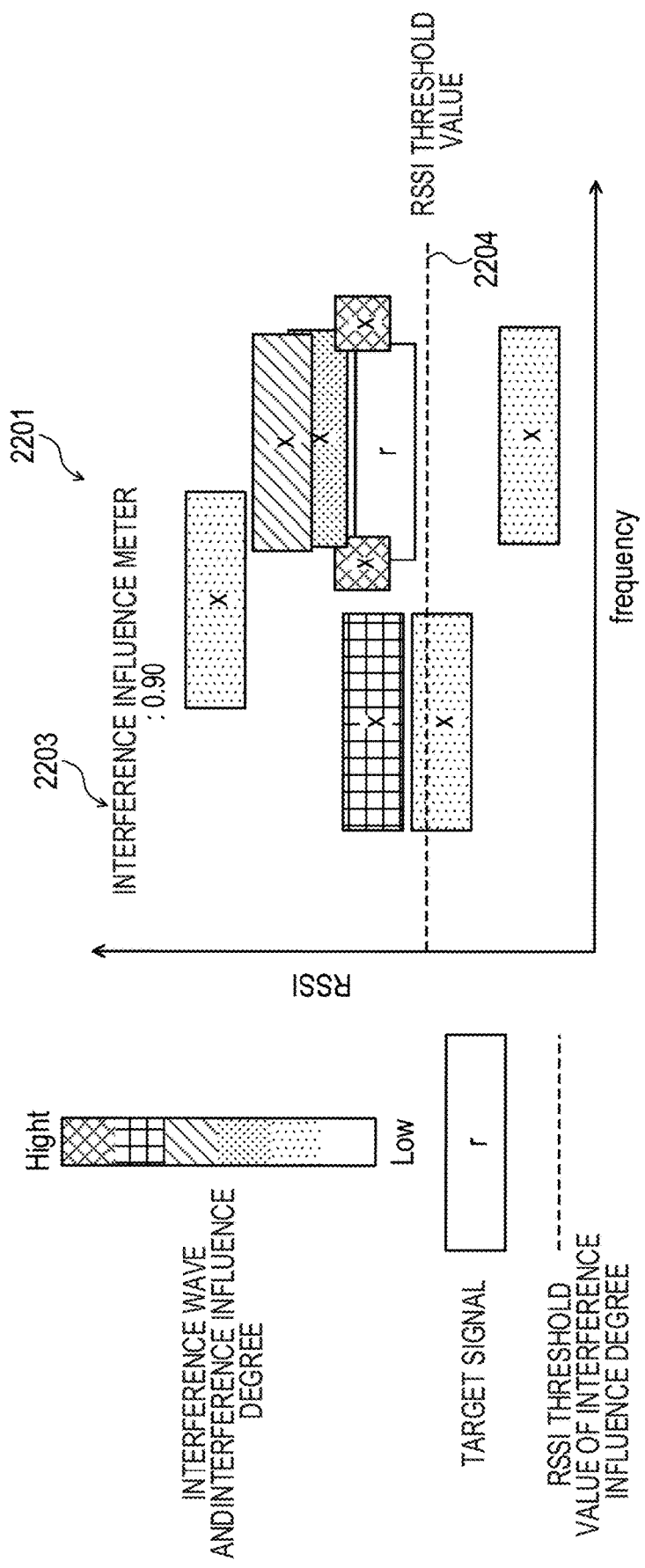
FIG. 22 is a view illustrating an example of display of an interference state by the radio wave interference analysis apparatus according to the seventh embodiment.

FIG. 22 is a view illustrating a display example of the interference state by the radio wave interference analysis apparatus according to the seventh embodiment. FIG. 22 illustrates a display example of a display screen 2201 on the display by the GUI output unit 2101. The horizontal axis represents a frequency (channel) and the vertical axis represents RSSI. As illustrated, the target signal r of the evaluation target R and the interference signals x of the plural interference sources X are displayed in a display frame of a predetermined area in combination of respective frequencies (bands) and RSSI values.

In the illustrated example, each display frame is described by, for example, shading, but the GUI output unit 2101 emphatically displays the target signal r in each color in stages. For example, the interference signal x having a high interference influence degree is displayed in red, and as the interference influence degree becomes lower, the interference signal x is changed and displayed in the form of, for example, orange→yellow→green→light blue→blue→gray→black. The emphasized display of the display frame is not limited to color but may be in various forms such as shading and blinking. This makes it possible to distinguish between the target signal r and the interference signal x of each interference source X. In addition, the interference signal x can be emphatically displayed in a display frame of a color corresponding to the degree of interference influence so as to allow the user to easily grasp the interference state.

The GUI output unit 2101 displays interference influence meter information 2203 on the display screen 2201. The interference influence meter information 2203 is a total value of all PERs of the interference sources X (0.90 in the illustrated example).

In addition, the GUI output unit 2101 displays an RSSI threshold value 2204 on the display screen 2201. The RSSI threshold value 2204 is displayed as a predetermined RSSI value based on the standard or RSSI of the target signal r of the evaluation target R. The RSSI threshold value 2204 is displayed as an index indicating that the interference signal x affects the PER of the target signal r when the interference signal x has a level (power) higher than the RSSI threshold value 2204.

Figure 23A:
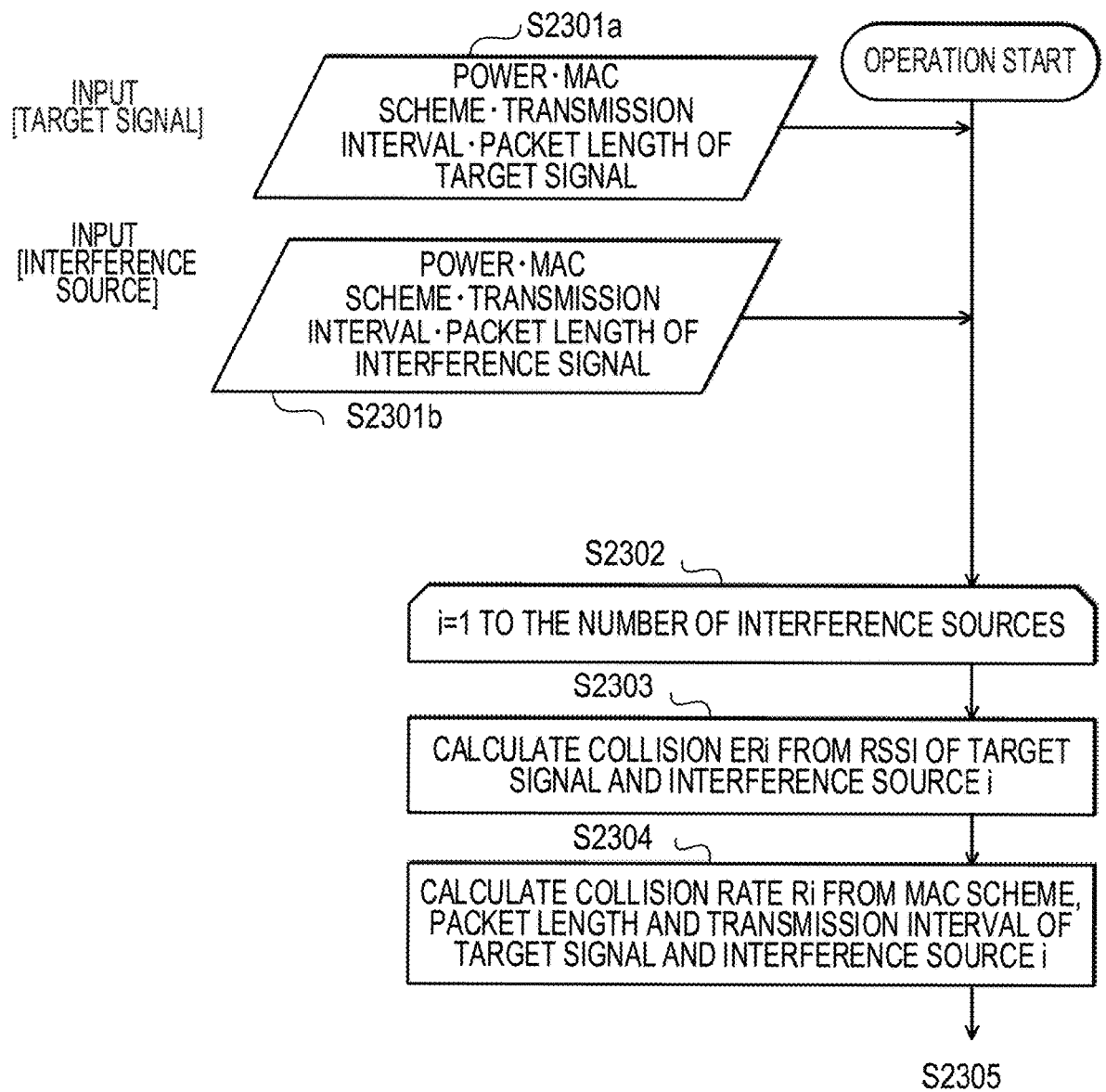
FIGS. 23A and 23B are flowcharts illustrating an example of a process of an interference countermeasure performed by the radio wave interference analysis apparatus according to the seventh embodiment.
Figure 23B:
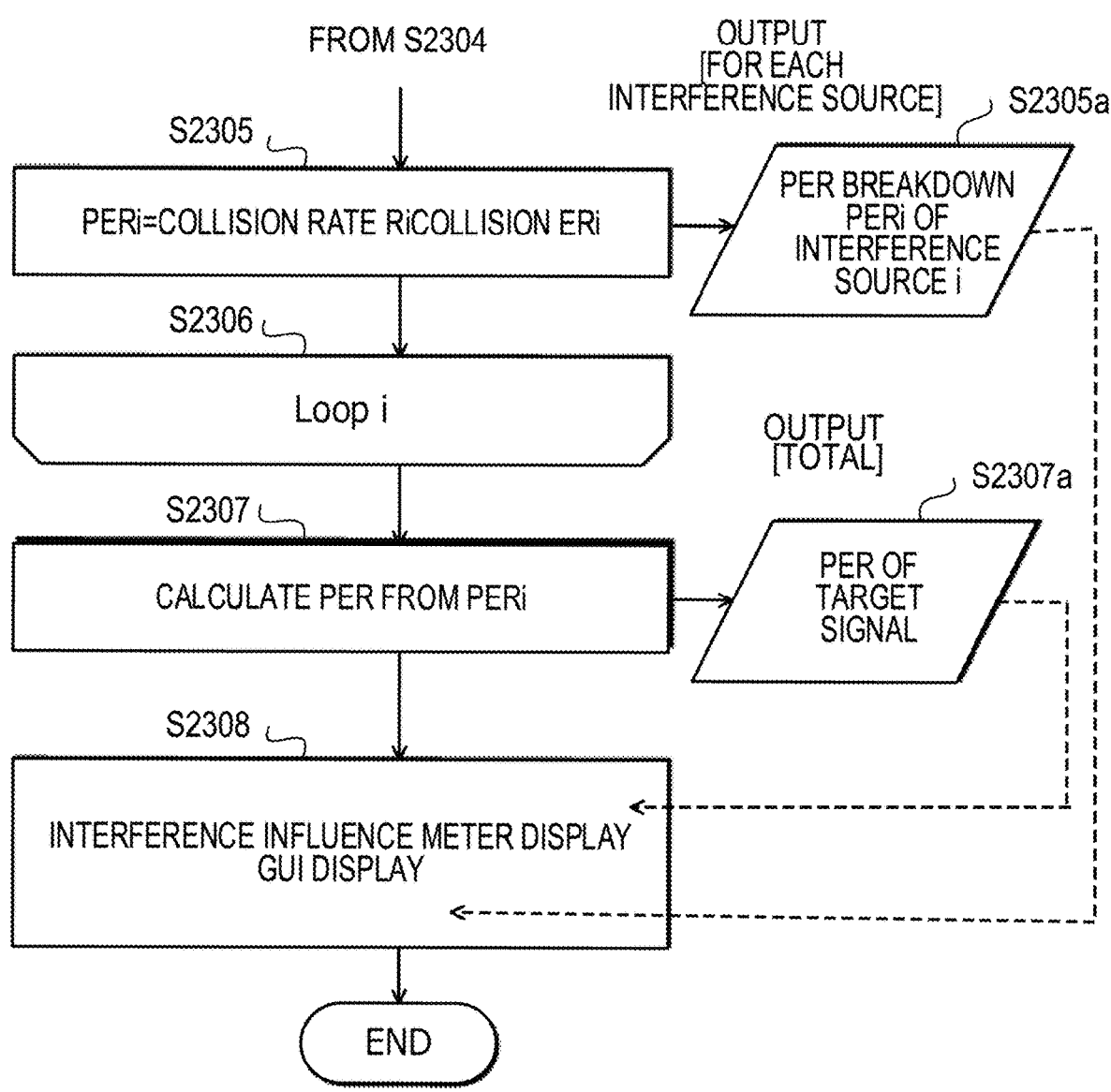

FIGS. 23A and 23B are flowcharts illustrating an example of a process of an interference countermeasure performed by the radio wave interference analysis apparatus according to the seventh embodiment. The processing from operation S2301 to operation S2307 is the same as that from operation S801 to operation S807 of the first embodiment (see FIG. 8).

First, the wireless unit 102 (radio wave visualization unit 201) conducts electrometry at a predetermined observation time to acquire the power, MAC scheme, transmission interval, and packet length of each of the target signal r and the interference signal x (operation S2301a and operation S2301b).

Next, the terminal device 101 (CPU 301) starting to execute operations of PER calculation first sets an interference source X number i to an initial value of 1 and continues the following operations until the number i reaches (operation S2302).

Then, the terminal device 101 calculates the collision ERi from RSSI of the target signal r and the interference signal xi of the interference source i (operation S2303). Further, the terminal device 101 calculates the collision rate Ri from the MAC scheme, packet length and transmission interval of the target signal r and the interference signal x of the interference source i (operation S2304). Either of the operations S2302 and S2303 may be executed first.

Next, the terminal device 101 calculates the probability PERi of failure of reception of the target signal r due to collision with the packets of the interference source i (operation S2305). For example, PERi is calculated based on the above equation (12). At this time, the terminal device 101 displays and outputs the fact indicating that the calculated PERi is the probability of failure of reception of the target signal r due to the interference source i (operation S2305a).

Then, the terminal device 101 continues the above PERi calculation operation by the interference source number i (operation S2306). After multiple PERi for the interference source number i are obtained in operation S2306, the terminal device 101 calculates PER from PERi (operation S2307). The PER is calculated, for example, based on the above equation (13). At this time, for example, the terminal device 101 displays and outputs the fact indicating that the calculated PER is the probability PER of reception failure of packets of the target signal r due to collision with packets of one interference source i among all interference sources i (operation S2307a)

Next, the GUI output unit 2101 displays the GUI display screen 2201 illustrated in FIG. 22 based on the information of PERi and PER (operation S2308). At this time, the terminal device 101 (CPU 301) displays a display frame indicating the frequency and RSSI for the plural interference sources Xi and the target signal r on the display screen 2201. In addition, the interference influence meter information 2203 and the RSSI threshold value 2204 are also displayed.

The display screen 2201 allows the user to determine the interference source X for each degree of influence of interference on the target signal r. For example, although there is actually an interference signal x that does not affect interference even when the RSSI is high, the user can easily see which interference signal x has an effect of interference on the target signal r at a glance by highlighted color. Further, the user can grasp the operational effects obtained from changing the setting in the frequency (ch) direction.

Further, since the interference signal x caused from the RSSI lower than the RSSI threshold 2204 can be ignored as the influence of interference, the effect achieved when it is assumed that the setting of the RSSI value is changed, that is, the transmission output of the target signal r is increased can be easily seen at a glance. As a feature of wireless communication, the packet reception success rate rapidly changes with a certain SINR as a boundary.

Then, the GUI display screen 2201 can provide countermeasures against the target signal r to the user. Based on the positions of the display frames of the target signal r and the interference signal x on the display screen 2201, for example, the user can grasp the influence of interference when changing the ch (frequency) or transmission output of the target signal r.

Figure 24:
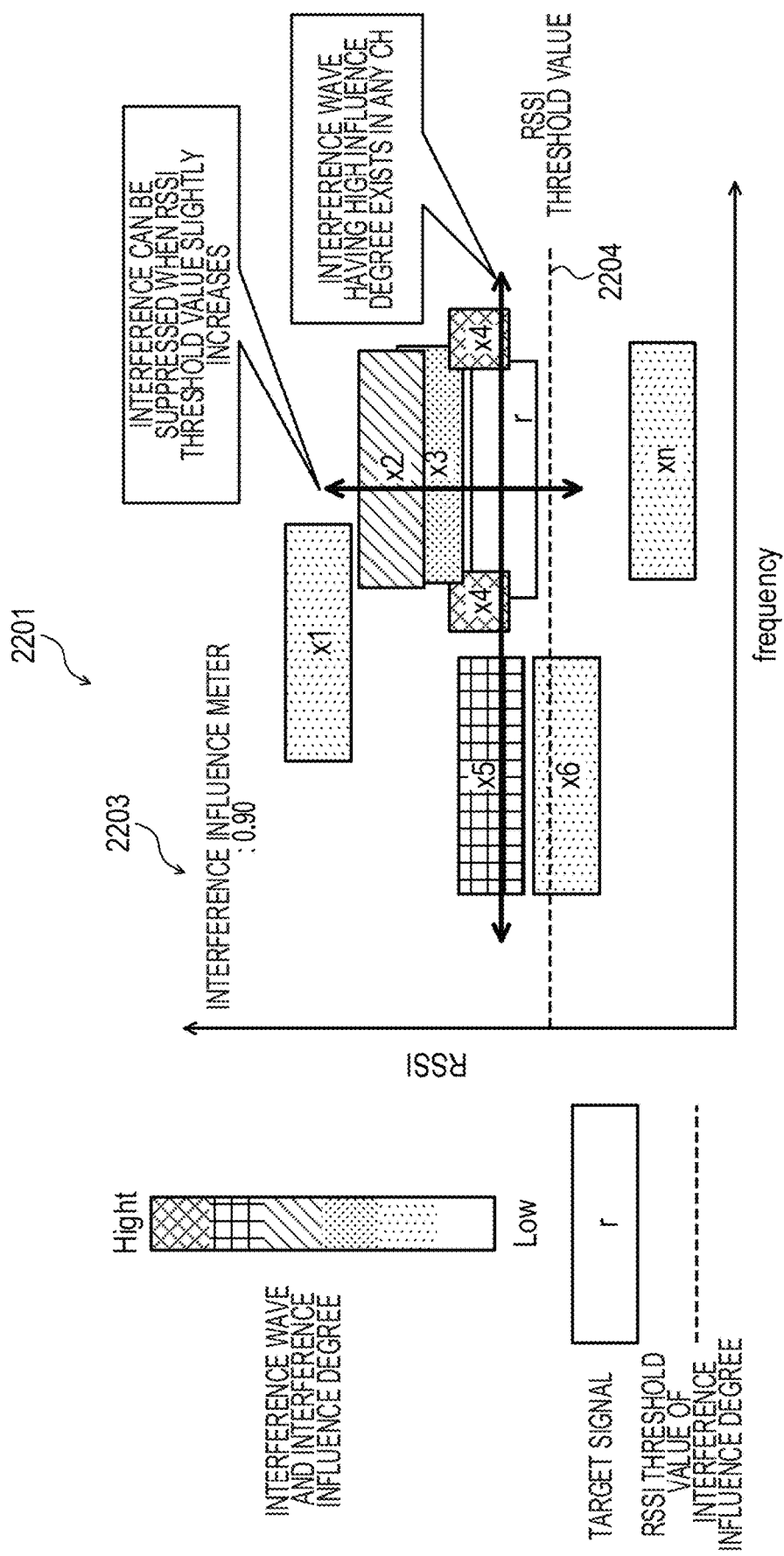
FIG. 24 is a view for explaining an interference countermeasure based on display of the radio wave interference analysis apparatus according to the seventh embodiment.

FIG. 24 is a view for explaining interference countermeasures based on the display of the radio wave interference analysis apparatus according to the seventh embodiment. FIG. 24 illustrates the same display screen 2201 as that in FIG. 22. According to the display screen 2201 illustrated in FIG. 24, it is displayed that interference signals x (e.g., x4, x5) having a high degree of influence exist in any of other channels including the adjacent channel of the target signal r. In this case, the user can grasp that the effect of reducing the influence of interference due to the channel change of the target signal r is low.

In the meantime, when the transmission output (RSSI) of the target signal r is increased slightly, it is displayed that the interference due to the interference signals x (e.g., x3, x4) having a high influence degree can be suppressed, so that the user can grasp this.

The display screen 2201 illustrated in FIG. 24 is not limited to being used for determination on and countermeasures against interference influences in the case of newly introducing an evaluation target R of the target signal r. In other words, the display screen 2201 may also be used for determination on and countermeasures against interference influences when the already installed evaluation target R of a predetermined target signal r is influenced by interference by other interference sources X.

Figure 25:
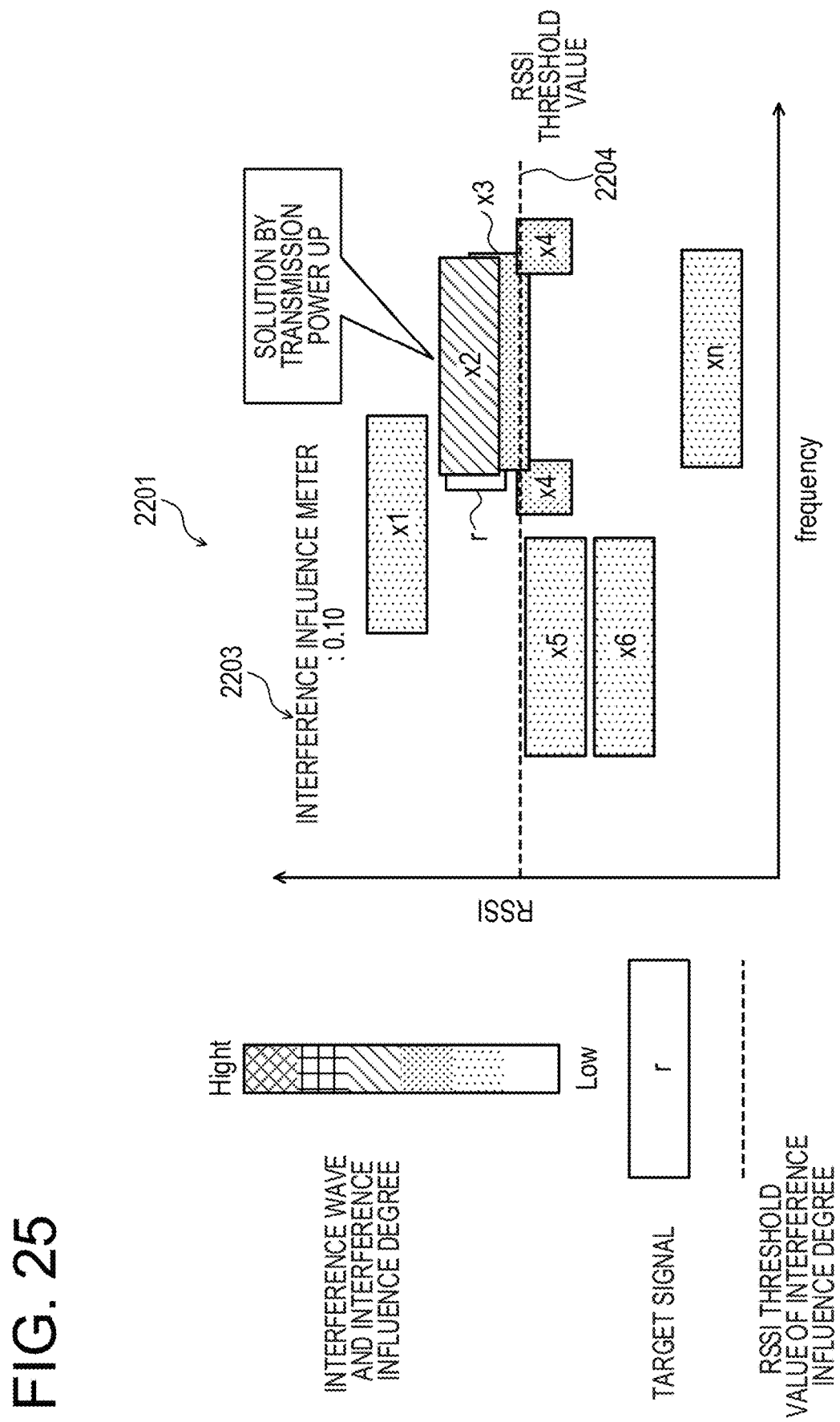
FIG. 25 is a view for explaining an example of display after the interference countermeasure based on the display of the radio wave interference analysis apparatus according to the seventh embodiment.

FIG. 25 is a view illustrating a display example after the interference countermeasure based on the display of the radio wave interference analysis apparatus according to the seventh embodiment. FIG. 24 illustrates the display screen 2201 after the user changes the parameters for increasing the transmission output for the target signal r of the evaluation target R based on the display on the display screen 2201.

The GUI input unit 2102 changes the value of the parameter (power) related to the target signal r stored in the signal information storage unit 202 based on the parameter input (increase in transmission output) by the user. Accordingly, the radio wave interference analysis apparatus 100 (terminal device 101) executes a series of processes related to the PER calculation (see FIG. 8) to obtain a new PER. Then, the GUI output unit 2101 displays the display screen 2201 (FIG. 25) after the parameter is changed.

As illustrated in FIG. 25, as the transmission power of the target signal r increases, the display position of the display frame of the target signal r rises with RSSI value by the increased amount of power (moves in the upward direction in the figure). In addition, although the display positions of all the display frames are the same for all of the plural interference signals x, the interference influence degrees are recalculated and displayed based on the increase of the transmission power of the target signal r.

For example, the interference signal x4 having a high interference influence in the vicinity of the target signal r before the interference countermeasure (FIG. 22) is displayed with the interference influence degree lowered after the interference countermeasure (FIG. 25). In addition, the RSSI threshold value 2204 is similarly displayed while being moved upward in the figure in response to the increase of the transmission power of the target signal r, and correspondingly, the interference influence degree by the interference signals x4 and x5 is lowered and displayed.

As a result, the user can easily determine that the interference influence can be reduced by increasing the transmission power of the target signal r. The display illustrated in FIG. 25 can be determined only by changing the parameters inside the radio wave interference analysis apparatus 100 and can be performed without actually performing troublesome operations such as increasing the transmission power of the evaluation target R.

In this manner, according to the seventh embodiment, based on the PER calculated in consideration of the interference signal x interfering with the target signal r of the evaluation object R, the display screen of the display frame combining the frequency (ch) and RSSI of the target signal r and each interference signal x is displayed and provided to the user. Accordingly, the user can easily grasp which one of, for example, frequency change and transmission power change is effective as measures for reducing the interference influence on the target signal r only by seeing the display screen. Further, since the interference state after changing the frequency and the transmission power can be checked again by simulation, the user can eliminate the need for actual adjustment operation of the evaluation target R of the target signal r and can easily check the effectiveness of the countermeasures.

Eighth Embodiment

An eighth embodiment addresses GUI display at the viewpoint of each of plural wireless systems (networks NW). The basic configuration (FIG. 21) related to the GUI display of the radio wave interference analysis apparatus 100 is the same as that in the seventh embodiment.

In addition, the information storage for each wireless system (network) in the signal information storage unit 202 of the radio wave interference analysis apparatus 100 and the PER calculation in response to the network change correspond to the above-described embodiment (see FIGS. 12A and 12B). PER calculation of target signals r of plural wireless systems, that is, plural evaluation targets R, is performed in a state where a certain radio system (evaluation target R of NW-1) is separated from other interference sources X. Further, the PER calculation is performed in a state where another different wireless system (evaluation target R of NW-2) is separated from other interference sources X.

Figure 26:
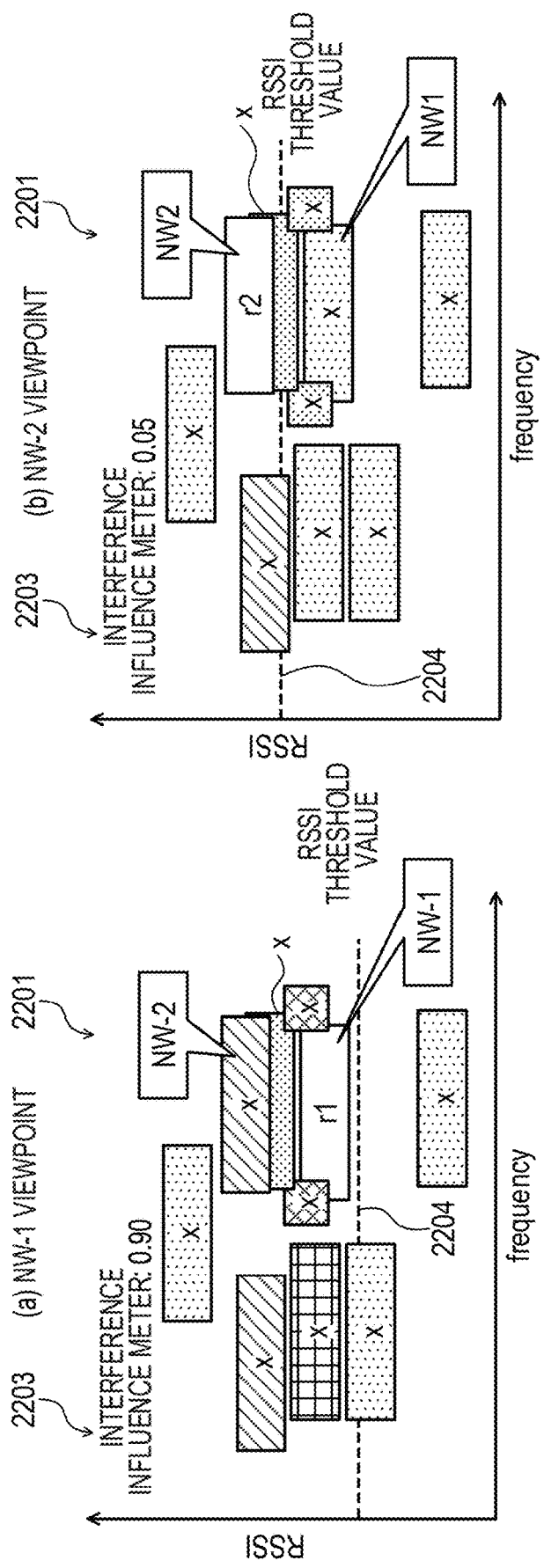
FIG. 26 is a view illustrating an example of display of a per-wireless system interference state by the radio wave interference analysis apparatus according to an eighth embodiment.

FIG. 26 is a view illustrating a display example of the interference state for each wireless system by the radio wave interference analysis apparatus according to the eighth embodiment. FIG. 26A illustrates a display screen 2201 at the viewpoint of a certain wireless system NW-1. In this case, the GUI output unit 2101 displays the display screen 2201 assuming the evaluation target R of the wireless system NW-1 designated by the user as a target signal r1 and assuming all the interference signals x of the radio system other than the target signal r1 as interference sources X.

FIG. 26B illustrates a display screen 2201 at the viewpoint of another wireless system NW-2. In this case, the GUI output unit 2101 displays the display screen 2201 assuming the evaluation target R of the wireless system NW-2 designated by the user as a target signal r2 and assuming all the interference signals x of the radio system other than the target signal r2 as interference sources X.

Figure 27:
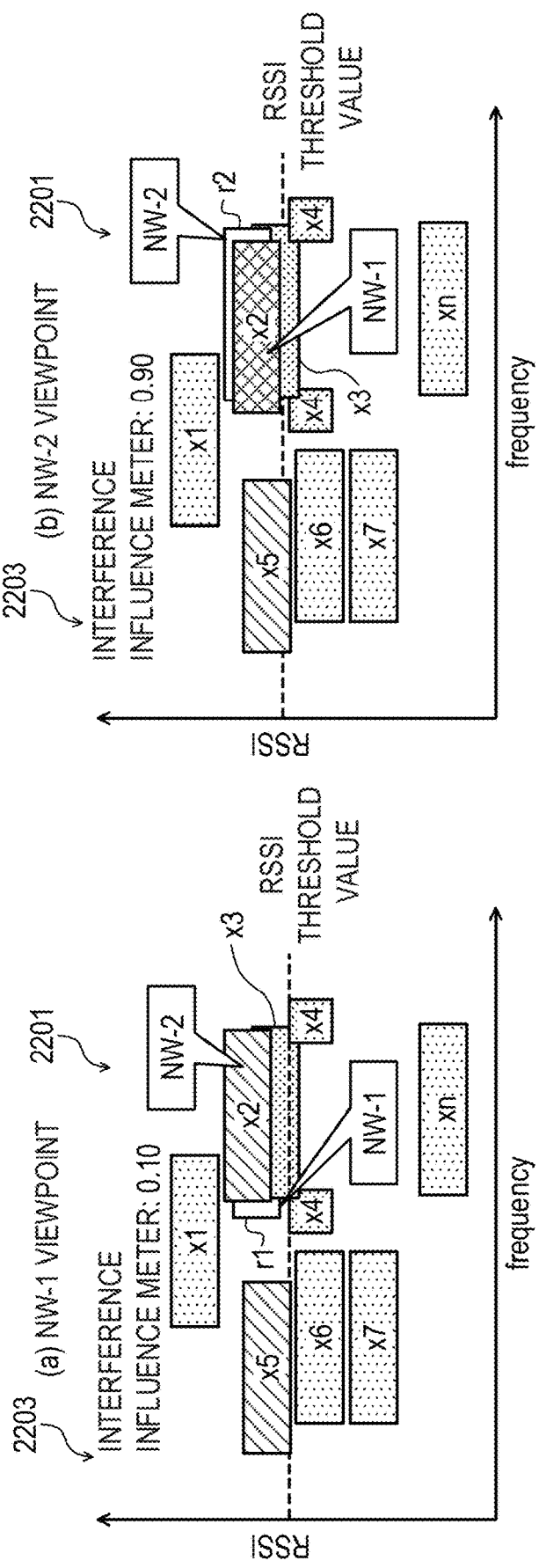
FIG. 27 is a view for explaining an interference countermeasure based on display of a radio wave interference analysis apparatus according to the eighth embodiment.

FIG. 27 is a view for explaining interference countermeasures based on the display of the radio wave interference analysis apparatus according to the eighth embodiment. FIG. 27 illustrates the same display screen 2201 as that in FIG. 26. According to the display screen 2201 of the wireless system NW-1 illustrated in FIG. 27A, it is displayed that interference signals x (e.g., x4, x5) having a high degree of influence exist in any of other channels including the adjacent channel of the target signal r. In this case, the user can grasp that the effect of reducing the influence of interference due to the channel change of the target signal r is low.

Meanwhile, when the transmission output (RSSI) of the target signal r is increased slightly, it is displayed that the interference due to the interference signals x (e.g., x3, x4) having a high influence degree can be suppressed, so that the user can grasp the interference.

Based on the display screen 2201 of FIG. 26A, it is assumed that the user changes the parameter for increasing the transmission output for the target signal r1 of the evaluation target R of the wireless system NW-1. The GUI input unit 2102 changes the value of the parameter (power) related to the target signal r1 of the wireless system NW-1 stored in the signal information storage unit 202 based on parameter input (increase in transmission output) by the user. Accordingly, the radio wave interference analysis apparatus 100 (terminal device 101) executes a series of processes related to the PER calculation (see FIG. 8) to obtain a new PER. Then, the GUI output unit 2101 displays the display screen 2201 (FIG. 27A) after the parameter is changed.

As illustrated in FIG. 27A, as the transmission power of the target signal r1 increases, the display position of the display frame of the target signal r1 rises with RSSI value by the increased amount of power (moves in the upward direction in the figure). In addition, although the display positions of all the display frames are the same for all of other interference signals x, the interference influence degrees are recalculated and displayed based on the increase of the transmission power of the target signal r1.

For example, the interference signal x4 having a high interference influence in the vicinity of the target signal r1 before the interference countermeasure (FIG. 26A) is displayed with the interference influence degree lowered after the interference countermeasure (FIG. 27A). In addition, the RSSI threshold value 2204 is similarly displayed while being moved upward in the figure in response to the increase of the transmission power of the target signal r1, and correspondingly, the interference influence degree by the interference signals x4 and x6 is lowered and displayed.

Thereafter, as illustrated in FIG. 27B, it is assumed that the display screen 2201 is switched to the viewpoint of another wireless system NW-2. At this time, the GUI output unit 2101 holds and displays the state of the display screen of FIG. 27A. When the target signal r2 of the wireless system NW-2 is taken as a viewpoint, the change (transmission power increase) performed on the target signal r1 of NW-1 is held and displayed as described above.

In this case, as illustrated in FIG. 27B, it is represented that the target signal r2 of NW-2 is affected by interference due to the change (transmission power increase) made to the target signal r1 of NW-1. Correspondingly, the value of the interference influence meter information 2203 is also higher than that of FIG. 26B. In this manner, it can be checked that suppression of the interference influence performed on some of the plural wireless systems acts as interference influence on other wireless systems.

Figure 28:
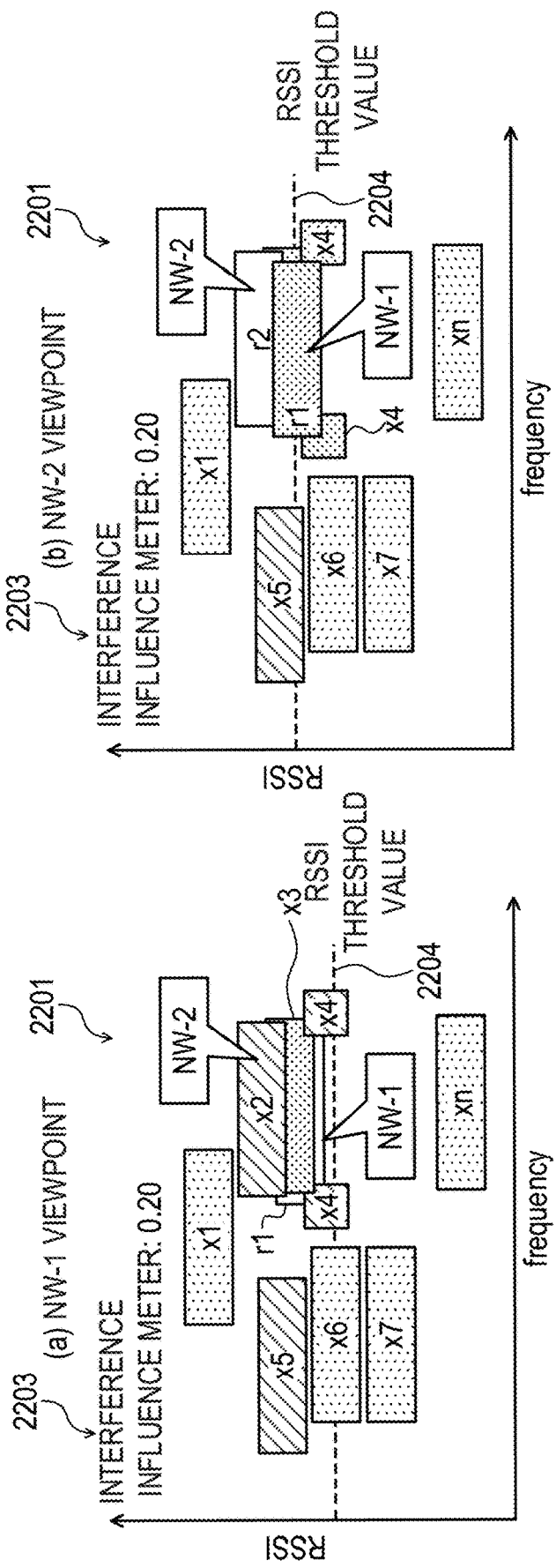
FIG. 28 is a view illustrating an example of display after the interference countermeasure based on display of the radio wave interference analysis apparatus according to the eighth embodiment.

FIG. 28 is a view illustrating a display example after the interference countermeasure based on the display of the radio wave interference analysis apparatus according to the eighth embodiment. FIG. 28 illustrates the display screen 2201 after the user changes the parameter to suppress the interference influence on any of the target signals r1 and r2 of the different wireless systems NW-1 and NW-2 based on the display of each of the display screens 2201 in FIGS. 27A and 27B.

The GUI input unit 2102 changes the value of the parameter (power) related to the target signal r stored in the signal information storage unit 202 based on the parameter input (e.g., increase in transmission output) by the user. Accordingly, the radio wave interference analysis apparatus 100 (terminal device 101) executes a series of processes related to the PER calculation (see FIG. 8) to obtain a new PER. Then, the GUI output unit 2101 displays the display screen 2201 (FIG. 28) after the parameter is changed.

As illustrated in FIG. 28A, it is assumed that parameter change is made to slightly increase the transmission power of one wireless system NW-1 side. At this time, it is assumed that the user slightly increases the transmission power of the one wireless system NW-1 side to the extent that the influence of another wireless system NW-2 on the target signal r2 can be reduced.

In this case, the display position of the display frame of the target signal r1 on the display screen 2201 rises with RSSI value by the increased amount of power (moves to a position lower than that at the time of user operation in FIG. 27A). In addition, although the display positions of all the display frames are the same for all of other interference signals x, the interference influence degrees are recalculated and displayed based on the increase of the transmission power of the target signal r1.

Thereafter, as illustrated in FIG. 28B, it is assumed that the display screen 2201 is switched to the viewpoint of another wireless system NW-2. On the display screen 2201 in this case, it is displayed that the target signal r2 is in a state in which the interference influence based on the transmission power increase performed on the target signal r1 of the one radio system NW-1 can be reduced. Correspondingly, the value of the interference influence meter information 2203 is also lower than that in FIG. 27B.

In this manner, the display screen 2201 can be switched at each viewpoint of the plural wireless systems NW-1 and NW-2. At this time, when the target signal r1 acts as a new interference source at the view point of another target signal r2 due to the parameter change such as the increase in transmission power of the target signal r1, the circumstance can be displayed and output with GUI. As a result, the user can easily check through simulation by the parameter change whether or not the plural wireless systems have mutual interference influence.

Figure 29A:
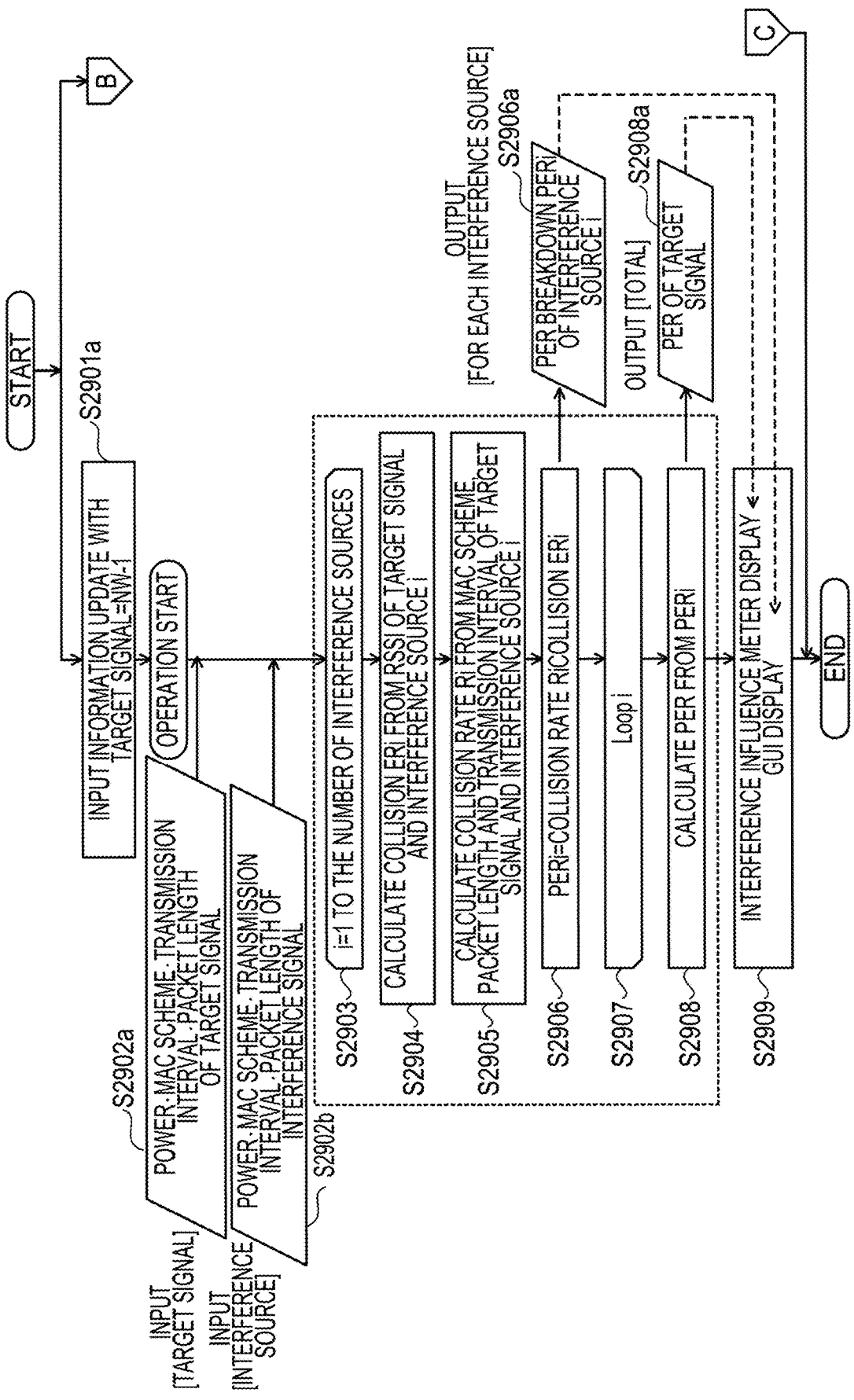
FIG. 29A is a flowchart (Part 1) illustrating an example of a process of the interference countermeasure performed by the radio wave interference analysis apparatus according to the eighth embodiment.
Figure 29B:
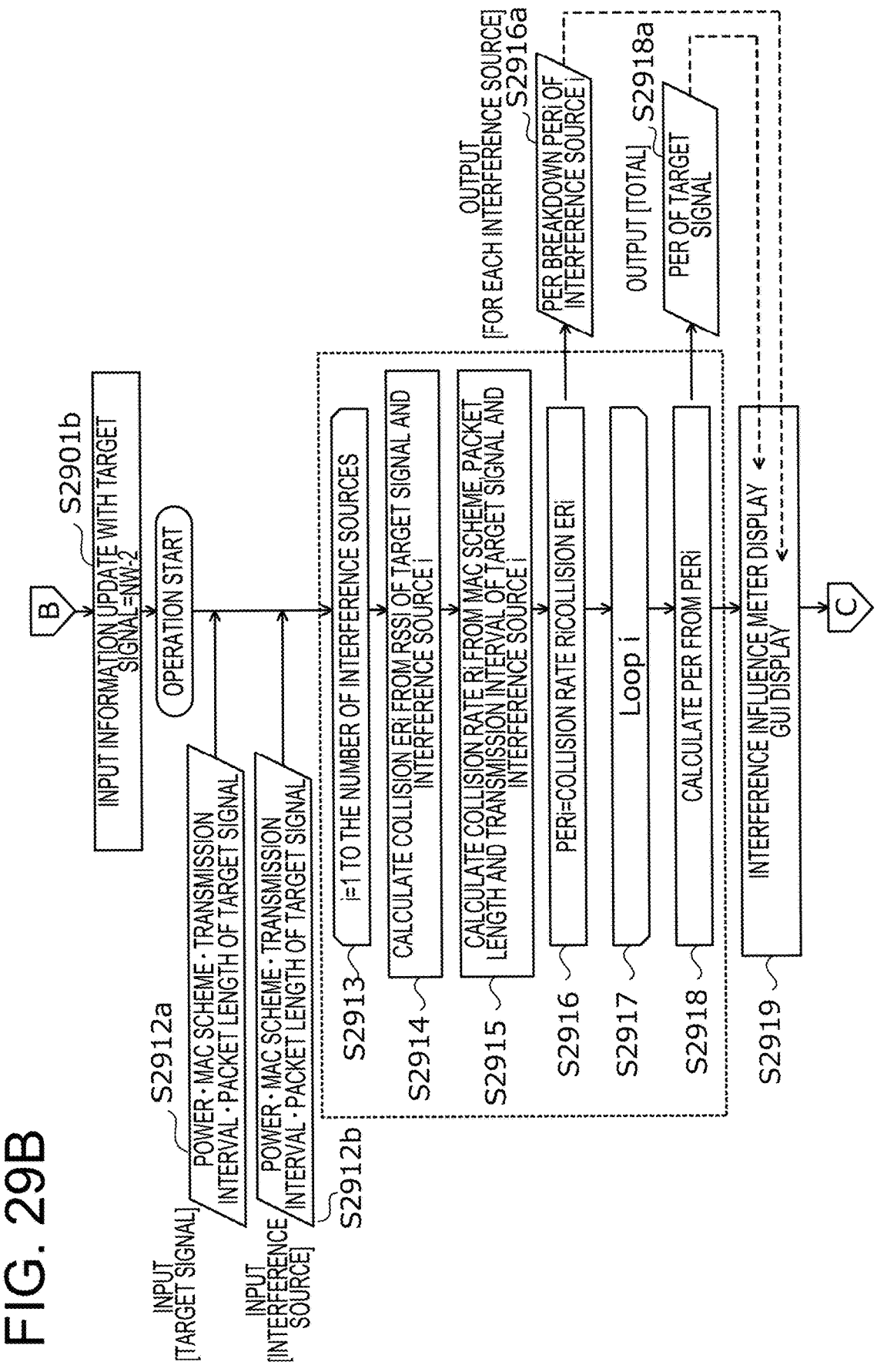
FIG. 29B is a flowchart (Part 2) illustrating an example of a process of the interference countermeasure performed by the radio wave interference analysis apparatus according to the eighth embodiment.

FIGS. 29A and 29B are flowcharts illustrating an example of a process of an interference countermeasure performed by the radio wave interference analysis apparatus according to the eighth embodiment. In these figures, the processing from operation S2902 to operation S2909 and the processing from operation S2912 to operation S2919 are the same as that from operation S801 to operation S807 of the first embodiment (see FIG. 8).

First, as illustrated in FIG. 29A, according to user input, the terminal device 101 updates the input information with a target signal as the target signal r1 of a certain wireless system NW-1 (operation S2901a).

Next, electrometry is performed at a predetermined observation time by the wireless unit 102 (radio wave visualization unit 201) to acquire parameters (power, MAC scheme, transmission interval and packet length) of each of the target signal r1 and the interference signal x (operations S2902a and S2902b). At this time, the parameters are acquired with a user input target signal as the target signal r1 and an interference signal by the interference source X other than the target signal r1 as the interference signal x.

Next, the terminal device 101 (CPU 301) executes PER calculation of the target signal r1 of NW-1 (operations S 2903 to S 2908).

Next, the GUI output unit 2101 displays the GUI display screen 2201 illustrated in FIG. 26 based on the PERi and PER information (operation S2909). At this time, the terminal device 101 (CPU 301) displays a display frame indicating the frequency and RSSI for the plural interference sources Xi and the target signal r on the display screen 2201. In addition, the interference influence meter information 2203 and the RSSI threshold value 2204 are also displayed.

The display screen 2201 allows the user to determine the interference source X for each influence degree of interference on the target signal r1 of NW-1. Then, the user can determine the change of the channel (frequency) of the target signal r1 or the change of the transmission output in order to suppress the interference on the target signal r1. In response to this determination, when the user changes the channel (frequency) of the target signal r1 or changes the transmission output, the input information is updated by operation S2901a. In response to the update of the input information, the PER calculation using parameters (e.g., transmission power) of the changed target signal r1 is performed again (processing from operation S2903 to operation S2908).

Then, based on the PERi and PER information, the GUI output unit 2101 displays the GUI display screen 2201 at the viewpoint of the target signal r1 of NW-1 illustrated in FIG. 27A (operation S2909).

Next, as illustrated in FIG. 29B, according to the user input, the terminal device 101 updates the input information with a target signal as the target signal r2 of a certain wireless system NW-2 (operation S2901b).

Next, electrometry is performed at a predetermined observation time by the wireless unit 102 (radio wave visualization unit 201) to acquire parameters (power, MAC scheme, transmission interval, and packet length) of each of the target signal r2 and the interference signal x (operations S2912a and S2912b). At this time, the parameters are acquired with a user input target signal as the target signal r2 and an interference signal by the interference source X other than the target signal r2 as the interference signal x. Further, when there is a parameter change performed previously, that is, when there is the change of transmission power for the target signal r1, the changed value of the transmission power of the interference signal x corresponding to the target signal r1 is used.

Next, the terminal device 101 (CPU 301) executes PER calculation of the target signal r2 of NW-2 (operations S2913 to S2918).

Next, the GUI output unit 2101 displays the GUI display screen 2201 at the viewpoint of the target signal r2 of NW-2 illustrated in FIG. 27B based on the PERi and PER information (operation S2919).

The display screen 2201 allows the user to determine the interference source X for each influence degree of interference on the target signal r2 of NW-2. Then, the user can determine whether or not the change of the channel (frequency) of the target signal r1 performed previously or the change of the transmission output performed previously is appropriate in order to suppress the interference on the target signal r2.

The user can easily determine a countermeasure based on the influence of the interference signal x on the target signal r2 at the viewpoint of NW-2 illustrated in FIG. 27B. For example, when changing the change of the transmission output for the target signal r1 again, the parameter of the target signal r1 is changed by the input information update (operation S2901a) illustrated in FIG. 29A and the processing of FIG. 29A (operations S2902 to S2909) is executed. As a result, for example, as illustrated in FIG. 28B, the influence of interference of the target signal r2 of NW-2 on the target signal r1 of NW-1 can be suppressed.

In this manner, according to the eighth embodiment, in addition to the operational effects of the seventh embodiment, it is possible to easily grasp the influence of interference at the viewpoints of the target signals r1 and r2 of the plural wireless systems NW-1 and NW-2. Accordingly, when the parameter change of a certain target signal r1 has a new interference influence on another target signal r2, it can be provided to the user in advance through simulation. At this time, the user can eliminate the need for actual adjustment operation of the evaluation target R of each of the plural target signals r1 and r2 and can accordingly easily check the effectiveness of the interference countermeasures in the wireless systems.

Ninth Embodiment

A ninth embodiment addresses not only performing the GUI display described in the seventh embodiment on the radio wave interference analysis apparatus 100 but also performing parameter input by user operation on the GUI display screen 2201. The configuration of PER calculation by interference of the interference signal x on the target signal r is the same as those in the first to sixth embodiments.

This ninth embodiment may be a combination of the configuration of the seventh embodiment related to the GUI display described above and the configuration of the eighth embodiment. For example, the ninth embodiment may be configured by using the GUI input unit 2102 composed of, for example, a transparent touch panel on the display screen 2201 of the GUI output unit 2101.

Figure 30:
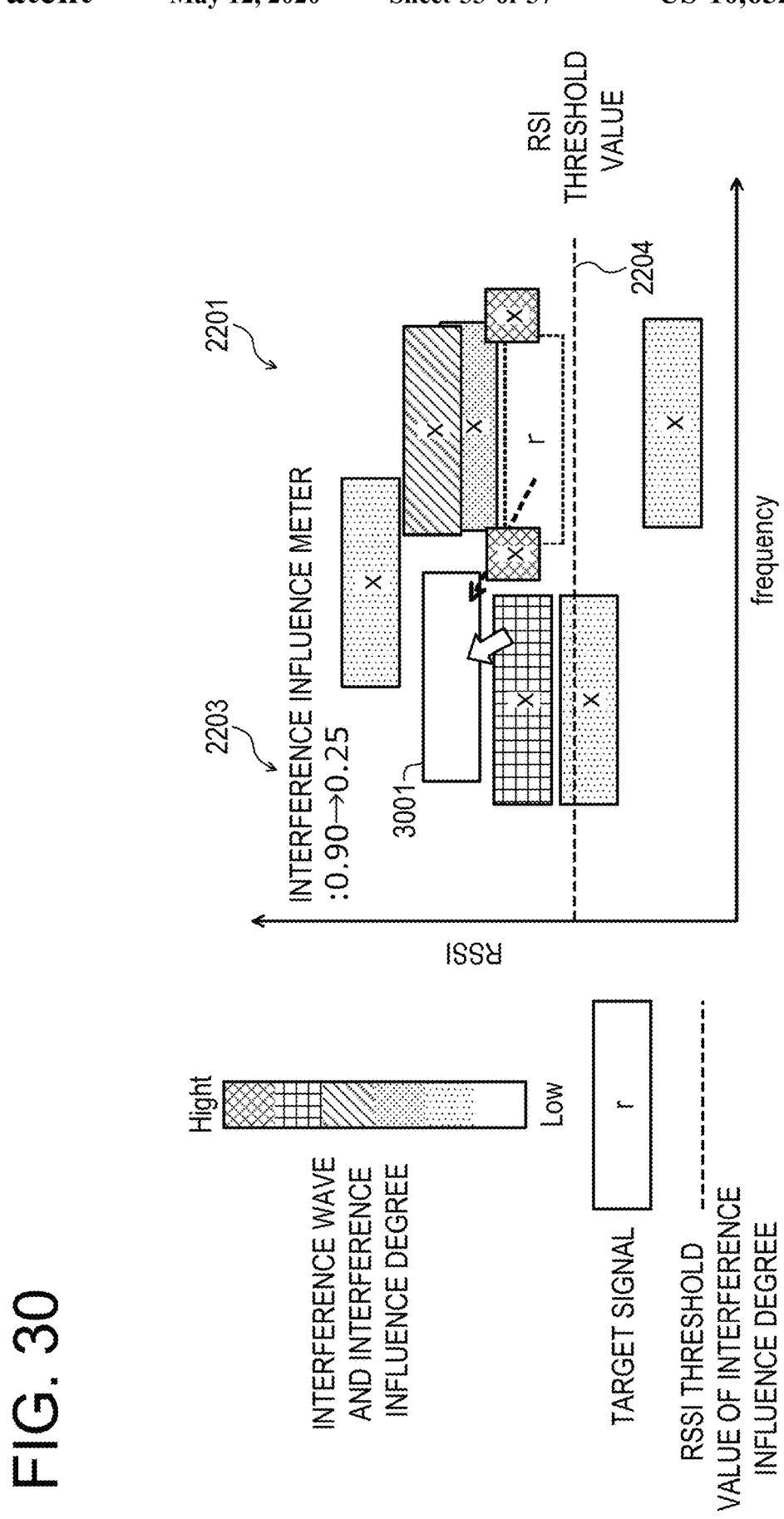
FIG. 30 is a view for explaining an operation input on GUI display of a radio wave interference analysis apparatus according to a ninth embodiment.

FIG. 30 is a view for explaining an operation input on the GUI display of the radio wave interference analysis apparatus according to the ninth embodiment. Display frames of the target signal r and the interference signal x are displayed by the GUI output unit 2101. In this state, the GUI input unit 2102 can move the position of the display frame of the target signal r by, for example, a drag operation.

The example illustrated in FIG. 30 represents a state in which the display frame of the target signal r is moved to a new position 3001 which does not overlap with the display frames of the plural interference signals x. At this time, the GUI input unit 2102 updates and stores the parameters (frequency and transmission power) of the target signal r corresponding to the new position in the signal information storage unit 202. At this time, the parameters (frequency and transmission power) of the target signal r stored in the introduction system information storage unit 211 of the signal information storage unit 202 are updated.

Figure 31:
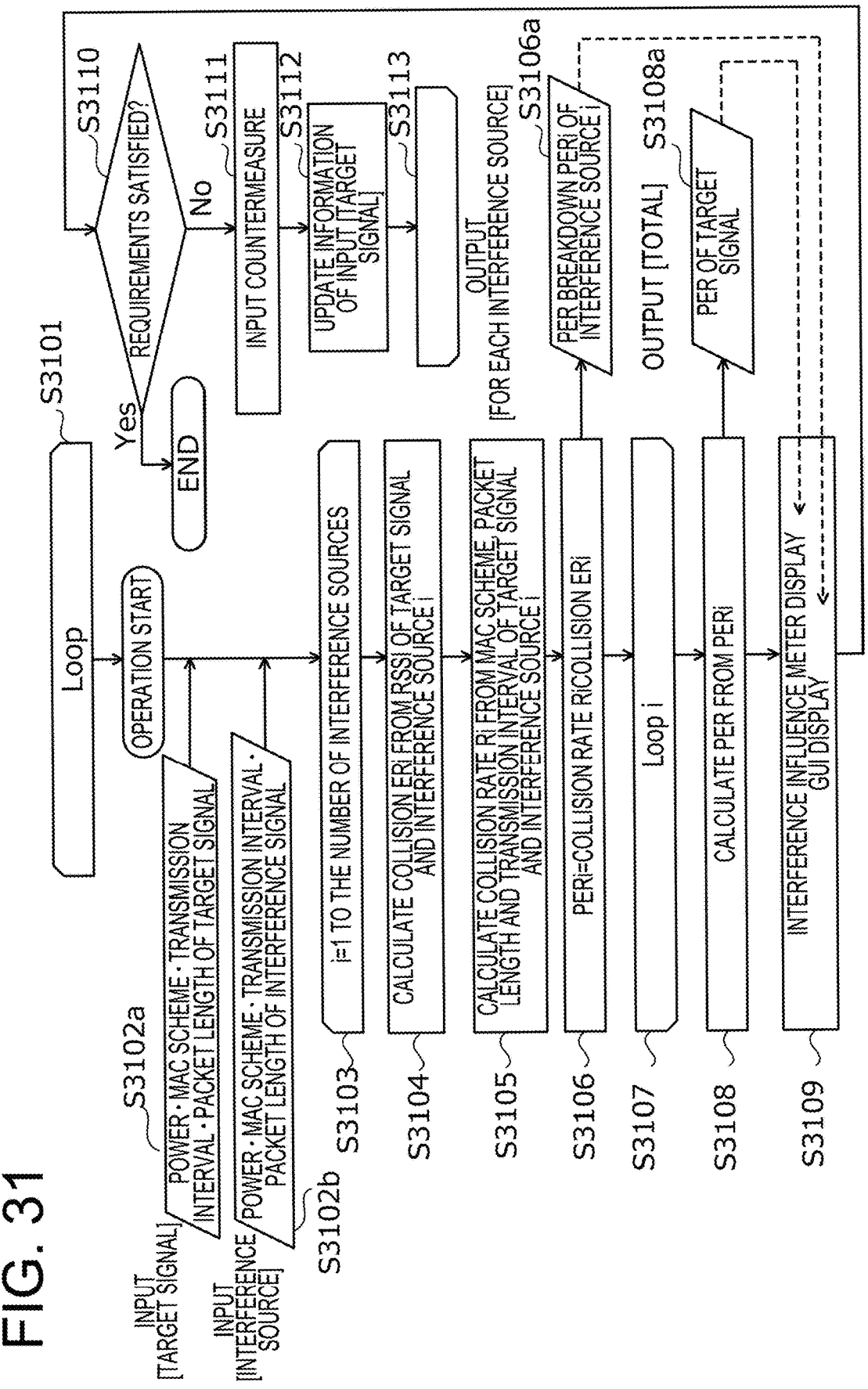
FIG. 31 is a flowchart illustrating an example of a process of an interference countermeasure by GUI input performed by the radio wave interference analysis apparatus according to the ninth embodiment.

FIG. 31 is a flowchart illustrating an example of a process of interference countermeasure by GUI input performed by the radio wave interference analysis apparatus according to the ninth embodiment. The processing illustrated in FIG. 31 continues the loop processing (operations S3101 to S3113) until the user determines that the interference countermeasure against the target signal r satisfies the predetermined requirements ("Yes" in operation S3110).

In this figure, the processing from operations S3102 to S3108 are the same as that from operations S801 to S807 of the first embodiment (see FIG. 8).

The radio wave interference analysis apparatus 100 acquires the parameters (power, MAC scheme, transmission interval, and packet length) of each of the target signal r and the interference signal x by executing operation S3102 and the subsequent operations and calculates the PER of the target signal r. Then, the GUI output unit 2101 displays the GUI display screen 2201 illustrated in FIG. 30 based on the PERi and PER information (operation S3109). At this time, the terminal device 101 (CPU 301) displays a display frame indicating the frequency and RSSI for the plural interference sources Xi and the target signal r on the display screen 2201. In addition, the interference influence meter information 2203 and the RSSI threshold value 2204 are also displayed.

The display screen 2201 allows the user to determine the interference source X for each degree of influence of interference on the target signal r. When the user determines through the display on the display screen 2201 that the interference countermeasure satisfies the predetermined requirements ("Yes" in operation S3110), the above process is ended.

Meanwhile, when the user determines that the interference countermeasure does not satisfy the predetermined requirements ("No" in operation S3110), the user inputs an interference countermeasure (operation S3111). At this time, the user operates the GUI input unit 2102 to change the parameters of the target signal r on the display screen 2201 of FIG. 30.

In response to this user operation, the terminal device 101 (CPU 301) changes the parameters of the target signal r and updates and stores the changed values in the signal information storage unit 202 (operation S3112). Thereafter, the terminal device 101 (CPU 301) executes operation S3102 and the subsequent operations again. At this time, the updated parameters are used for the target signal r.

In the above process, for example, as an interference countermeasure by operation S3111, it is assumed that the user moves the display frame of the target signal r to the new position 3001 which does not overlap with the display frames of the plural interference signals x, as illustrated in FIG. 30.

In this case, in operation S3112, the terminal device 101 (CPU 301) updates and stores values of new frequency and transmission power corresponding to the new position 3001 with respect to the parameters of the target signal r in the signal information storage unit 202. Thus, by executing the simulation process of operation S3102 again and the subsequent operations, in operation S3109, the interference state is indicated by the frequency and transmission power when the target signal r is located at the new position 3001. In addition, the interference influence meter information 2203 is also changed to a new value and displayed.

Then, when the user viewing the display screen 2201 of the GUI output unit 2101 determines that a result obtained after performing the parameter change of the target signal r satisfies the predetermined requirements ("Yes" in operation S3110), the above process can be ended.

Figure 32:
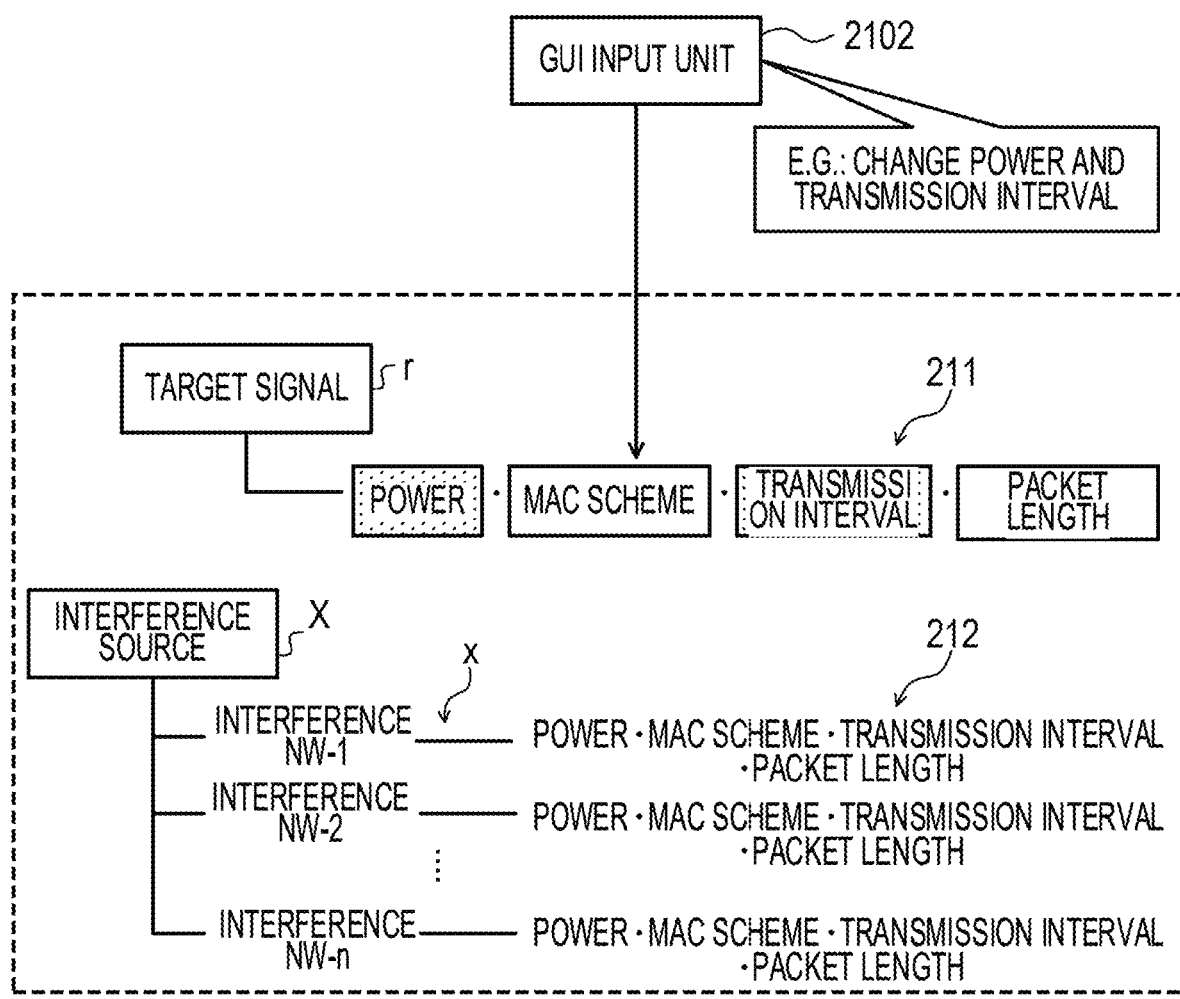
FIG. 32 is a diagram illustrating an example of update of information held by the radio wave interference analysis apparatus according to the ninth embodiment.

FIG. 32 is a diagram illustrating an example of update of information held by the radio wave interference analysis apparatus according to the ninth embodiment. A parameter change of the target signal r by the GUI input unit 2102 will be described. In the above description, the frequency and the transmission power are updated in response to the drag operation of the GUI input unit 2102. In this case, the GUI input unit 2102 updates the parameters (frequency and transmission power) of the target signal r stored in the introduction system information storage unit 211 of the signal information storage unit 202.

As illustrated in FIG. 32, as the parameters of the target signal r stored in the signal information storage unit 202, there are, for example, power (transmission power), MAC scheme, transmission interval, and packet length. Therefore, as the countermeasure in operation S3111, one or a combination of these parameters of the target signal r can be changed.

The example of FIG. 32 illustrates the state of changing the power and transmission interval of the target signal r. In this case, for example, the user changes the power (RSSI) by a drag operation on the display screen 2201 of the GUI input unit 2102. In addition, the GUI output unit 2101 can display the current transmission interval with a slider and the GUI input unit 2102 can change the transmission interval by a slider operation. In this way, it is possible to easily change the plural parameters by the GUI operation.

According to the ninth embodiment described above, in addition to the operation and effects of the GUI output according to the seventh embodiment, interference countermeasures can be easily performed by the GUI input. For example, a display screen of a display frame combining the frequency (ch) and RSSI of each of the target signal r and the interference signal x is displayed and provided to the user on the GUI output display screen described in the seventh embodiment. In the GUI input, by moving the display frame of the target signal to a new position not overlapping with the display frame of the interference signal while watching the display screen, it is possible to change the frequency and transmission power, which are the parameters of the target signal, at the same time. Further, it is possible to execute the simulation again using the changed parameters. As a result, the user can eliminate the need for an actual adjustment operation of the evaluation target R of the target signal r and can accordingly easily check the effectiveness of the countermeasures.

Tenth Embodiment

A tenth embodiment addresses a combination of the GUI output of the plural wireless systems NW-1 and NW-2 described in the eighth embodiment and the GUI input described in the ninth embodiment.

Figure 33A:
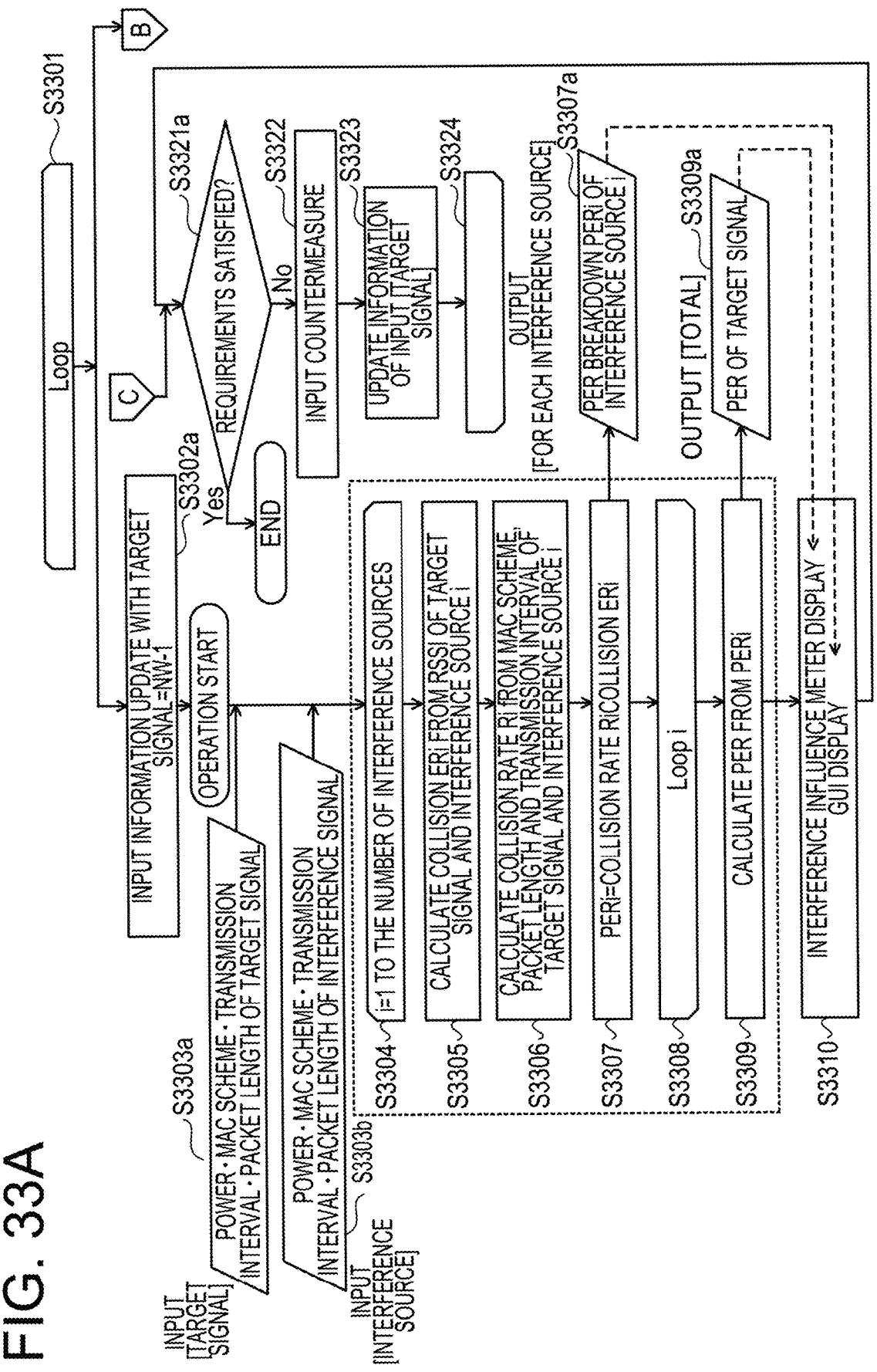
FIG. 33A is a flowchart (Part 1) illustrating an example of a process of interference countermeasure by GUI input performed by a radio wave interference analysis apparatus according to a tenth embodiment.
Figure 33B:
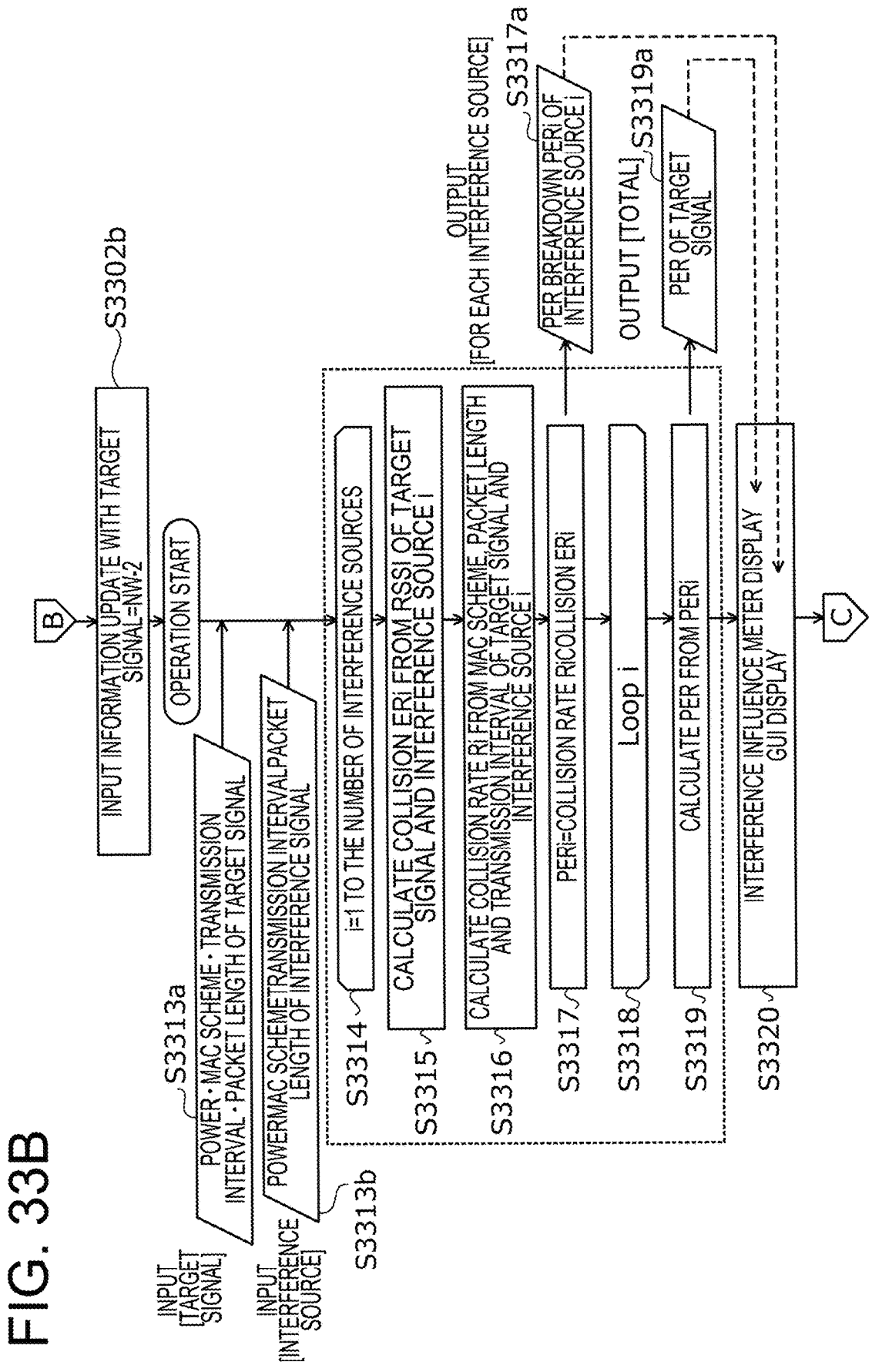
FIG. 33B is a flowchart (Part 2) illustrating an example of a process of the interference countermeasure by GUI input performed by the radio wave interference analysis apparatus according to the tenth embodiment.

FIGS. 33A and 33B are flowcharts illustrating an example of a process of interference countermeasure performed by the radio wave interference analysis apparatus according to the tenth embodiment. In FIG. 33A, the processing from operation S3302a to operation S3310 is the same as that from operation S2901b to operation S2909 (FIG. 29A) of the eighth embodiment. The processing from operation S3302b to operation S3320 in FIG. 33B is the same as that from operation S2901b to operation S2919 (FIG. 29B) in the eighth embodiment. The processing of operation S3301 and from operation S3321a to operation S3324 illustrated in FIG. 33A are the same as that of operation S3101 and from operation S3110 to operation 3113 (FIG. 31) of the ninth embodiment.

According to the tenth embodiment, it is possible to achieve the operational effects that can easily grasp the influence of interference at the viewpoints of the target signals r1 and r2 of the plural wireless systems NW-1 and NW-2 by the GUI output of the eighth embodiment. Further, interference countermeasures may be easily performed by the GUI input of the ninth embodiment. In the case of plural wireless systems, for example, even when the parameter change of the target signal r1 of a certain wireless system has a new interference influence on another target signal r2, the interference influence may be easily checked on the GUI screen. Then, the interference influence may be again provided to the user in advance through simulation by the GUI input.

According to each embodiment described above, PERi for each interference source and all PERs of interference sources PERi are obtained considering that a target signal of an evaluation target is affected by the interference signals of the plural interference sources. Thus, the PER of the target signal can be obtained more accurately in consideration of the occupancy rate and SINR of the interference signal x.

For example, the PERi is calculated using the collision rate Ri and collision ERi of each of the target signal and the interference signal. The collision rate Ri is calculated by determining the presence/absence of CSMA/CA using, for example, the MAC scheme, packet length, and transmission interval as the parameters of the interference signal and the target signal. The collision ERi is calculated by using, for example, the modulation scheme, detection scheme, and the number of packet bits as parameters in addition to SINR. Thus, it is possible to calculate the PER in consideration of both the occupancy rate and SINR of the interference signal x. Even with the same SINR, the PER varies depending on the occupancy rate of an interference source, but according to the embodiments, it is possible to obtain an accurate PER based on the occupancy rate and SINR. In addition, since PERi of each interference source X can be obtained, it becomes possible to specifically grasp the amount of interference influence on the target signal r for each interference source X, facilitating effective interference countermeasures. Then, since it is possible to easily determine which interference signal x has an influence on the deterioration of PER of the target signal r, for example, interference at an introduction point of a new wireless device can be eliminated in advance before the introduction.

Further, the evaluation target R is not limited to being actually installed, but may be simulated by changing the parameters of the target signal.

Further, it is possible to provide a GUI for effectively performing countermeasures against interference of the interference signal x on the target signal r. As a GUI display screen, the target signal r and the interference signal x are displayed by GUI based on, for example, the wireless standard, ch, RSSI, and occupancy rate of the interference signal x and based on, for example, the wireless standard, ch, RSSI, etc. of the target signal r. For example, the GUI output unit displays the target signal r and the plural interference signals x in a display frame including ch and RSSI. In addition, the interference signal x is GUI-displayed with, for example, color, tone, or blinking in accordance with the degree of influence of interference on the target signal r. As a result, it is possible to display the respective communication states of the target signal r and the interference signal x in real time and accordingly it is possible to take appropriate interference countermeasures such as the ch and power change of the target signal x.

Moreover, it is possible to simulate the state after interference countermeasures by GUI input. For example, according to the GUI display screen, a simulation in which the parameters (ch and power) of the target signal r is changed by a drag operation of moving the display frame of the target signal r to a position which does not overlap with the display frame of the interference signal x can be executed again and provided to the user.

Thus, when introducing and setting a new evaluation target R, it is possible to appropriately perform countermeasures against interference of the interference signal x of the interference source X on the target signal r of the evaluation target R. Further, without being limited to introducing and setting a new evaluation target R, it is possible to check the state of interference of another interference source X on an established specific wireless device (evaluation target R) and to take interference countermeasures as well.

The method related to the analysis of radio wave interference described in the present embodiments can be implemented by a computer (e.g., CPU) of a target device (the radio wave interference analysis apparatus) executing a control program prepared in advance. This control program is recorded on a computer-readable recording medium such as a magnetic disk, an optical disk, a USB (Universal Serial Bus), or a flash memory and is executed by being read from the recording medium by the computer. Further, the control program may be distributed via a network such as the Internet.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A radio wave interference analysis apparatus configured to analyze a state of interference due to a plurality of interference signals of a plurality of interference sources on a target signal of a wireless device as an evaluation target at a reception point, the radio wave interference analysis apparatus comprising:
   a memory; and
   a processor coupled to the memory and the processor configured to:
      calculate a first probability of failure of reception of the target signal at the reception point due to collision of the target signal with an interference signal of the plurality of interference signals;
      calculate a second probability of failure of reception of the target signal at the reception point due to the interference signal of the plurality of interference sources; and
      output the first probability and the second probability,
   wherein the processor calculates the first probability based on a third probability of overlapping an interference source of the plurality of interference sources with the evaluation target in time and a fourth probability of failure of reception of the target signal when the interference source and the evaluation target overlap with each other in time.

2. The radio wave interference analysis apparatus according to claim 1,
wherein the processor is configured to calculate the third probability, based on the wireless standard, packet length and transmission interval of each of the plurality of interference sources and the evaluation target.

3. The radio wave interference analysis apparatus according to claim 2,
wherein the interference signal is periodically transmitted as wireless standards of the interference source and the evaluation target, and
wherein the processor is configured to calculate the third probability, based on information on presence or absence of carrier sense of the interference signal and the target signal.

4. The radio wave interference analysis apparatus according to claim 1,
wherein the processor is configured to calculate the fourth probability, by calculating signal-to-interference-plus-noise ratio (SINR) based on a ratio in radio wave strength between the target signal and the interference signal, calculating bit error rate (BER) from the SINR and a wireless scheme of the target signal, and calculating a number of collision bits among a number of bits of one packet based on the BER.

5. The radio wave interference analysis apparatus according to claim 4,
wherein the processor is configured to calculate the number of collision bits based on a transmission interval of the interference signal, a collision time for each combination of packet lengths of the target signal, and a bit rate of the target signal.

6. The radio wave interference analysis apparatus according to claim 1,
wherein, when an interference source of the plurality of interference sources is set as the evaluation target, the processor is configured to identify other of the plurality of interference sources than the evaluation target as an interference source, and analyze the state of interference of the interference signal of the interference source on the target signal of the evaluation target.

7. The radio wave interference analysis apparatus according to claim 1, further comprising:
a wireless circuit configured to receive the target signal and the interference signal at a predetermined observation time at the reception point and output the target signal and the interference signal to the processor.

8. The radio wave interference analysis apparatus according to claim 1,
wherein an interference source of the plurality of interference sources for the interference signal is estimated based on the wireless standard, signal strength, and frequency band of the interference signal.

9. The radio wave interference analysis apparatus according to claim 1,
wherein, in a state where the evaluation target is not installed at an introduction location where a wireless device is to be installed, the processor is configured to calculate the first probability and the second probability, based on an input of information on the wireless standard, radio wave strength, frequency band, and packet length of the target signal of the evaluation target.

10. The radio wave interference analysis apparatus according to claim 1,
wherein the processor is further configured to simulate radio wave strength of the target signal and the interference signal at the reception point, based on a layout of an introduction location where a wireless device is to be installed and information on the wireless standards of the evaluation target and an interference source of the plurality of interference sources in a state where the evaluation target and the interference source are not installed at the introduction location, and
wherein the processor is configured to calculate the first probability and the second probability, based on the radio wave strength simulated.

11. The radio wave interference analysis apparatus according to claim 1,
wherein the processor is configured to calculate the second probability by changing a frequency or power of the target signal.

12. The radio wave interference analysis apparatus according to claim 1,
wherein the processor is configured to
calculate a probability of failure of reception of a signal for each of the evaluation target and an interference source of the plurality of interference sources,
perform an arithmetic operation based on an optimization algorithm using a performance and predetermined conditions required for the evaluation target and the interference source, and
output a solution conforming to the performance and predetermined conditions required.

13. The radio wave interference analysis apparatus according to claim 1,
wherein the processor is configured to
calculate a plurality of first probabilities of failure of reception of the target signal at the reception point due to collision of the target signal with the interference signal respectively for the plurality of interference sources, and
specify an interference source having highest first probability of the plurality of first probabilities.

14. The radio wave interference analysis apparatus according to claim 1, further comprising:
a graphical user interface (GUI) configured to provide the state of interference on the target signal.

15. The radio wave interference analysis apparatus according to claim 14,
wherein the GUI is configured to provide information on the wireless standard, frequency, radio wave strength and occupancy rate of the interference signal and the wireless standard, frequency and radio wave strength of the target signal so as to display the information for a user.

16. The radio wave interference analysis apparatus according to claim 1,
wherein the first probability and the second probability are used for performing countermeasures against the interference due to the plurality of interference signals on the target signal of the wireless device as the evaluation target at the reception point.

17. A radio wave interference analysis method to analyze a state of interference due to a plurality of interference signals of a plurality of interference sources on a target signal of a wireless device as an evaluation target at a reception point, the radio wave interference analysis method comprising:
calculating a first probability of failure of reception of a target signal at a reception point due to collision of the target signal with an interference signal of a plurality of interference signals;

calculating a second probability of failure of reception of the target signal at the reception point due to the interference signal of a plurality of interference sources; and outputting the first probability and the second probability, by a processor, wherein the first probability is calculated based on a third probability of overlapping an interference source of the plurality of interference sources with the evaluation target in time and a fourth probability of failure of reception of the target signal when the interference source and the evaluation target overlap with each other in time.

18. A computer-readable non-transitory recording medium storing a program that causes a computer to execute a procedure, the procedure comprising:

calculating a first probability of failure of reception of a target signal at a reception point due to collision of the target signal with an interference signal of a plurality of interference signals;

calculating a second probability of failure of reception of the target signal at the reception point due to the interference signal of a plurality of interference sources; and outputting the first probability and the second probability, wherein the first probability is calculated based on a third probability of overlapping an interference source of the plurality of interference sources with the evaluation target in time and a fourth probability of failure of reception of the target signal when the interference source and the evaluation target overlap with each other in time.

* * * * *